(12) United States Patent
Rogers et al.

(10) Patent No.: US 12,277,697 B2
(45) Date of Patent: Apr. 15, 2025

(54) PRODUCE QUALITY ASSESSMENT AND PRICING METRIC SYSTEM

(71) Applicant: Apeel Technology, Inc., Goleta, CA (US)

(72) Inventors: James Rogers, Goleta, CA (US); Jordan Hudson, Goleta, CA (US); Charles Frazier, Goleta, CA (US); Taylor Hayward, Goleta, CA (US)

(73) Assignee: Apeel Technology, Inc., Goleta, CA (US)

( * ) Notice: Subject to any disclaimer, the term of this patent is extended or adjusted under 35 U.S.C. 154(b) by 339 days.

(21) Appl. No.: 17/718,447

(22) Filed: Apr. 12, 2022

(65) Prior Publication Data

US 2022/0327685 A1 Oct. 13, 2022

Related U.S. Application Data

(60) Provisional application No. 63/173,774, filed on Apr. 12, 2021.

(51) Int. Cl.
*G06T 7/00* (2017.01)
*G06Q 30/0283* (2023.01)
*G06V 20/68* (2022.01)

(52) U.S. Cl.
CPC ....... *G06T 7/0004* (2013.01); *G06Q 30/0283* (2013.01); *G06V 20/68* (2022.01);
(Continued)

(58) Field of Classification Search
CPC ......... G06T 7/0004; G06T 2207/20081; G06T 2207/30128; G06Q 30/0283; G06Q 10/087; G06V 20/68
See application file for complete search history.

(56) References Cited

U.S. PATENT DOCUMENTS

2016/0252297 A1* 9/2016 Jeong ............... G01N 27/26
                                                    62/62
2017/0203987 A1 7/2017 McMahon et al.
(Continued)

FOREIGN PATENT DOCUMENTS

WO 2020/073037 4/2020

OTHER PUBLICATIONS

International Search Report and Written Opinion in International Appln. No. PCT/US2022/024341, mailed Jun. 28, 2022, 17 pages.

*Primary Examiner* — Jianxun Yang
(74) *Attorney, Agent, or Firm* — Fish & Richardson P.C.

(57) ABSTRACT

Systems and methods described herein can non-destructively determine current produce quality. An evaluation system can, at a first time, receive image data of produce and identify a type of the produce using machine learning techniques. The produce can be sent to an end-consumer retail environment. A quality assessment system can, at a second time, receive, from a user device in the retail environment, a request for a current quality of a particular produce that includes scanned data of that produce. The quality assessment system can identify that produce, retrieve, from a data store, machine learning trained models for identifying quality features of that produce, determine, based on applying the models to the scanned data, a current quality of that produce, and transmit, to the user device, the current quality. The produce's price can also be dynamically adjusted based on the current quality of that produce.

25 Claims, 34 Drawing Sheets

(52) U.S. Cl.
CPC ............... *G06T 2207/20081* (2013.01); *G06T 2207/30128* (2013.01)

(56) References Cited

U.S. PATENT DOCUMENTS

2019/0133391 A1* 5/2019 Khazaieli .............. D06F 58/203
2020/0222949 A1  7/2020 Murad et al.
2020/0334628 A1* 10/2020 Goldberg ........... G06Q 30/0633

* cited by examiner

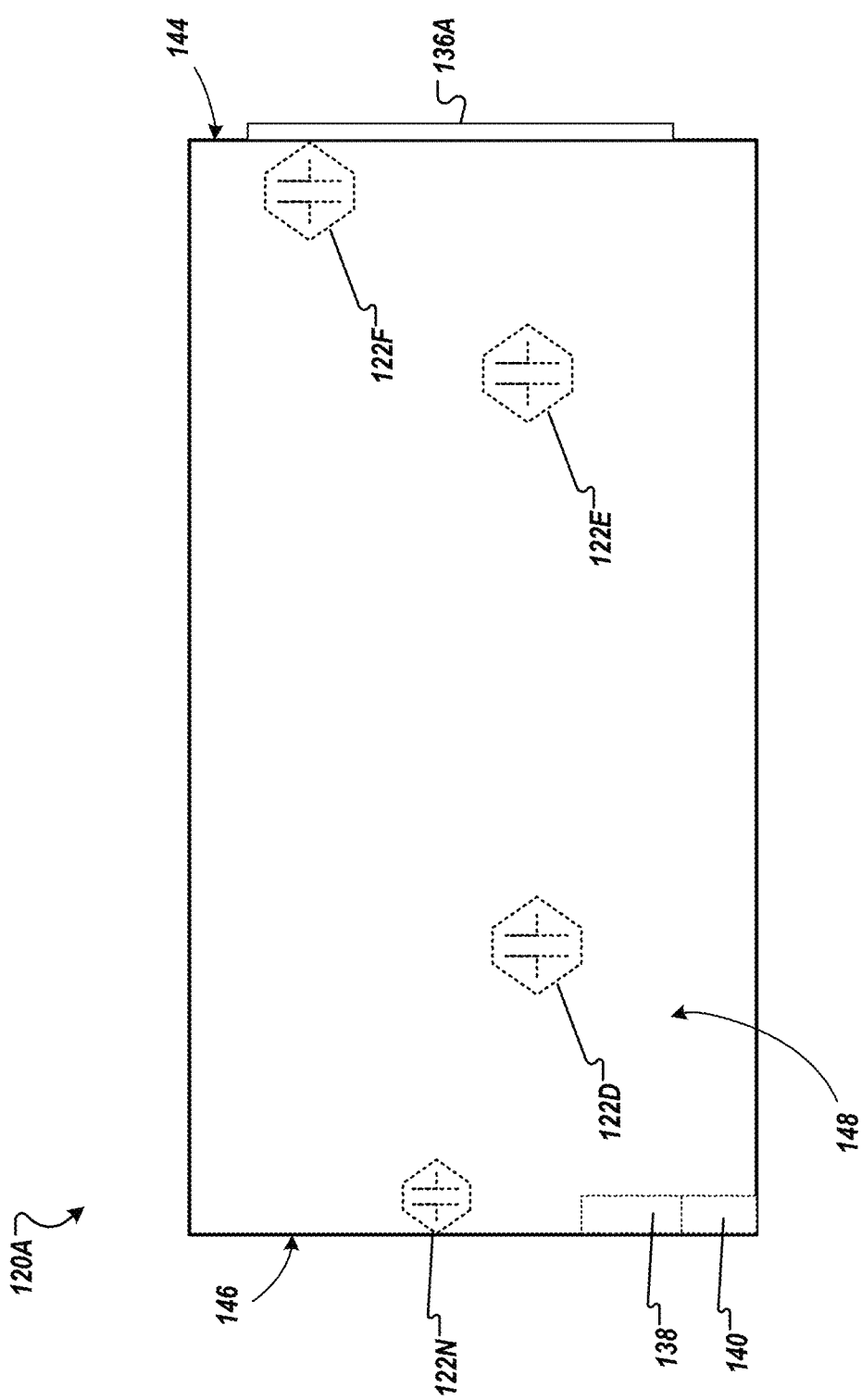

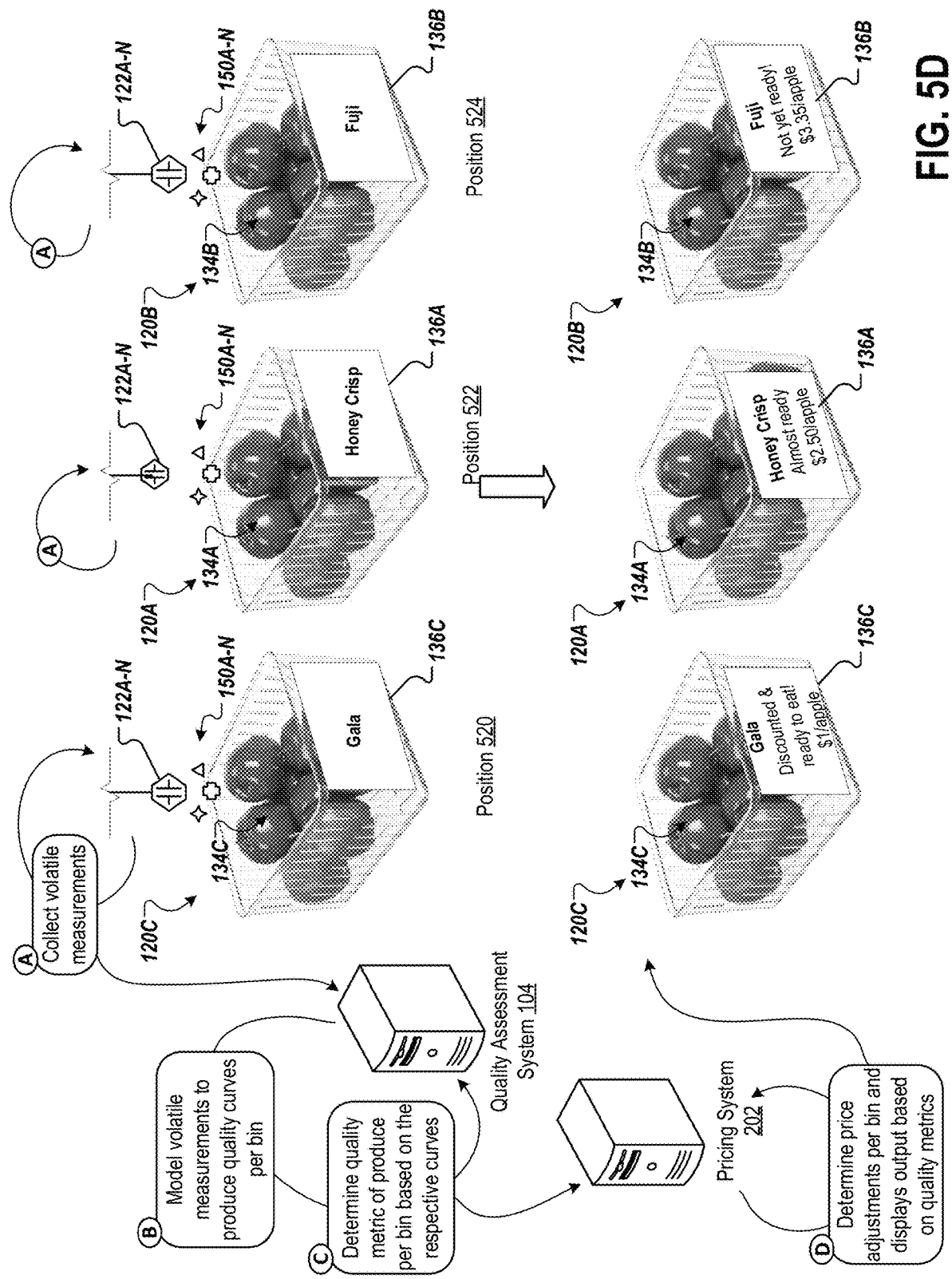

PRODUCE QUALITY ASSESSMENT AND PRICING METRIC SYSTEM

CROSS REFERENCE TO RELATED APPLICATIONS

This application claims priority to U.S. Provisional Application Ser. No. 63/173,774, filed on Apr. 12, 2021, the disclosure of which is incorporated by reference in its entirety.

TECHNICAL FIELD

This document generally describes devices, systems, and methods related to determining and using produce metrics, such as quality and pricing metrics for produce.

BACKGROUND

Produce, such as fruits and vegetables, and/or other perishable goods (e.g., meat) can have different quality metrics that can impact their suitability for consumption and value in a supply chain. Multiple different stakeholders throughout the supply chain have an interest in evaluating quality of such produce. Quality of the produce can impact pricing of such produce as well as consumer purchasing decisions. For example, consumers may desire to purchase produce that is at peak ripeness rather than produce that has passed its peak ripeness. The produce that has passed its peak ripeness may not be purchased or otherwise consumed by consumers, which can result in produce-based waste. Moreover, when produce are priced the same regardless of their quality, consumers can be inclined to purchase the produce of better quality rather than the food items of lesser quality, which can also lead to wasting the produce of lesser quality.

Objectively and quantitatively defining quality of produce can be challenging. Relevant stakeholders in the supply chain can observe visible features on the produce to determine their quality. However, the stakeholders may not be able to identify less visible features that can impact quality of the produce. Moreover, destructive quality measurements can be taken by touching, squishing, puncturing, slicing, and/or peeling portions of the produce. Such destructive measurements can reduce or impair quality of the produce. Moreover, the destructive measurements may not be accurate at a current time that a consumer desires to purchase or otherwise consume the produce.

SUMMARY

This document generally describes technology for determining and using produce metrics, such as quality metrics (e.g., ripeness metric, freshness metric, taste metrics) and pricing metrics (e.g., price of produce at current quality level) that may change as produce (e.g., fruits, vegetables) ripens or otherwise changes over time. For example, different types of produce can ripen at different rates, and the same type of produce can ripen at different rates depending on the location of origin for the produce, the manner in which the produce has been transported (e.g., refrigerated container, non-refrigerated container), and/or other factors. As a result, it can be challenging to accurately assess produce quality without using techniques that may spoil or otherwise damage the produce, such as invasive measurement techniques (e.g., cutting open fruit to assess internal quality). The disclosed technology can generate and use data models that correlate non-invasive produce assessments (e.g., image-based produce assessment, analysis of produce-emitted volatiles and compounds) to produce metrics, and that can further be used to dynamically assess and predict future produce metrics as the produce ripens or otherwise changes over time. Such non-invasive produce assessments can be performed, for example, at a single point in the supply chain for a produce item, which may have a unique identifier associated with the assessment (e.g., sticker with QR code on produce). Then that assessment can be retrieved using the unique identifier for the produce and used in combination with a corresponding data model to dynamically determine produce metrics for the produce item at subsequent points in the supply chain, and can also to predict the produce metrics for the produce item at future points in time without requiring further assessments. Such non-invasive produce assessments can also be performed at a single point in the supply chain where produce-emitted volatiles can be collected and analyzed to determine quality metrics of the produce and predict the future produce metrics to determine supply chain modifications (e.g., pricing of the produce, discounts on the produce, amount of time until peak ripeness, etc.). The volatiles can be modeled for shelf life and/or quality to then predict shelf life and/or quality of the produce. Such produce assessments and metrics can be used in a variety of different applications, such as permitting for consumers to more accurately assess the quality of produce in a grocery store or other retail environment, permitting retailers to dynamically adjust pricing for produce based on quality, and/or other uses described throughout this document.

As an illustrative example, a hyperspectral image of an avocado can be captured and used by a computing system to predict a number of days until that avocado will be 'ripe.' That avocado can receive a sticker with a barcode that uniquely identifies it. The prediction and unique identifier can be stored in a data store and used in subsequent quality and pricing predictions. As another illustrative example, the avocado can be placed in a produce bin for storage, movement along the supply chain, and/or sale in a store such as a grocery store. The produce bin can be configured with one or more sensors that can detect/collect different types of volatiles and other compounds released by the avocado. The collected volatiles can be measured and/or analyzed by the one or more sensors, which can transmit volatile measurement information to the computing system. Using one or more models trained with machine learning techniques to assess volatiles and correlate the volatiles to quality metrics, the computing system can predict various quality metrics of the avocado, such as the number of days until the avocado will be ripe, shelf life, taste, etc. In some implementations, the volatile assessment can occur once early in the supply chain of the avocado (or group of avocados in the same produce bin) such that output from the assessment can be used to make upstream adjustments/modifications to the supply chain for that avocado or group of avocados.

For example, a price of that particular avocado (or the group of avocados in the same produce bin as the particular avocado) can also be adjusted by the computing system based on the abovementioned assessments and predictions. The price can be adjusted in such a way that creates an incentive for a consumer to purchase that avocado as it approaches its expiration date or otherwise is at peak ripeness. For example, the avocado can be priced more expensive when it is under ripe or not yet at peak ripeness. When the avocado is predicted to reach peak ripeness or is overripe, the price of the avocado can be reduced. A lower price can incentivize the consumer to purchase the avocado, thereby reducing likelihood that this avocado will go to waste.

Produce, such as avocados, can be priced according to size. An average price point can be set, but some produce can be worth more than the average price and some can be worth less than that average price. This can result in an adverse selection problem: produce that are worth more than the average price can be selected first by consumers and the produce that are worth less than the average price may not be purchased or may not be purchased until all of the above-average produce are purchased. This can cause significant produce-based waste. The disclosed technology, on the other hand, can provide for assessing real-time quality of the produce and discounting produce that are less than the average price. When consumers see the lower prices, they can be inclined to purchase the discounted produce, thereby increasing overall average quality of the remaining produce on the shelf. This can also increase perceived quality of a produce department in a grocery store.

Although the illustrative examples are described in reference to avocados, the disclosed technology can be applied to a variety of produce types. For example, the disclosed technology can be used to non-invasively assess various different quality metrics of apples, citrus fruits, berries, vegetables, and other types of produce sold in stores. Moreover, various models can be trained and used to assess the quality metrics associated with the different types of produce.

Particular embodiments described herein include a system for determining quality levels of food items using non-contact assessments of the food items, the system including: a quality assessment system that can be configured to: receive food item data, the food item data including image data of a particular food item, determine a current quality level of the particular food item based on providing the food item data as input to a food item quality model, the food item quality model having been trained using image data of other food items having distinct quality features, the other food items being of a same food type as the particular food item, determine, based on the current quality level of the particular food item, a number of days to peak ripeness for the particular food item, adjust the determined number of days to peak ripeness based on measured volatiles for the particular food item, and determine at least one supply chain modification for the particular food item based on the current quality level of the particular food item and the adjusted number of days to peak ripeness. The system can also include a display device in communication with the quality assessment system, the display device being configured to: request, from the quality assessment system, information about quality of the particular food item, the information including at least one of the current quality level of the particular food item, the number of days to peak ripeness for the particular food item, the adjusted number of days to peak ripeness, and the at least one supply chain modification, and visually present the requested information in a display in an end-consumer retail environment.

The system can optionally include one or more of the following features. For example, the quality assessment system can also generate a ripeness curve for the particular food item based at least in part on the current quality level of the particular food item and the measured volatiles, the ripeness curve indicating a current ripeness of the particular food item and projected ripeness levels of the particular food item over a predetermined period of time. The quality assessment system can also generate the ripeness curve for a batch of food items that includes the particular food item, the batch of food items being the same type as the particular food item.

The system can also include a bin that can be configured to hold a quantity of food items including the particular food item, the bin including: one or more sensors attached to one or more sides of the bin, the one or more of sensors being configured to detect volatile compounds emitted by the food items in the bin, a display screen attached to one or more sides of the bin that can dynamically display information about the food items in the bin, and a communication interface that can communicate with the quality assessment system over one or more networks. The quality assessment system can transmit, to the display screen of the bin for presentation, the output indicating the at least one supply chain modification for the particular food item.

As another example, at least one supply chain modification can be a price adjustment for the food items in the bin and the quality assessment system can: determine the price adjustment for the food items in the bin based at least in part on the current quality level of the particular food item, and transmit, to the display screen of the bin for presentation, the adjusted price for the food items in the bin.

The quality assessment system can also receive, from the one or more sensors, data indicative of the volatile compounds detected by the one or more sensors, provide the data indicative of the volatile compounds as input to the food item quality model, the food item quality model having been trained to correlate volatile compounds emitted by the other food items with quality characteristics of the other food items, the quality characteristics being annotated in training data of the other food items, and receive, as output from the food item quality model, the current quality level of the particular food item based on the data indicative of the volatile compounds.

As another example, determining the at least one supply chain modification can include determining a sorting arrangement of at least one of (i) the food items in the bin and (ii) the bin relative to other bins containing food items of other types in the end-consumer retail environment. The sorting arrangement can include placing riper food items closer to a front of the bin and placing less ripe food items closer to a back of the bin. The sorting arrangement can also include placing a bin with more ripe food items closer to an entrance of the end-consumer retail environment and placing a bin with less ripe food items farther away from the entrance of the end-consumer retail environment.

Sometimes, determining the at least one supply chain modification can include adjusting a price of the food items in the bin based on the current quality level of the particular food item in the bin. The quality assessment system can (i) increase the price of the food items in the bin based on a determination that the current quality level is a level of ripeness that is less than a threshold ripeness value or (ii) decrease the price of the food items in the bin based on a determination that the current quality level is a level of ripeness that exceeds the threshold ripeness value.

In some implementations, determining the one or more supply chain modifications can include determining a shelf life of the food items in the bin based on the current quality level. The food item quality model can be a model that predicts ripeness of the food items in the bin based on the detected volatile compounds. The food item quality model can be a model that predicts firmness of the food items in the bin based on the detected volatile compounds. The food item quality model can also be a model that predicts taste of the food items in the bin based on the detected volatile compounds. The food item quality model can be a model that predicts juiciness of the food items in the bin based on the detected volatile compounds.

As another example, the display screen can be the display device. The one or more sides of the bin can include a front wall, a back wall, a first side wall, a second side wall, and a bottom of the bin. The bin further can include a local power source that is part of the bin to provide power to the one or more sensors and the display screen.

In some implementations, the system can also include an evaluation computing system that can: receive, from an imaging device, image data of the particular food item, identify a type of the particular food item based on applying a food item identification model to the image data, determine, based on the identified type of the particular food item, an initial quality level of the particular food item, generate a product identifier that uniquely identifies the particular food item, information associated with the product identifier corresponding to the initial quality level of the particular food item, generate instructions that cause the particular food item to be transported to the end-consumer retail environment based at least in part on the initial quality level of the particular food item, and return, to at least one actor in a supply chain associated with the particular food item, (i) the instructions for execution by the at least one actor in the supply chain and (ii) the product identifier. The evaluation computing system can determine an initial price of the particular food item based at least in part on the initial quality level of the particular food item, the type of the particular food item, and preferences of the end-consumer retail environment.

As another example, the particular food item can be an avocado, citrus fruit, berry, orange, apple, mango, or vegetable. The quality assessment system can also: receive, from a user device in the end-consumer retail environment, a request for the current quality level of the particular food item, the request including scanned data of the particular food item, the scanned data including image data of at least one of the particular food item and a unique identifier attached to the particular food item, and transmit, to the user device, the current quality level of the particular food item for presentation in a mobile application at the user device. The display device can be a user device of a consumer in the end-consumer retail environment. The display device can be a visual display on a bin that can contain the particular food item in the end-consumer retail environment. The display device can be a visual display positioned in the end-consumer retail environment near the particular food item. The system can also include at least one volatiles sensor that can: detect volatiles emitted by the particular food item in the end-consumer retail environment, and transmit data indicating the detected volatiles to the quality assessment system. The quality assessment system can receive the data indicating the detected volatiles from the at least one volatiles sensor and process the received data to generate the measured volatiles for the particular food item.

Particular embodiments described herein include a bin that can be configured to hold a quantity of food items, the bin including: one or more sensors attached to one or more sides of the bin, the one or more of sensors being configured to detect volatile compounds emitted by the food items in the bin, a display screen attached to one or more sides of the bin to dynamically display information about the food items in the bin, a communication interface that can communicate with the quality assessment system over one or more networks, and a controller in communication with the one or more sensors, the display screen, and the communication interface, the controller being able to update information displayed at the display screen based on a quality metric of the food items in the bin.

The bin can optionally include one or more of the following features. The bin can also include a local power source to provide power to the one or more sensors, the display screen, the controller, and the communication interface. The bin can include at least one sensor positioned a threshold distance away from the bin to detect the volatile compounds emitted by the food items in the bin. The threshold distance can be within a range of 1 to 6 inches. The quality metric of the food items in the bin can be determined by a computer system in communication with the bin, the computer system being able to perform operations that include: receiving, from the controller, data indicative of the volatile compounds detected by the one or more sensors, providing the data indicative of the volatile compounds as input to a food item quality model, the food item quality model having been trained to correlate volatile compounds emitted by other food items of the same food item type as the food items in the bin with quality characteristics of the other food items, receiving the quality metric for the food items in the bin as output from the food item quality model, and transmitting, to the controller via the communication interface, output to be presented at the display screen, the output indicating the quality metric for the food items. The output indicating the quality metric for the food items can include a current level of ripeness of the food items. The output indicating the quality metric for the food items can include a current firmness of the food items. The output indicating the quality metric for the food items can include a current readiness to be eaten of the food items. The output indicating the quality metric for the food items can include a current taste of the food items. The output indicating the quality metric for the food items can include a current sweetness of the food items.

As another example, the operations further can include: determining, based on the quality metric for the food items in the bin, at least one supply chain modification, and transmitting, to the controller via the communication interface, the at least one supply chain modification for execution. The at least one supply chain modification can be adjusting a price of the food items in the bin based on the quality metric, and the controller can (i) generate updated output including the adjusted price of the food items in the bin and (ii) instruct the display screen to present the updated output. The food item quality model could have been trained to model the data indicative of the volatile compounds to a quality curve for the food items in the bin. The food item quality model could have been trained, by the computer system using a process including: receiving training data for the other food items that includes (i) food item observations, (ii) historic food item information, (iii) destructive measurements of the other food items, and (iv) detected volatile compounds from the other food items, at least one of (i)-(iv) having been labeled and annotated with food item features, generating the food item quality model based on applying machine learning techniques to the training data to map the detected volatile compounds from the other food items to the food item features, and outputting the food item quality model for runtime use.

Particular embodiments described herein include a case that can be configured to hold a quantity of food items, the case including: a physical structure having one or more levels for storing groups of food items, one or more sensors attached to the case, the one or more of sensors being configured to detect volatile compounds emitted by the groups of food items on the one or more levels of the physical structure, one or more display devices to dynamically display information about the groups of food items in the case, a hose structure positioned around the groups of food items, a vacuum system to draw air through the hose structure from around the groups of food items to route a concentration of the volatile compounds emitted by the groups of food items towards at least one of the one or more sensors, and a controller in communication with the one or more sensors, the one or more display devices, and the vacuum system, the controller able to update information displayed at the one or more display devices based on quality metrics of the groups of food items in the case, the quality metrics of the groups of food items being determined based at least in part on the volatile compounds emitted by the groups of food items.

The case can optionally include one or more of the following features. The physical structure can be a rack. The one or more levels can be shelves. The case can be a refrigeration unit. The case can be a cabinet. The case can be a food item-ripening cabinet. The case can be a food item-ripening enclosure. One or more groups of sensors can be attached to one or more sides of the case proximate the groups of food items. One or more groups of sensors can be attached to the physical structure proximate the groups of food items. One or more groups of sensors can be attached to at least one of the one or more levels proximate the groups of food items. The case can also include one or more bins positioned on the one or more levels, each of the one or more bins being configured to contain each of the groups of food items.

Particular embodiments described herein can include a system for analyzing quality of food items using non-contact assessment of the food items, the system including: a case to hold a group of food items, a volatiles assessment system to collect volatile compounds emitted by the group of food items in the case and process the collected volatile compounds to generate volatile data about the group of food items, a tube structure positioned around the case and in fluid communication with the volatiles assessment system, the tube structure being configured to route the volatile compounds emitted by the group of food items in the case to the volatiles assessment system, a controller to control operation of the volatiles assessment system, and a communication interface to communicate with a quality assessment system over one or more networks, the quality assessment system being configured to determine one or more quality metrics for the group of food items based at least in part on the volatiles data.

The system can optionally include one or more of the following features. For example, the system can also include a vacuum system in communication with the volatiles assessment system, the vacuum system being configured to draw the volatile compounds emitted by the group of food items in the case through the tube structure and towards the volatiles assessment system for collection. The vacuum system can include a pump to draw the volatile compounds through the tube structure and towards the volatiles assessment system for collection. The vacuum system can include a fan to draw the volatile compounds through the tube structure and towards the volatiles assessment system for collection. The system can also include a valve in fluid communication with the tube structure and the volatiles assessment system, the controller being configured to open the valve to allow the volatile compounds to pass from the tube structure into the volatiles assessment system for collection. The controller can also close the valve based on a determination that a predetermined threshold quantity of volatile compounds are collected by the volatiles assessment system. The controller can also generate instructions that, when executed, cause the volatiles assessment system to process the collected volatile compounds to generate the volatiles data. The valve can be a switch.

The system can also include a display device in communication over the one or more networks with the volatiles assessment system, the display device being configured to present information about the group of the food items on a display screen. The display device can be positioned next to the case. The display device can be attached to the case. The display device can be in communication over the one or more networks with the quality assessment system, the display device being configured to present the one or more quality metrics for the group of food items in the case.

As another example, the case can also include one or more openings in fluid communication with one or more tubes of the tube structure. The one or more openings can be integrated into a bottom surface of the case. The one or more tubes can be sized within a range of approximately $1/16$ inch to $1/4$ inch. The system can also include a vacuum system to draw air through the one or more tubes of the tube structure to route the volatile compounds emitted by the group of food items through the one or more openings in the case, through the one or more tubes, and to the volatiles assessment system for collection. The volatiles assessment system can be an electronic nose. The volatiles assessment system can include one or more sensors for detecting volatile compounds emitted by the group of food items. Each of the one or more sensors can be configured to detect a different type of volatile compound in the volatile compounds emitted by the group of food items. The volatiles assessment system can also be a gas chromatograph machine.

Particular embodiments described herein include an apparatus for analyzing quality of food items using non-contact assessment of the food items, the apparatus including: a case to hold a group of food items, the case including: one or more sensors to collect volatile compounds emitted by the group of food items in the case, a vacuum system to draw the volatile compounds emitted by the group of food items in the case towards the one or more sensors, and a controller to control operation of the vacuum system.

The apparatus can optionally include one or more of the following features. For example, the vacuum system can include a pump. The vacuum system can include a fan. The one or more sensors can be selected from a group of sensors, the group of sensors including at least one of nanocomposite sensors, electromechanical sensors, metal oxide semiconductors, photoionization sensors, and non-dispersive infrared sensors. The apparatus can also include a display device in communication over one or more networks with the controller, the controller being configured to generate instructions that, when executed, cause the display device to present information about the group of food items in the case, the information being based at least in part on the volatile compounds collected by the one or more sensors. The controller can also generate volatiles data for the group of food items in the case based on the volatile compounds collected by the one or more sensors. The controller can transmit the volatiles data to a quality assessment system that can determine one or more quality metrics for the group of food items based at least in part on the volatiles data. The controller can also determine one or more quality metrics for the group of food items based at least in part on the volatiles data.

Particular embodiments described herein include a method for dynamically determining quality levels of food items using non-contact assessments of the food items, the method including: receiving, by a computing system, food item data, the food item data including image data of a particular food item, determining, by the computing system, a current quality level of the particular food item based on providing the food item data as input to a food item quality model, the food item quality model having trained using image data of other food items having distinct quality features, the other food items being of a same food type as the particular food item, determining, by the computing system and based on the current quality level of the particular food item, a number of days to peak ripeness for the particular food item, adjusting, by the computing system, the determined number of days to peak ripeness based on measured volatiles for the particular food item, determining, by the computing system, at least one supply chain modification for the particular food item based on the current quality level of the particular food item and the adjusted number of days to peak ripeness, and transmitting, by the computing system to a display device, information about quality of the particular food item to be visually presented in a display in an end-consumer retail environment, the information including at least one of the current quality level of the particular food item, the number of days to peak ripeness for the particular food item, the adjusted number of days to peak ripeness, and the at least one supply chain modification.

The method can optionally include any one or more of the abovementioned features.

Particular embodiments described herein can include a system for determining quality levels of food items using non-contact assessments of the food items, the system including an evaluation computing system and a quality assessment system. The evaluation computing system can, at a first time, receive, from an imaging device, image data of a food item, and identify a type of the food item based on applying a first set of trained models to the image data. Each of the trained models can be trained using at least (i) image data of other food items having a first set of food item-type identifying features and (ii) image data of other food items having a second set of food item-type features. The evaluation system can also generate a product identifier that uniquely identifies the food item, generate instructions that cause the food item to be transported to an end-consumer retail environment, and transmit, to a quality assessment system, the product identifier of the food item. The quality assessment system can, at a second time, store the product identifier in a data store, and receive, from a user device in the end-consumer retail environment, a request for a current quality level of a particular food item. The request can include scanned data of the particular food item. The quality assessment system can identify a type of the particular food item based on applying the first set of trained models to the scanned data, and retrieve, from the data store and based on identifying that the particular food item is the same type as the food item, a second set of trained models. Each of the trained models can be trained using (i) image data of other food items having poor quality features and (ii) image data of other food items having good quality features, wherein the other food items are of a same food type as the particular food item. The quality assessment system can determine, based on applying the second set of trained models to the scanned data, the current quality level of the particular food item, and transmit, to the user device, the current quality level of the particular food item.

In some implementations, the embodiments described herein can include one or more of the following features. For example, the first time can be earlier than the second time. The scanned data can include image data of the particular food item. The imaging device can be a hyperspectral imaging device. The product identifier can be a barcode, SKU, QR code, sticker, stamp, or label.

As another example, identifying a type of the particular food item can include detecting, using object recognition techniques, a produce identifier in the scanned data, decoding the product identifier, and matching the decoded product identifier of the particular food item with the product identifier of the food item that is stored in the data store. Moreover, the first and second sets of the trained models can be trained using convolution neural networks (CNNs). At least one of the image data and the scanned data can include color data, RGB color models, and hyperspectral data.

As yet another example, the quality assessment system can also determine that the particular food item is suitable for consumption based on the current quality level of the particular food item exceeding a threshold value. The evaluation computing system can also determine, based on the identified type of the food item, an initial quality level of the food item based on applying the second set of trained models to the image data. Determining the initial quality level of the food item can include predicting a number of days until the food item is at peak ripeness.

In some implementations, the evaluation computing system can also identify the type of the food item based on supply chain information at a current location of the food item. The supply chain information can include place of origin, transit conditions, and storage conditions. The evaluation computing system can also determine an initial price of the food item. The initial price can be based on market conditions, the type of the food item, and preferences of the end-consumer retail environment.

As another example, determining the current quality of the particular food item can include generating a quality curve. The quality curve can indicate ripeness stages of the particular food item over a predetermined period of time. The predetermined period of time can include the first time, the second time, and a future time.

As yet another example, the quality assessment system can also detect an environment of the particular food item in the scanned data using object recognition techniques, predict a shelf life of the particular food item based on applying the second set of trained models to the scanned data, compare a location of the particular food item in the detected environment to the predicted shelf life of the particular food item, and determine whether the location of the particular food item in the detected environment corresponds to the predicted shelf life of the particular food item. The quality assessment system can generate output for the predicted shelf life of the particular food item based on determining that the predicted shelf life corresponds to the current location of the particular food item in the detected environment, and improve one or more models in the second set of trained models to predict shelf life of the particular food item based on training the one or more models using the scanned data.

In some implementations, the quality assessment system can also receive, from the user device, image data of a display shelf having a plurality of food items in the end-consumer retail environment, identify, for each of the plurality of food items, a product identifier, determine, for each of the plurality of food items and based on the product identifier, a current quality level of the food item, and generate an augmented reality view of the image data for display at the user device, wherein one or more of the plurality of food items are highlighted based on the current quality level of each of the plurality of food items. Each of the plurality of food items having a highest current quality level can be highlighted in the augmented reality view of the image data. Each of the plurality of food items having a lowest current quality level can also be highlighted in the augmented reality view of the image data.

As another example, the quality assessment system can, at a third time, receive, from the user device, an indication that a user of the user device purchased the particular food item, determine, a quality level of the purchased food item at the third time, wherein the third time is after the second time, and predict, based on the quality level of the purchased food item at the third time, when the purchased food item will be ready for consumption by the user. The quality assessment system can identify one or more recipes that include the purchased food item when the purchased food item is no longer consumable, and generate output, for display at the user device, indicating (i) when the purchased food item will be ready for consumption and (ii) the one or more recipes that can be used once the purchased food item is no longer consumable.

Preferred embodiments herein can also include a system for dynamically adjusting price of food items using non-contact assessments of the food items. The system can include a quality assessment system and a pricing computing system. The quality assessment system can receive, from a user device in an end-consumer retail environment, a request for a current quality level of a particular food item. The request can include scanned data of the particular food item. The quality assessment system can identify a type of the particular food item based on applying a first set of trained models to the scanned data. Each of the trained models can be trained using at least (i) image data of other food items having a first set of food item-type identifying features and (ii) image data of other food items having a second set of food item-type features. The quality assessment system can then retrieve, from a data store and based on identifying the type of the particular food item, historic quality information about food items of the same type as the particular food item and a second set of trained models that were trained to identify quality features of the food items of the same type as the particular food item. Each of the trained models can be trained using (i) image data of the food items having poor quality features and (ii) image data of the food items having good quality features. The food items can be of a same food type as the particular food item. The quality assessment system can determine, based on the historic quality information and applying the second set of trained models to the scanned data, the current quality level of the particular food item, transmit, to the user device, the current quality level of the particular food item for display at the user device, and transmit, to a pricing computing system, the current quality level of the particular food item. The pricing computing system can receive, from the quality assessment system, the current quality level of the particular food item, and retrieve, from a pricing models data store, a third set of trained models that can be trained to determine price adjustments of the particular food item based on the current quality level of the particular food item. Each of the trained models can be trained using at least (i) pricing data of other food items having poor quality levels and (ii) image data of the other food items having high quality levels. The pricing computing system can determine, based on applying the third set of trained models to the current quality level of the particular food item, a price adjustment for the particular food item, and transmit, to the user device, the price adjustment for display at the user device.

In some implementations, the embodiments described herein can include one or more of the following features. For example, determining the price adjustment for the particular food item can include decreasing a price of the particular food item when the current quality level of the particular food item is not within a threshold range. Determining the price adjustment for the particular food item can also include increasing the price of the particular food item when the current quality level of the particular food item is within the threshold range. The current quality level of the particular food item may not be within the threshold range when the particular food item is past peak ripeness. The current quality of the particular food item may be within the threshold range when the particular food item is approaching peak ripeness, is ripe, or is at peak ripeness.

Moreover, the particular food item can be an avocado, fruit, vegetable, or meat. The scanned data can include image data of the particular food item. The scanned data can also include a product identifier of the particular food item. The quality evaluation system can identify the particular food item based on detecting the product identifier in the scanned data using object recognition techniques, decoding the product identifier, and matching the decoded product identifier of the particular food item with a product identifier of other food items of a same type as the particular food item that is stored in the data store.

In some implementations, determining, based on applying the third set of trained models to the current quality level of the particular food item, the price adjustment for the particular food item can include predicting a remaining marketable shelf life of the particular food item, determining whether the remaining marketable shelf life of the particular food item exceeds a threshold range, increasing a price of the particular food item based on determining that the remaining marketable shelf life of the particular food item exceeds the threshold range, and decreasing the price of the particular food item based on determining that the remaining marketable shelf life of the particular food item does not exceed the threshold range.

The system can also include a point of sale (POS) terminal in a checkout lane that is in communication with the quality assessment system. The POS terminal can receive, from the quality assessment system, the current quality level of the particular food item. The particular food item can be scanned at the POS terminal to be purchased by a consumer. The POS terminal can retrieve, from the data store, pricing information that corresponds to food items of the same type as the particular food item, determine, based on the pricing information and the current quality of the particular food item, a price adjustment for the particular food item, and implement the price adjustment for the particular food item. The price adjustment can be automatically applied to a bill of the consumer.

As another example, transmitting, to the user device, the price adjustment, can include generating a coupon that can be applied during checkout for purchase of the particular food item.

Preferred embodiments described herein can also include a system for sorting food items based on current quality levels using non-contact assessments of the food items. The system can include a quality assessment system and a user device. The quality assessment system can receive, from a user device in an end-consumer retail environment, a request for current quality levels of a plurality of food items. The request can include scanned data of the plurality of food items. The quality assessment system can identify, for each of the plurality of food items, a type of the food item based on applying a first set of trained models to the scanned data. The first set of trained models can be trained to identify and decode product identifiers of a plurality of other food items. The quality assessment system can retrieve, from a data store and based on identifying, for each of the plurality of food items, the type of the food item, historic quality information about food items of the same type as the food item and a second set of trained models that can be trained to identify quality features of the food items of the same type as the food item. Each of the trained models can be trained using (i) image data of the food items having poor quality features and (ii) image data of the food items having good quality features. The food items can be of a same food type as the particular food item. The quality assessment system can determine, for each of the plurality of food items, a current quality level of the food item based on applying the second set of trained models to the scanned data, and transmit, to the user device, the current quality level of each of the plurality of food items for display at the user device. The user device can output the current quality level of each of the plurality of food items, rank the plurality of food items from highest current quality level to lowest current quality level, and determine a sorting order for the ranked plurality of food items. The sorting order can indicate that food items having the highest current quality level can be positioned at a back of a display shelf and food items having the lowest current quality level can be positioned at a front of the display shelf.

In some implementations, the embodiments described herein can include one or more of the following features. For example, the highest current quality level can indicate that the food item is at least one of (i) not yet ripe and (ii) having a greatest amount of days remaining until peak ripeness. The lowest current quality level can indicate that the food item is at least one of (i) past peak ripeness and (ii) having a least amount of days remaining before the food item is no longer consumable.

The disclosed technology may provide one or more of the following advantages. For example, the disclosed technology can provide for eliminating produce-based waste while maximizing value to relevant stakeholders in the supply chain. Quality of produce can be dynamically assessed in real-time and used to determine price adjustments for that produce. Produce whose quality can be diminishing can be discounted, which can incentivize consumers to purchase that produce over produce whose quality is increasing. If produce whose quality is diminishing are being purchased, then produce-based waste can be reduced or otherwise eliminated.

A stakeholder farthest up the supply chain that touches the produce last can offer a greatest cost advantage to an end customer. There can also be a market clearing price for any given piece of produce that is a function of the quality of that produce. This can be advantageous to the stakeholder farthest upstream in the supply chain because every time a piece of produce is handled, it adds cost. For example, a grower who ships directly to a grocer is able to deliver at a lower cost than a grower who must deliver to a marketer who handles the produce and then delivers to a grocer. The marketer can be an aggregator, which justifies their cost by matching supply and demand. Dynamically adjust the price of an individual piece of produce as described herein can be advantageous since produce is a natural product and hence of variable quality. Thus, to minimize cost of merchandising (e.g., minimize cost of labor) it can be desirable to price produce according to its quality.

Moreover, determining and predicting shelf life and other quality metrics of the produce near the point of purchase can reduce a need to make dynamic shelf life or other quality predictions throughout the supply chain. The predictions can be dynamically outputted, for example, on displays positioned near the produce to provide consumers with information necessary to make informed purchasing decisions and/or on a user computing device using a unique identifier for the produce (e.g., scan QR code associated with bin prompting retrieval of prediction information). The predictions can also be used to make accurate price adjustments at or near the point of purchase. Dynamically outputting the predictions on displays in the store and/or at user devices of consumers can drive purchasing behavior. The real-time analysis described herein also provides for dynamic pricing, rather than basing pricing adjustments on modeling measurements of the produce that are taken early in the supply chain.

As another example, using machine learning trained models and a robust set of stored data about the produce, produce quality can be more accurately and dynamically determined in real-time. The human eye can be prone to error in trying to observe subtle changes in appearance of produce, which can negatively impact a human's ability to accurately assess produce quality. Human observation can also be a tedious and time-consuming process. The disclosed technology provides for automatically and accurately determining quality of the produce using machine learning trained models and robust sets of stored data about the produce. The disclosed technology can provide for deeper analysis, thereby increasing efficiency and reducing human error that may occur from visual observation and inspection of the produce.

As another example, the disclosed technology can be used to make appropriate supply chain modifications to reduce produce-based waste. As described above, price can be adjusted based on a current assessment of produce quality. Moreover, arrangement of the produce on display can be adjusted based on the current assessment of produce quality. A grocery store employee, for example, can request, from a computing system, a quality assessment of produce that needs to be stocked on a shelf display. The computing system can return quality values for each of the produce. The employee can then stock the shelf based on the quality values for the produce. As an example, the employee can stock the produce having the lowest quality (e.g., over ripe, past peak ripeness, some bruising, etc.) at a front of the shelf. The employee can position the produce having the highest quality (e.g., not yet ripe, approaching peak ripeness, no bruising, etc.) towards a back of the shelf. As a result, consumers can choose the produce at the front of the shelf first, which can be advantageous to sell the lower quality produce and avoid produce-based waste.

Similarly, the disclosed technology provides for accurately predicting shelf life of produce to optimize distribution of the produce throughout the supply chain to suppliers, retailers, distributors, and/or consumers. Non-destructive measurements of the produce can be captured anywhere along the supply chain such as during purchase in a store and/or in a packing house or storage facility and used in combination with historic information about the produce and machine learning trained models to accurately determine sorting arrangements of the produce, predict shelf life based on an assumed supply chain for the produce, and update predictions based on deviations from the predictions. The disclosed technology can also be used to identify organoleptic characteristics of the produce (e.g., smell, taste, look), which shape consumer purchasing decisions. For example, better tasting produce may increase likelihood of the consumer repurchasing the produce. These characteristics can be challenging to detect or determine by simple human observations when the consumers are at the store. Therefore, the disclosed technology provides for predicting flavor measurements of the produce to help the consumers make more informed purchasing decisions.

As yet another example, the disclosed technology can generate more robust quality and pricing assessments of produce. Different models can be generated and trained using machine learning techniques and high quality labeled training data sets in order to identify and score different quality features associated with different produce. Thus, the models can be trained to identify features that otherwise may be difficult for humans to observe and to associate such features with quality and pricing of the produce. Such robust quality and pricing assessments can be advantageous to more accurately and dynamically monitor produce quality, adjust pricing of the produce, and modify the supply chain.

As another example, retailers can view information about what produce is scanned and associated discounts and/or pricing adjustments. Using such information, retailers can determine (1) how efficiently a store is being merchandised, (2) quality of produce being received by consumers, and (3) ability to understand price elasticity of quality of its consumers. Such information can also be used by the retailer to optimize their business.

Moreover, the disclosed technology provides for improving accuracy of produce quality and pricing assessments using machine learning trained models and non-invasive analysis of volatiles released by the produce. Volatiles and other compounds released by the produce can be captured and analyzed using the disclosed technology to determine a shelf life and other quality metrics of that produce. Such determinations can then be used to predict future quality of the produce and appropriate discounts and/or pricing adjustments to be made upstream in the supply chain. The determinations can be made in the beginning of the supply chain before the produce is put on shelves for sale in grocery stores. Volatile assessments can therefore improve accuracy in predicting quality of the produce early on in the supply chain to provide accurate information to consumers about the produce they can purchase upstream in the grocery stores.

As another example, produce shelves and/or bins can be retrofitted with sensors collecting information about volatiles and other compounds released by produce placed therein. Different sensors can be used and configured to detect different volatiles emitted by the produce. Moreover, an array of sensors can be used that can have one or more sensors for each volatile or compound of interest. Such an array can beneficially provide for accurate volatile/compound collection. Such produce shelves and/or bins can be deployed in grocery stores at a low cost to the grocery stores. These produce shelves and/or bins can provide for accurate and real-time collection of volatiles and compounds released by the produce, which can be assessed using the disclosed technology in order to determine current quality of the produce and future quality of the produce. Furthermore, grocery stores can install produce shelves and/or bins that are manufactured with the sensors to perform the techniques described throughout this disclosure.

The disclosed technology also provides for generating a robust set of models trained with machine learning techniques to assess different quality metrics of different types of produce. Each model can be trained with a robust training dataset to accurately determine current and predict future quality metrics of particular produce types. During real-time assessment of produce, one or more models can be selected based on the type of produce and applied to accurately and non-invasively assess the produce and determine upstream supply chain modifications for that produce.

The details of one or more implementations are set forth in the accompanying drawings and the description below. Other features and advantages will be apparent from the description and drawings, and from the claims.

BRIEF DESCRIPTION OF THE DRAWINGS

FIG. 1D is a side view of the produce bin of FIG. 1C.

FIG. 5D is a conceptual diagram for determining produce pricing based on quality assessments of the produce in their respective bins.

DETAILED DESCRIPTION

Figure 1A:
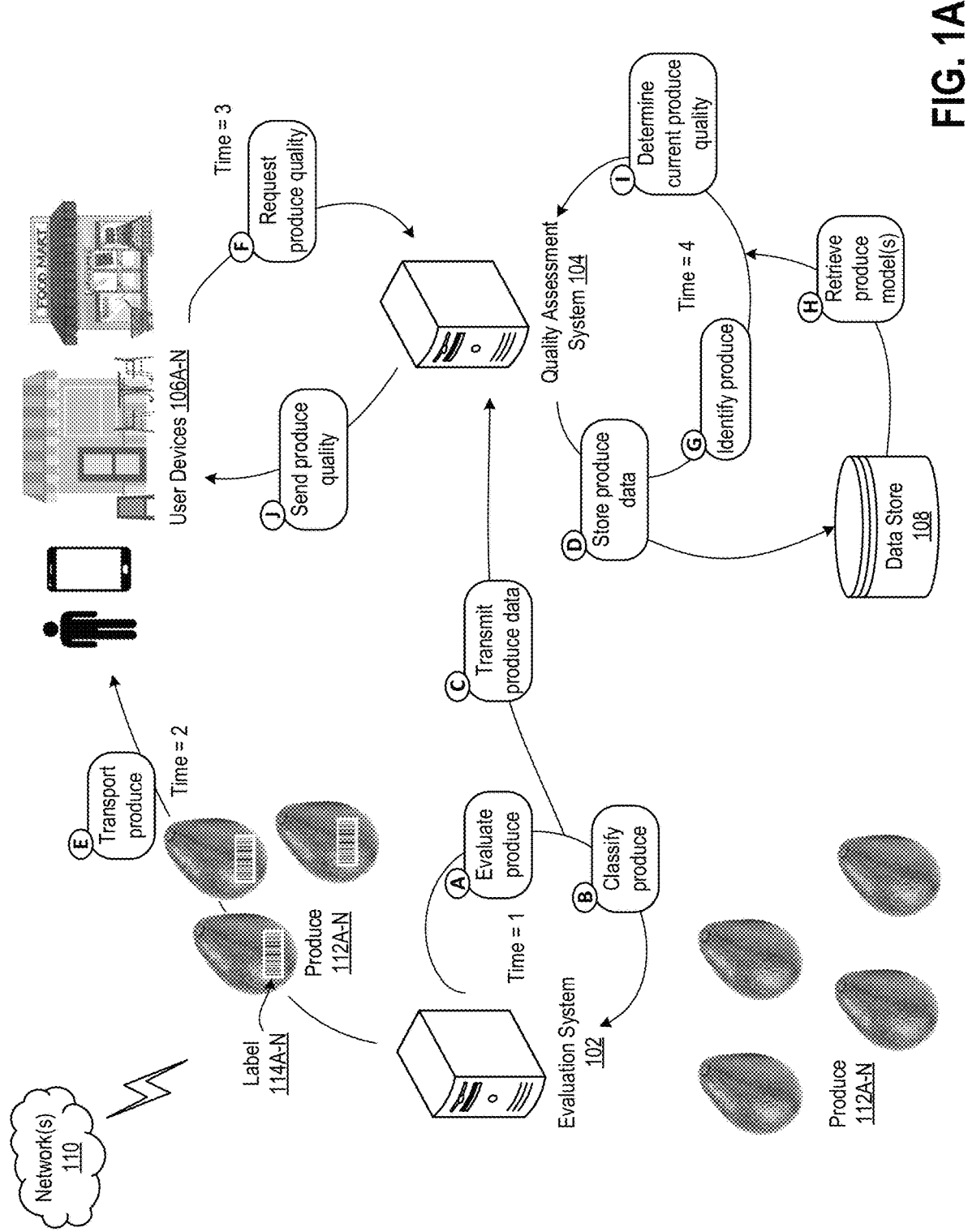
FIG. 1A is a conceptual diagram of dynamically determining produce quality.

The present disclosure describes systems, methods, and computer programs for assessing and dynamically determining produce metrics, such as metrics indicating the quality of produce and appropriately pricing the produce. Produce quality can be dynamically assessed in real-time by leveraging stored data about the produce and produce models. The disclosed technology can provide for a user to scan produce and receive, from a computing system, information about quality and pricing of the produce. The user can take an image of the produce using a device, such as a mobile phone, laptop, camera, and/or tablet. Sometimes, the image may include the produce without a label or other product identifier that is associated with the produce. Sometimes, the image may include the produce with the label or other product identifier.

For example, a 1D/2D barcode can be used, which can be included on a sticker, printed directly onto produce, and/or laser etched. This barcode could be read by an optical scanning device, such as a mobile phone camera or a cash register. A color barcoded system can also be employed, which can use a geographic arrangement of colors to encode a unique identifier for the produce. This unique identifier can be determined by optical recording and decoding.

The information returned to the user can include an amount of time until the produce will be at peak ripeness. The information can include a current price of the produce, a discount based on the produce's current quality, and/or a discount based on the produce's projected quality in a certain amount of time. The price of the produce can be adjusted based on the determined or projected quality of the produce. For example, produce that is ripe or passing peak ripeness can be priced less expensive than produce that is reaching peak ripeness or is almost ripe. This can incentivize consumers to purchase the less expensive, lowed quality produce first. As a result, the produce of lower quality (e.g., currently ripe or passing peak ripeness) can be purchased, thereby reducing product-based waste. This can also increase perceived quality of the produce on a display shelf and/or a produce department. Moreover, since the returned information can indicate current and/or projected quality of the produce, the user may not have to manually or visually inspect the produce before deciding to purchase it. For example, the user may not have to squeeze the produce or perform other destructive measurements to assess produce quality.

In some implementations, a retailer can place a non-destructive measurement system next to a bin of produce in a store. The device or system can continuously monitor quality (e.g., freshness, ripeness, etc.) of the produce in the bin and adjust price of the produce accordingly. As a result, the produce may not have to be labeled or stamped with product identifiers. Moreover, this non-destructive measurement system can be used to measure days of shelf life remaining and/or quality as well as print out and/or display a coupon based on the system's determinations. The system's determinations and measurements can also be used to train predictive quality and pricing models that can be used. Additionally, the non-destructive measurement system can be advantageous such that employees at the store do not need to collect and manage data. Labor costs can be reduced. Data collected by the system can be used to increase accuracy and prediction algorithms and models. In some implementations, the non-destructive measurement system can be implemented in multiple locations along the supply chain, such as at distribution centers, storage facilities, etc. The non-destructive measurement system can include one or more sensors positioned around the bin of produce in the store. The sensors can be attached to a shelf holding the bin of produce. The sensors can also be attached to the bin holding the produce. In some implementations, the bin can be manufactured with the sensors attached thereto or integrated therein. The sensors can be configured to detect volatiles and other compounds emitted by the produce. The signals collected by the sensors can then be transmitted to a computer system that can assess the collected signals to determine quality metrics of the produce in the bin. The computer system can apply one or more machine learning trained models to the collected signals to assess quality of the produce. Based on the quality assessment, the computer system can determine one or more supply chain modifications/adjustments, as described herein.

In some implementations, a grocer can scan produce at a POS terminal. Based on information associated with the scanned produce, the POS terminal, and/or a computing system in communication with the POS terminal, can determine and/or adjust a price of the produce. The grocer can therefore automatically provide a consumer with a discount on the produce, depending on the current quality of the produce. In some implementations, when a unique identifier (e.g., label, barcode, QR code, SKU, etc.) is scanned by a consumer (e.g., shopper), the computing system can identify a coupon associated with the identifier, which can be scanned at the POS terminal or cash register. Once scanned, the consumer can receive a discount for the produce at time of checkout. In some implementations, a produce department can have a printer that prints out coupons that can be redeemable for produce with certain uniquely identifying elements. For example, the printer can print out a coupon for produce with stickers that have a certain range of unique identifiers.

Referring to the figures, FIG. 1A is a conceptual diagram of dynamically determining produce quality. As shown in FIG. 1A, one or more computer systems, servers, and devices can be used to evaluate produce 112A-N and determine produce quality metrics (e.g., ripeness metric, freshness metric, taste metric, sweetness metric) at different times during a supply chain lifecycle of the produce 112A-N. An evaluation system 102, a quality assessment system 104, user devices 106A-N, and a data store 108 can communicate (e.g., wired and/or wireless) via network(s) 110. In some implementations, systems 102 and 104 can be a same computing system or server.

Some of the produce 112A-N can include product identifiers 114A-N, such as labels, stickers, stamps, barcodes, SKUs, and QR codes. For example, some of the produce 112A-N can be initially scanned and labeled with the labels 114A-N upon arriving at a distribution center in the supply chain. The labels 114A-N can also be added at a packing house as part of a process for packaging the produce 112A-N. The labels 114A-N can also be added after the produce 112A-N are coated in ripening agents/treatments. In some implementations, one or more of the produce 112A-N may not be labeled or otherwise identified at the distribution center and/or before being delivered to users at the user devices 106A-N.

The user devices 106A-N can be used by a plurality of different types of users. For example, the users can include consumers (e.g., shoppers), grocers, grocery store employees, chefs, restaurant employees, and other relevant stakeholders in the supply chain for the produce 112A-N.

The evaluation system 102 can be configured to perform initial evaluation of the produce 112A-N. The quality assessment system 104 can be configured to dynamically determine current quality information about the produce 112A-N at a time that is later than a time that the evaluation system 102 performs the initial evaluation. The data store 108 can be configured to store data about the produce 112A-N that is evaluated by the evaluation system 102. The data store 108 can be made of multiple data stores. For example, as described throughout this disclosure, one or more data stores can be used for storing information about the produce 112A-N and models for predicting produce quality metrics. In some implementations, the data store 108 and any data stores described throughout this disclosure can be immutable ledgers. The immutable ledgers can be advantageous to establish trust with consumers and other relevant stakeholders in the supply chain.

As shown in FIG. 1A, at time=1, the evaluation system 102 can evaluate the produce 112A-N (step A) and label the produce 112A-N with the labels 114A-N (step B). Evaluating the produce 112A-N (step A) can include generating information and/or predictive models for the produce 112A-N. The generated information can be stored in the data store 108 and used by the quality assessment system 104 to more accurately assess quality of the produce 112A-N at a later time.

As an example, the evaluation system 102 can receive image data of the produce 112A-N and determine, based on an evaluation of the image data, quality features and/or quality scores for the produce 112A-N represented in the image data. The image data can include hyperspectral images, associated metadata, x-rays, RGB models, etc. For example, an imaging device can be configured to continuously capture the image data of the produce 112A-N as it is moved along a conveyor belt in a distribution center to one or more storage locations or other destinations within distribution center. As another example, the image data can be captured by a relevant stakeholder in the supply chain, using a device such as the user device 106A-N.

In some implementations, the evaluation system 102 can also receive destructive measurements of the produce 112A-N. The destructive measurements can be modeled and correlated with non-destructive measurements, such as the image data, in order to identify different quality features of the produce 112A-N. The destructive measurements can include penetrometer data and/or durometer data. The destructive measurements can be advantageous when the produce 112A-N has low enough variability in quality.

Models can be generated and trained using machine learning techniques (e.g., convolution neural networks) to process the image data and determine quality features and scores. Different quality features can be modeled and determined based on produce and/or produce type. Example quality features can include color, firmness, ripeness, size, shape, crunchiness, flavor, sweetness, moisture content, taste profile, likelihood of molding, nutrient content, use of pesticides, bruising, rotting, and desiccation.

For example, when evaluating the produce 112A-N (step A), the evaluation system 102 can receive the image data including histograms, RGB color models, hyperspectral data, multispectral data, etc. The image data can include images of a particular produce having some particular feature to be modeled, such as rot and desiccation, and images of the same type of produce that does not have the particular feature to be modeled. In some implementations, the image data can include images of an exterior of the produce and/or an interior of the produce. In some implementations, the image data can include images of a particular produce at different stages of ripeness and between stages of ripeness. The image data can be a robust collection of training data indicating a plurality of different features that may exist for the particular produce throughout the produce's lifecycle. The system 102 can then identify features of the produce 112A-N from the image data. Such features can be indicative of quality of the produce 112A-N. The identified features can then be labeled. The system 102 can generate machine learning trained models for each of the identified features. The models can be trained to detect the features to assess overall quality of the produce 112A-N at a later time (e.g., when the produce 112 is at a store and a consumer requests to know the current quality of one or more of the produce 112A-N). The generated models can be stored in the data store 108 and accessed at the later time by the quality assessment system 104.

As an illustrative example, test image data can be received of limes (e.g., the produce 112A-N). Using segmentation and analysis techniques, desiccation can be a feature identified by the evaluation system 102 as an indicator of lime quality. Image data of the limes that show signs of desiccation can be labeled as desiccated while image data of the limes that do not show signs of desiccation can be labeled as good limes. Using a convolution neural network (CNN), a lime desiccation model can be trained to differentiate image data showing desiccation from image data that does not show desiccation. For example, the model can be trained to analyze each patch and/or pixel in image data to see whether a lime is present, and if the lime is present, whether the lime appears to show signs of desiccation or not, based on the labeled test image data. If the lime appears to show signs of desiccation, the model can be trained to tag or otherwise classify/label the lime in the image data as desiccated, which can result in the lime being classified as having poor quality. The model can also be trained to tag the lime with other descriptors for desiccation, including but not limited to numeric values, Boolean values, and/or string values.

Still referring to FIG. 1A, once the produce 112A-N is evaluated (step A), the evaluation system 102 can classify the produce 112A-N (step B). In other words, the labels 114A-N can be generated for the produce 112A-N and used to identify the produce 112A-N. The labels 114A-N can then be attached to or associated with the produce 112A-N. Classifying the produce 112A-N can also include identifying and referencing a code that is already placed on the produce 112A-N or packaging of the produce 112A-N. The evaluation system 102 can also transmit the produce data (e.g., information, models, features, etc. that were determined when evaluating the produce 112A-N in step A) to the quality assessment system 104 (step C). In some implementations, the quality assessment system 104 can store the produce data in the data store 108 (step D).

At time=2, the labeled produce 112A-N can be transported to users (step E). For example, the produce 112A-N can be transported to grocery stores, restaurants, markets, etc. Time=2 can be a time that is later than time=1. In some implementations, time=2 can be a same time as time=1.

At time=3, one or more users at the user devices 106A-N can request produce quality information (step F). For example, as described further below, a consumer can scan the label 114A of the produce 112A at the grocery store. Once the label 114A is scanned at the user device 106A, the user device 106A can transmit a request to the quality assessment system 104 to receive information about a current quality of the produce 112A. Time=3 can be a later time than time=1, when the produce 112A is first evaluated.

At time=4, the quality assessment system 104 can identify the produce 112A (step G) and determine current quality of the produce 112A (step I). Time=4 can be the same time as time=3. Time=4 is later than time=1. The quality assessment system 104 can identify the produce 112A using object recognition techniques. For example, the request for produce quality metrics can include image data or other data captured by the user device 106A of the produce 112A. Using object recognition techniques, the system 104 can isolate the produce 112A and/or the label 114A in the image data. The system 104 can then decode the label 114A in order to identify the produce 112A. Using the decoded information, the system 104 can retrieve model(s) associated with the produce 112A from the data store 108 (step H). The model(s) can be generated by the evaluation system 102 at time=1 and used to assess and predict current quality of the produce 112A.

Figure 1B:
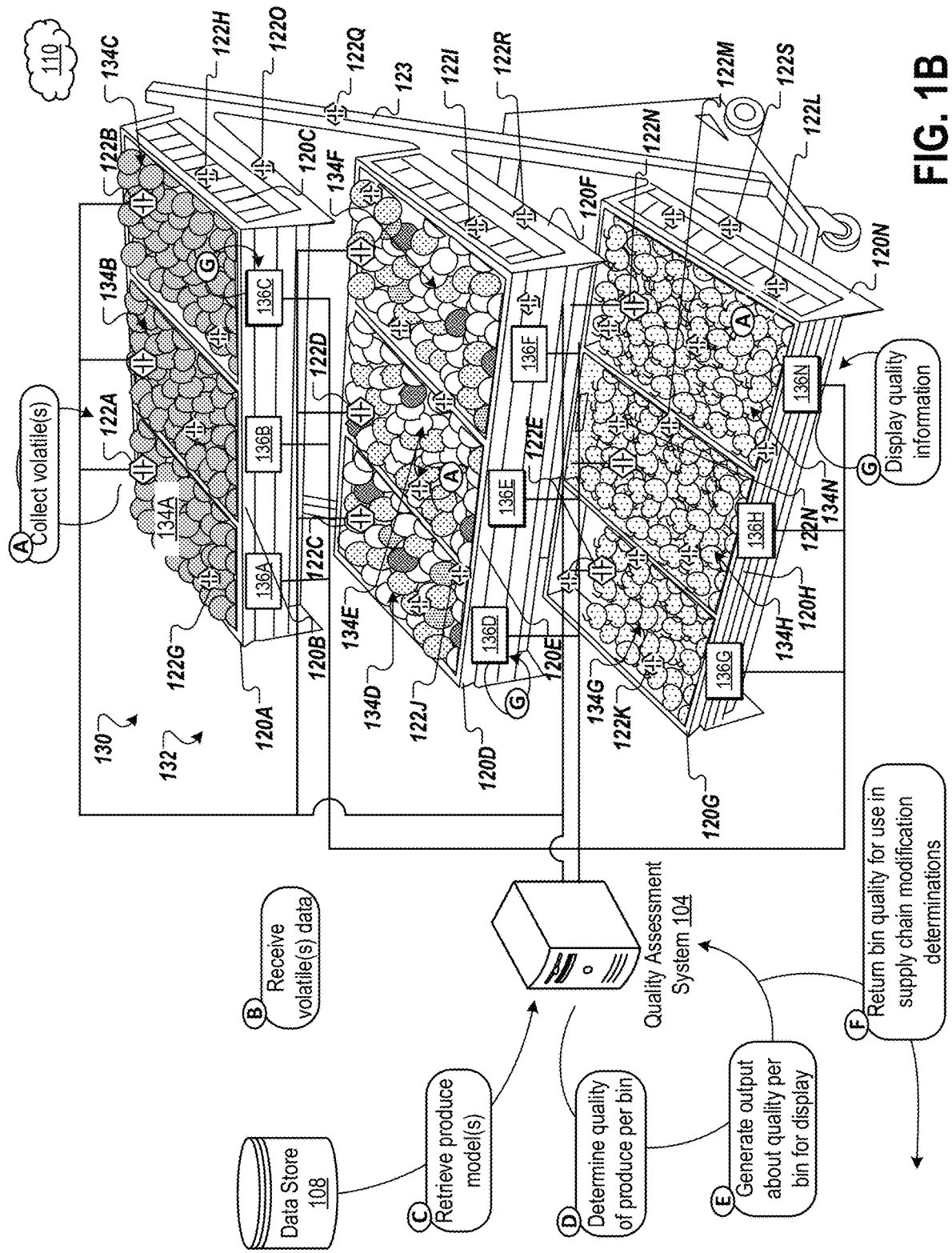
FIG. 1B is a conceptual diagram of a produce display system for determining and presenting produce quality information to users in a store.

Using the retrieved model(s), the quality assessment system 104 can determine the current quality of the produce 112A (step I). The system 104 can also determine the current quality of the produce 112A based on additional information that can be retrieved from the data store 108 and/or received from one or more other computer systems, devices, servers, and/or data stores. For example, the current quality can further be determined based on historical information of the produce 112A throughout the supply chain, geographic information about where the produce 112A was initially evaluated and/or where the produce 112A was scanned by the user device 106A, and other supply chain information. As another example, the current quality of the produce 112A, or a batch of the produce 112A-N, can be determined based on collecting and analyzing volatiles and/or other compounds that are released by the produce 112A. As described in reference to FIGS. 1B-F, the volatiles and other compounds released by the produce 112A can be measured by sensors positioned near the produce 112A. The sensed volatiles and compounds can be transmitted to the quality assessment system 104 to be processed. The system 104 can, for example, apply one or more machine learning trained models to the sensed volatiles and other compounds to determine the current quality of the produce 112A and predict a ripeness curve of the produce 112A and/or future quality, ripeness, or other characteristics of the produce 112A. As described above, the system 104 can retrieve one or more models that correspond to the type of produce 112A and/or particular quality features to be assessed and modeled. For example, the system 104 can retrieve an avocado ripeness model, an avocado taste model, an avocado firmness model, and/or an avocado odor/smell model. One or more other models can be retrieved that are specific to the type of produce 112A and/or particular quality features to be assessed and modeled. Refer to FIG. 1B for additional discussion about determining the current quality of produce based on assessing volatiles and other compounds released by the produce.

The system 104 can then transmit the current quality of the produce 112A to the requesting user device 106A. As depicted and described, the system 104 can dynamically process the request for produce quality metrics at some later time after initial evaluation of the requested produce by the evaluation system 102. Thus, the quality assessment system 104 can serve current, real-time quality information about the produce 112A to the requesting user device 106A based on a robust set of data and models that are associated with the produce 112A.

FIG. 1B is a conceptual diagram of a produce display system 132 for determining and presenting produce quality information to users in a store 130. The system 132 includes produce bins 120A-N arranged on a support structure 123. The support structure 123 can be shelves, racks, or another structure for supporting one or more produce bins 120A-N on display in the store 130. The support structure 123 can be moveable such that the produce bins 120A-N can be moved and/or arranged in a different display/configuration in the store 130. In some implementations, the support structure 123 can be in a stationary position in the store 130 and the produce bins 120A-N can be swapped out and/or moved to different support structures 123 in the store 130.

The produce bins 120A-N, as described further in FIGS. 1C-F, can be configured to contain one or more different types of produce 134A-N. For example, the produce bin 120A contains oranges as the produce 134A. The produce bin 120D contains green apples as the produce 134D. As another example, the produce bin 120G contains tomatoes as the produce 134G. One or more other types of produce 134A-N can be contained in the produce bins 120A-N. The produce 134A-N can include, but is not limited to, apples, citrus, berries, melons, peppers, tomatoes, leafy produce, fruits, vegetables, legumes, nuts, flowers, processed food items, candy, vitamins, nutritional supplements, and the like.

The produce bins 120A-N can be any type of bin, container, crate, box, or other structure for holding a quantity of produce 134A-N. The produce bins 120A-N can be configured/attached to the support structure 123 of the produce display system 132. The produce bins 120A-N can also be placed in/on the support structure 123 and moveable to other positions in the support structure 123 or other support structures 123. For example, the produce 134A-N can be transported for a storage facility or a farm to the store 130 in their respective produce bins 120A-N. These produce bins 120A-N can then be arranged in/on the support structure 123 of the produce display system 132 when the produce bins 120A-N are brought into the store 130. Therefore, the produce 134A-N can be moved through the supply chain in the same produce bins 120A-N.

As described further in reference to FIGS. 1C-F, each produce bin 120A-N can include an array of sensors 122A-N. The sensors 122A-N can be configured and/or retrofitted to existing produce bins 120A-N. In some implementations, the produce bins 120A-N can be manufactured with the array of sensors 122A-N integrated therein. The sensors 122A-N can be configured to detect one or more different types of compounds or volatiles emitted from the produce 134A-N in the respective produce bin 120A-N. Each of the arrays of sensors 122A-N (or individual sensors) can be configured to detect different types of compounds and/or concentrations of compounds based on the type of produce contained in the respective produce bins 120A-N. In some implementations, an array of sensors can have one or more sensors configured to detect each of the volatiles or other compounds of interest. As an illustrative example, a produce bin containing avocados can include sensors 122A-N configured to detect threshold quantities of total volatile organic compound (TVOC) and odor released by the avocados whereas a produce bin containing apples can include sensors 122A-N configured to detect different threshold quantities of esters, alcohols, aldehydes, terpenoids, or other types of compounds released by apples.

Some of the sensors 122A-N can also be positioned above or around the produce bins 120A-N. For example, a sensor 122A-N can be positioned a predetermined distance above a produce bin 120A-N. The sensor can be positioned between 1 to 6 inches away from the produce bin. As another example, the sensor can be positioned 2 inches above the produce bin, 5 inches about the produce bin, 8 inches above the produce bin, 10 inches above the produce bin, etc. IN some implementations, multiple sensors can be positioned around the produce bin at the predetermined distance. For example, a sensor can be positioned the predetermined distance away from each side of the produce bin and/or a bottom of the produce bin and/or a top of the produce bin. One or more of the sensors 122A-N can also be positioned/attached to the support structure 123 of the produce display system 132. One or more of the sensors 122A-N can also be embedded into the support structure 123 and/or the produce bins 120A-N of the produce display system 132.

Each produce bin 120A-N also includes respective displays 136A-N for presenting information about the produce 134A-N in the respective produce bins 120A-N. Examples of the displays 136A-N include displays capable of receiving information electronically and presenting the information, such as a liquid crystal display (LCD) or light emitting diode (LED) display. The displays 136A-N can be attached to the respective produce bins 120A-N and can be dynamically updated to present current information about the produce 134A-N. For example, and as described further herein, the displays 136A-N can present information such as a name of the produce 134A-N, discounts, prices, or offers associated with the produce 134A-N, and quality metrics associated with the produce 134A-N (e.g., whether the produce 134A-N is ripe, ready to be eaten, sweet, tart, reaching peak ripeness, juicy, etc.). In some implementations, one or more of the displays 136A-N can be attached or otherwise configured to the support structure 123 of the produce display system 132 described herein.

Still referring to FIG. 1B, components of the produce bins 120A-N, such as the displays 136A-N and the sensors 122A-N are in electronic communication (e.g., wired and/or wireless) with the quality assessment system 104. The sensors 122A-N can collect volatiles or other compounds released by the produce 134A-N in the respective produce bins 120A-N (step A). As described herein, each of the sensors 122A-N can be configured to detect different volatiles or other compounds. A group of sensors can also be configured to detect a same volatile of interest. Each group of sensors can detect a different volatile (or other compound) of interest.

The volatiles or compounds can be collected in batch and then transmitted to the quality assessment system 104 (step B). In some implementations, the volatiles or compounds can be collected in real-time and transmitted to the system 104 (step B). The system 104 can receive the volatile or other compound data (step B). The system 104 can also retrieve produce models from the data store 108 (step C). The system 104 can determine which produce models to retrieve based on a type of the produce 134A-N corresponding to the received volatiles or other compound data. The system 104 can also determine which produce models to retrieve using the techniques described throughout this disclosure.

The quality assessment system 104 can apply the retrieved model(s) to the volatiles or other compound data to determine quality of the produce 134A-N in the particular produce bin 120A-N (step D). For example, the system 104 can receive TVOC data from the sensors 122A and 122G in/around the produce bin 120A. The TVOC data can correspond to oranges (the produce 134A). The system 104 can retrieve one or more models in the data store 108 that are associated with determining quality metrics of oranges. For example, the system 104 can retrieve a model that determines juiciness of the oranges, another model that determines sweetness or tartness of the oranges, and another model that determines shelf life of the oranges. The system 104 can then determine features/quality metrics such as juiciness, sweetness, and shelf life of the oranges based on applying the retrieved models to the received TVOC data. The system 102 can determine the quality metrics for all the produce in a particular bin.

The quality assessment system 104 can then generate output about the quality of the produce 134A-N per respective produce bin 120A-N (step E). The output can be transmitted to the respective displays 136A-N of the produce bins 120A-N. The displays 136A-N can then display the output, such as quality information, about the respective produce 134A-N (step G). Since the displays 136A-N are individually controlled by the quality assessment system 104, the displays 136A-N can be updated independently of each other to reflect information about the particular produce 134A-N contained in the respective produce bins 120A-N.

In some implementations, the output can be transmitted to one or more other devices and/or computing systems. For example, the output can be quality information about the produce 134A-N in the respective produce bins 120A-N, which can be transmitted to and presented in a mobile application at a user device of a consumer in the store 130. Refer to FIGS. 13-16 for additional discussion about the quality information that can be presented at user devices.

In some implementations, the output can include quality of the produce 134A-N in the respective produce bin 120A-N, which can be returned for use in supply chain modification determinations (step F). For example, the output can be transmitted to the pricing system 202 described in FIG. 2, which can use the output to determine price adjustments, discounts, and/or special offers for the respective produce 134A-N. The output can also be transmitted to a POS terminal, such as the POS terminal 302 described in reference to FIG. 3. The POS terminal can then correlate the quality of the respective produce 134A-N with price adjustments during a checkout process for items including the respective produce 134A-N. The output can be transmitted to one or more other computing systems and/or devices for use in supply chain modifications, as described throughout this disclosure.

Sometimes, steps A-G may be performed for only some of the produce 134A-N in some of the produce bins 120A-N. For example, volatiles can be collected at each of the produce bins 120A-N at different times or during different time intervals. The quality assessment system 104 may perform the steps B-F for produce whose volatiles are collected during a first period of time, then perform the steps B-F for produce whose volatiles are collected during a second period of time. The system 104 can also generate output accordingly to be presented at the displays 136A-N of the produce bins 120A-N for which volatiles are collected and analyzed.

In some implementations, the store 130 can include one or more gas chromatography machines or systems. Such machines or systems can be in communication with components of the produce bins 120A-N, such as the sensors 122A-N and the displays 136A-N. The volatiles collected by the sensors 122A-N can be transmitted to a gas chromatography machine in the store 130, which can process the volatiles and generate the volatiles data. The volatiles data can then be analyzed by the quality assessment system 104 that applies the one or more machine learning trained models described herein. In some implementations, the volatiles can be transmitted directly to the system 104, as described above. The system 104 can then analyze the volatiles according to the techniques described herein.

Figure 1C:
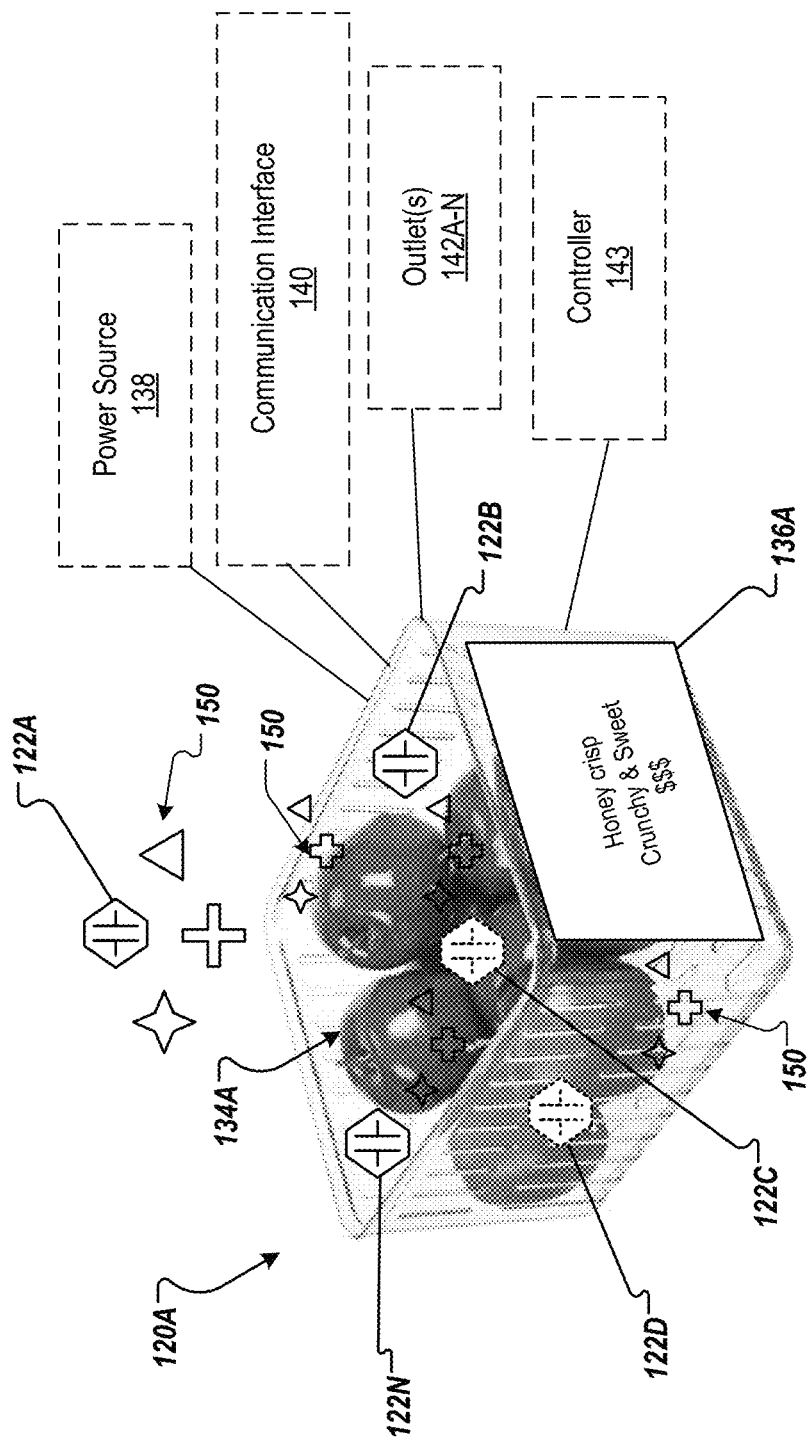
FIG. 1C is a perspective view of a produce bin that is used to perform the techniques described herein.

FIG. 1C is a perspective view of a produce bin 120A that is used to perform the techniques described herein. The produce bin 120A can be used, in combination with the machine learning techniques described herein, to determine quality metrics of a batch of the produce 134A contained in the produce bin 120A. For example, an average quality score of the produce 134A can be determined using the disclosed techniques. The average quality score can then be used to determine information about the quality of the produce 134A to be dynamically presented/outputted and updated on the display 136A of the produce bin 120A. In some implementations, as described further in reference to FIGS. 5A-D, the average quality score can also be used to determine how to sort the produce 134A in the produce bin 120A and/or how to sort the produce bin 120A in relation to other produce bins in a produce display system in a store.

As shown and described herein, the produce bin 120A can include an array of sensors 122A-N. The sensors 122A-N can detect presence and/or amount of one or more volatiles or other compounds 150 emitted by the produce 134A. The produce bin 120A may optionally include a power source 138, a communication interface 140, and/or outlets 142A-N. The power source 138 can be a battery. The power source 138 can also be a solar panel. The power source 138 can be rechargeable and/or replaceable. The power source 138 can provide a power supply to components of the produce bin 120A, such as the sensors 122A-N, the display 136A, the communication interface 140, and/or the outlets 142A-N. The communication interface 140 can provide communication (e.g., wired and/or wireless) between components of the produce bin 120A and the computer systems described throughout this disclosure (e.g., the quality assessment system 104). The outlets 142A-N can be configured to connect to external power supplies, which can provide power to the components of the produce bin 120A. One or more of the components 122A-N, 136A, 138, 140, and 142A-N can be integrated or embedded into the produce bin 120A. One or more of the components 122A-N, 136A, 138, 140, and 142A-N can also be retrofitted to existing produce bins in a store or in a supply chain.

The sensors 122A-N can include metal oxide sensors. In some implementations, the sensors 122A-N can include infrared sensors. The sensors 122A-N may also include gas chromatograph sensors and/or a photoionization detectors (PID). In general, PIDs emit light (e.g., ultraviolet light), which can disrupt the compounds 150 into positive and negative ions. The positive and negative ions can be detected by the sensors 122A-N, which may indicate presence of the parent volatile compound 150. Metal oxide sensors use a metallic film to detect compounds 150, which may include benzene, ethanol, toluene, etc. One or more other types of sensors can be used that collect different types of volatiles or other compounds released by the different types of produce described throughout this disclosure. For example, one or more of the sensors 122A-N can be an electronic nose, with any combination of sensors described herein (e.g., refer to FIGS. 19A-D). The electronic nose can have a combination of sensors including but not limited to a nanocomposite sensor, electromechanical sensor, metal oxide semiconductor, photoionization sensor, and/or non-dispersive infrared sensor (NDIR). In some implementations, the sensors 122A-N can be any other type of sensor that is not part of an electronic nose, such as a nanocomposite sensor, electromechanical sensor, metal oxide semiconductor, photoionization sensor, and/or NDIR sensor.

The sensors 122A-N can be positioned along walls of the produce bin 120A (e.g., side walls, front wall, and/or back wall). The sensors 122A-N can also be positioned on an interior bottom of the produce bin 120A. The placement of multiple sensors 122A-N throughout the produce bin 120A can provide for accurate collection of volatiles and other compounds that are emitted by the produce 134A inside the produce bin 120A. For example, placement of the sensors 122A-N along the interior bottom of the produce bin 120A can be beneficial to ensure the sensors 122A-N are in close contact with the produce 134A and closer to volatiles and other compounds released by the produce 134A. As a result, the sensors 122A-N can more accurately capture larger and more concentrated quantities of the volatiles and other compounds emitted by the produce 134. In some implementations, vacuum systems can be used to pull air across the sensors 122A-N so that the emitted volatiles or compounds are routed towards the sensors 122A-N. Refer to FIGS. 19A-D for additional discussion about this configuration with a vacuum system.

The array of sensors 122A-N can also be embedded in the produce bin 120A to filter out certain volatiles or other compounds that may block into or around the produce bin 120A from other produce in other produce bins. Since some volatiles emitted by the produce 134A are less dense and may rise, some of the sensors 122A-N can be positioned near a top of the produce bin 120A. Since some volatiles emitted by the produce 134A may be more dense and thus may not rise as much if at all, some of the sensors 122A-N can be positioned near the bottom of the produce bin 120A.

Some of the sensors 122A-N can be configured to detect and transmit volatiles and other compounds in real-time to one or more computing systems described herein (e.g., the quality assessment system 104). Sometimes, the sensors 122A-N can collect volatiles until a predetermined/threshold quantity of volatiles are collected. Once the predetermined/threshold quantity of volatiles is collected, the collected can be transmitted to the computing systems described herein. In some implementations, volatiles can be collected on a material in or near the produce bin 120A. Once the predetermined/threshold quantity of volatiles is collected on the material, the material can be automatically heated up to a predetermined temperature at fixed time intervals in order to release the concentration of volatiles into the sensors 122A-N. As a result, the sensors 122A-N can collect a concentrated and accurate reading of the volatiles released by the produce 134A in the produce bin 120A over a certain period of time. Such a technique can be referred to as thermal absorption.

Moreover, the power source 138, communication interface 140, and/or outlets 142A-N can be configured to the back wall, side walls, and/or bottom of the produce bin 120A so as to not interfere with collection of volatiles and other compounds by the sensors 122A-N. The components 138, 140, and/or 142A-N can also be attached to or integrated into the produce bin 120A in locations that would not obstruct storage capacity of the produce bin 120A or interfere with a simple and aesthetic appearance of the produce bin 120A in the store.

Using machine learning trained models and the disclosed techniques, the compounds 150 can be correlated to one or more freshness states of the batch of produce 134A contained in the produce bin 120A. In some implementations, the compounds 150 can be correlated to other quality features/metrics of the produce 134A, such as their taste, ripeness, shelf life, sweetness, tartness, sourness, juiciness, odors, etc. Additionally, the compounds 150 emitted by the produce 134A varies based on a type of the produce 134A. For example, avocados can emit turbines, acids, aldehydes, and/or ketones during their lifecycle while other produce, such as apples or oranges, can emit esters, alcohols, benzene, and/or toluene. As another example, ripe produce may emit a high level of esters while unripe produce and may emit a lower level of esters.

The sensors 122A-N can be arranged and configured to detect different types of compounds based on the type of produce 134A contained in the produce bin 120A. As illustrative and non-limiting examples, avocado ripeness can be determined based on detection of one or more of the following aldehydes: acetaldehyde, hexanal, trans,-2-hexen-1-al, trans,trans-2,4-hexadienal, trans-2-nonenal, furfural, 2,4-heptadienal, and/or trans-2-decenal. As another illustrative and non-limiting examples, avocado ripeness can be determined based on detection of one or more of the following alcohols: Ethanol, hexanol, pentanol, and/or pentenol. As another illustrative and non-limiting examples, avocado ripeness can be determined based on detection of one or more of the following esters: Methyl acetate, ethyl acetate, methyl hexanoate, ethyl propionate, isoamyl acetate, ethyl butyrate, heptyl acetate, 3-heptyl acetate, ethyl 4-methylvalerate, and/or ethyl acetoacetate. As another illustrative and non-limiting examples, avocado ripeness can be determined based on detection of one or more of the following terpenes: limonene, myrcene, carvone, linalool, ionone, carveol, farnesol, pinene, guaiene, and/or cumene. As illustrative and non-limiting examples, avocado stem rot can be determined based on detection of one or more of the following terpenes: limonene, myrcene, carvone, linalool, ionone, carveol, farnesol, pinene, guaiene, and/or cumene. Similar compounds can also be detected in other food items (e.g., fruits, produce), including but not limited to mandarins, mangos, and apples. Detecting such compounds in mandarins and mangos can be used to determine off-flavor and/or fermentation qualities of such food items (e.g., when the food item is no longer good for consumption). Detecting such compounds in apples can then be used to determine quality differences across different varieties of apples.

In some implementations, as described further in reference to FIGS. 19A-D, the produce bin 120A can include one or more additional elements for directing more concentrated quantities of the compounds 150 towards the sensors 122A-N. These elements can include, but are not limited to, cones, probes, fans, and/or caps.

As described herein, the compounds 150 detected by the sensors 122A-N can be transmitted via the communication interface 150 to a computing system, such as the quality assessment system 104 of FIG. 1A for processing and analysis. In some implementations, the produce bin 120A can include a controller 143 configured to receive the collected compounds 150 (or data about the collected compounds 150) from the sensors 122A-N and determine one or more quality metrics of the produce 134A at the produce bin 120A and based on the collected compounds 150. The quality metrics can include freshness parameter values, such as a shelf life, ripeness, sweetness, tartness, flavor, juiciness, etc. of the produce 134A. The controller 143 of the produce bin 120A, or the quality assessment system 104 as described herein, can determine one or more supply chain modifications based on the freshness parameter values. The supply chain modifications can include a pricing adjustment, price discount, shelf life determination (e.g., current shelf life, remaining shelf life, etc.), ripeness curve (e.g., current ripeness, amount of time until peak ripeness, etc.), and/or shelf and/or bin sorting/arrangement suggestion. The controller 143 transmits one or more of the supply chain modifications to devices for display, such as the display 136A. The controller 143 can also transmit supply chain modifications to user devices, such as the user devices 106A-N of shoppers in a store. Thus, when a shopper looks up the produce 134A or scans the produce 134A with their device in the store, information indicating the freshness parameter values of that produce 134A can be presented in a mobile application at the device. As another example, price adjustments, discounts, remaining shelf life, and/or the ripeness curve determined for the produce 134A can be presented in the mobile application of the shopper's device. Refer to FIGS. 2 and 13-16 for additional discussion.

FIG. 1D is a side view of the produce bin 120A of FIG. 1C. The produce bin 120A has a front wall 144, a back wall 146 opposite the front wall 144, and a first side wall 148 connecting first edges of the front wall 144 and the back wall 146. In the example of FIG. 1D, sensors 122D and 122E can be configured, attached, and/or embedded to an interior side of the first side wall 148. Therefore, the sensors 122D and 122E can be in close contact with produce and/or compounds emitted by the produce contained in the produce bin 120A. One or more additional or fewer sensors can be attached to the interior side of the first side wall 148. Moreover, one or more of sensors can be attached closer to a top of the first side wall 148, a bottom of the first side wall 148, lateral sides of the first side wall 148, and/or a middle area of the first side wall 148. A same or similar arrangement of sensors can be configured on an opposite second side wall of the produce bin 120A (not depicted).

The display 136A can be attached to an outside surface of the front wall 144. The display 136A can also be integrated into the front wall 144. In some implementations, the display 136A can be retrofitted to an existing produce bin 120A using fastening elements such as nails, screws, bolts, adhesives, and/or magnets.

At least one sensor 122F can be attached and/or embedded to an interior side of the front wall 144. The at least one sensor 122F can be positioned anywhere along a length and/or height of the interior side of the front wall 144. In some implementations, the at least one sensor 122F can be part of or otherwise integrated into the display 136A.

At least one sensor 122N can be attached and/or embedded to an interior side of the back wall 146. The at least one sensor 122N can be positioned anywhere along a length and/or height of the interior side of the back wall 146. Moreover, the power source 138 and/or communication interface 140 can be attached to or embedded in the back wall 146 of the produce bin 120A. Although not depicted in FIG. 1D, the outlets 142A-N and/or the controller 143 described in FIG. 1C can also be attached to or embedded in the back wall 146 of the produce bin 120A. Any of the components 138, 140, 142A-N, and/or 143 can be configured to an interior side and/or an exterior side of the back wall 146. Any of the components 138, 140, 142A-N, and/or 143 can also be integrated into or otherwise attached to an interior bottom or an exterior bottom of the produce bin 120A so as to not interfere with usage of the interior of the produce bin 120A for containing produce. Therefore, any of the components 138, 140, 142A-N, and/or 143 are configured to the produce bin 120A in such a way to not interfere with use of the produce bin 120A as a container for produce and accurate collection of compounds released by the produce.

As mentioned above, the sensors 122A-N can be embedded into the walls 144, 146, and 148 of the produce bin 120A. The sensors 122A-N can also be attached to the walls 144, 146, and 148 using fastening elements such as nails, screws, bolts, adhesives, and/or magnets.

Figure 1E:
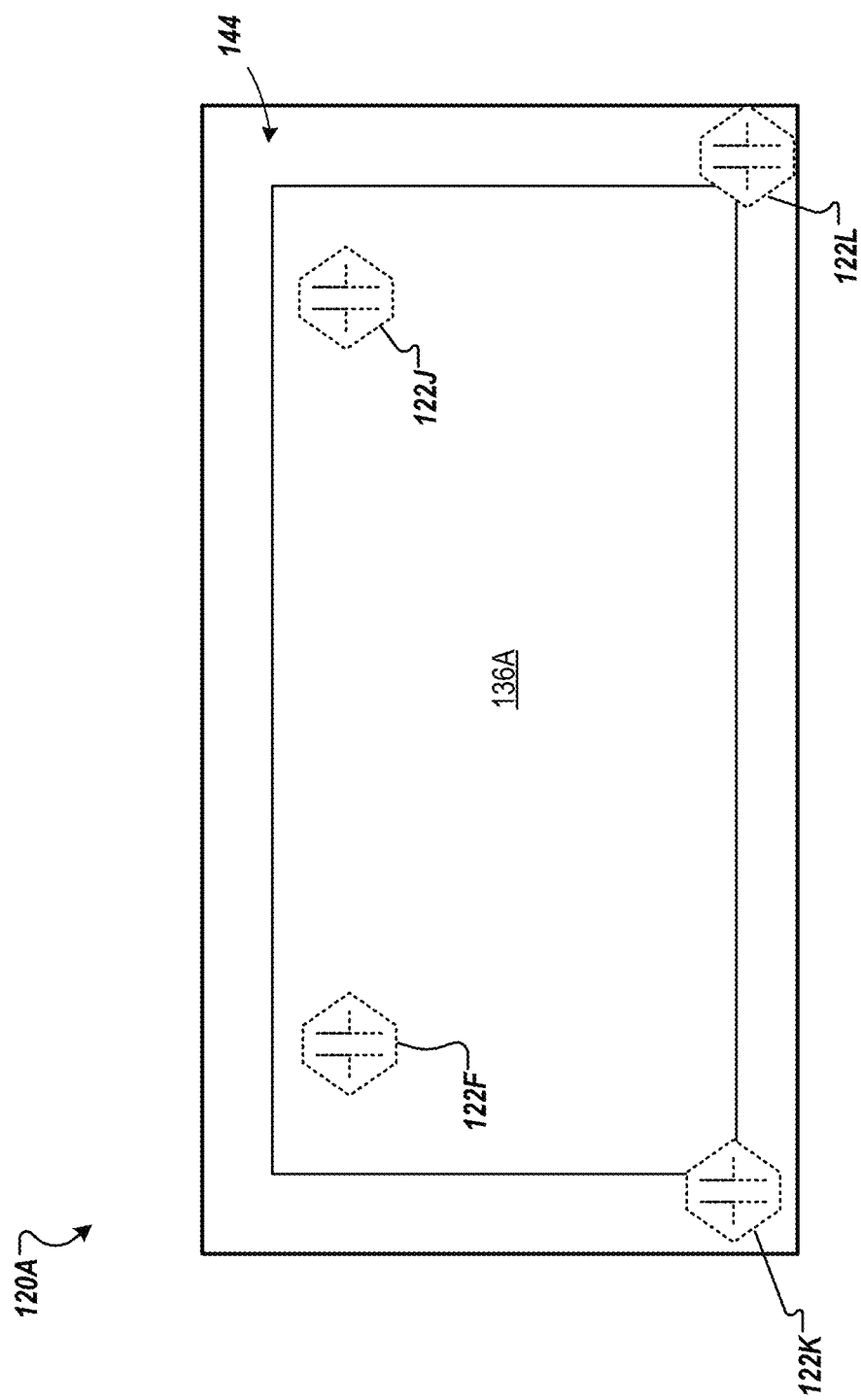
FIG. 1E is a front view of the produce bin of FIG. 1C.

FIG. 1E is a front view of the produce bin 120A of FIG. 1C. As shown in this view, the display 136A is attached to the exterior side of the front wall 144. Sensors 122F, 122J, 122K, and 122L can be attached to the interior side of the front wall 144. Any of the sensors 122F, 122J, 122K, and 122L can be attached to different locations on the interior side of the front wall 144. For example, attaching one or more sensors closer to a top of the interior side of the front wall 144 can be beneficial to identify and differentiate compounds released by produce in the produce bin 120A from compounds in the surrounding environment. One or more additional or fewer sensors can be attached to the front wall 144. Sometimes, one or more sensors can also be part of the display 136A. Therefore, fewer sensors may be attached, configured, or embedded to the front wall 144.

Figure 1F:
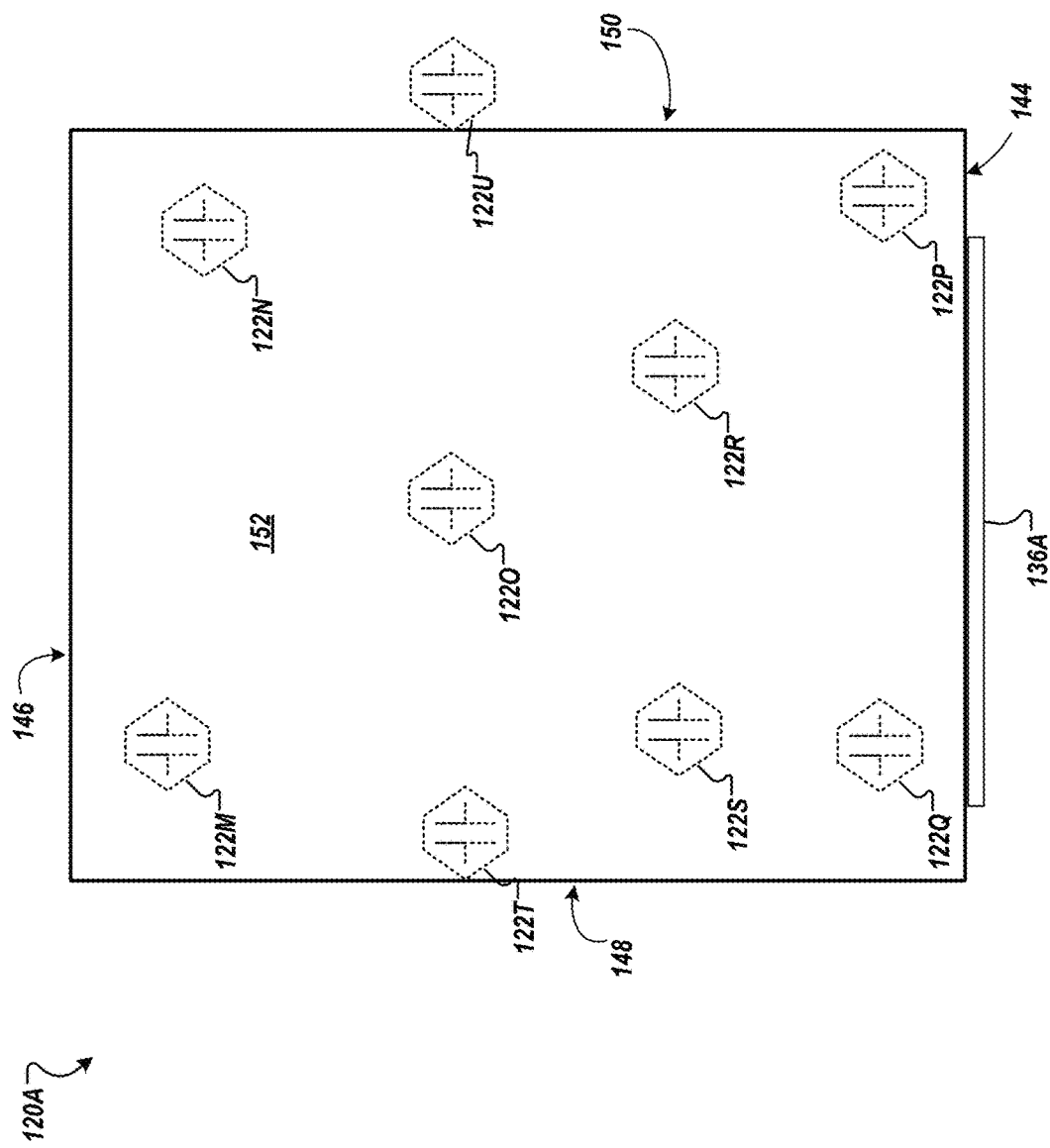
FIG. 1F is a top down view of the produce bin of FIG. 1C.

FIG. 1F is a top down view of the produce bin 120A of FIG. 1C. As shown and described herein, the produce bin 120A includes the front wall 144 with the display 136A attached thereto, the back wall 146, the first side wall 148, a second side wall 150 opposite the first side wall, and a bottom 152. At least the sensors 122T and 122U can be attached to the first and second side walls 148 and 150, respectively. One or more sensors can be attached to interior sides of the first and second side walls 148 and 150, the front wall 144, and the back wall 146. In some implementations, one or more sensors, such as the sensor 122U, can be attached to exterior sides of the first and second side walls 148 and 150, the front wall 144, and/or the back wall 146. Attaching sensors to the exterior sides of the produce bin 120A can be beneficial to differentiate between compounds released by produce inside the produce bin 120A and compounds floating around in the surrounding environment. Therefore, more accurate readings of compounds released by the produce inside the produce bin 120A can be detected and used to determine quality of the produce and/or supply chain modifications for the produce.

Moreover, as shown in FIG. 1F, sensors 122M, 122N, 122O, 122S, 122R, 122Q, and 122P can be attached to the bottom 152 of the produce bin 120A. One or more additional or fewer sensors can be configured to the bottom 152 of the produce bin 120A. Placement of the sensors on or near the bottom 152 of the produce bin 120A can be beneficial for more accurate and/or concentrated collection of compounds released by produce contained in the produce bin 120A.

Although FIGS. 1C-F are described in reference to the produce bin 120A, the same or similar configurations are applicable to all produce bins 120A-N described throughout this disclosure.

Figure 2:
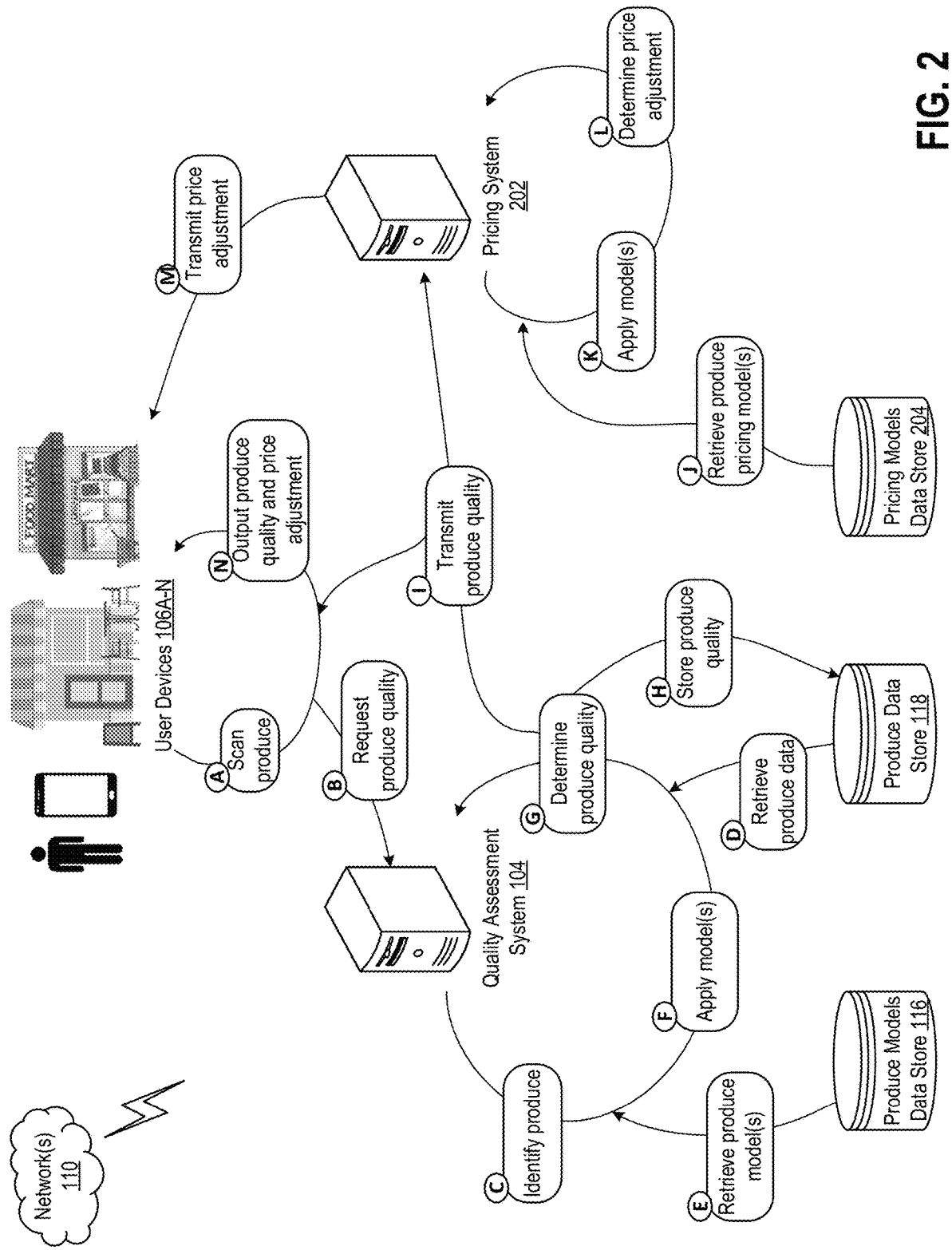
FIG. 2 is a conceptual diagram of dynamically determining produce pricing.

FIG. 2 is a conceptual diagram of dynamically determining produce pricing metrics (e.g., price, discounts, price increases, pricing categories). As shown in FIG. 2, one or more computer systems, servers, and devices can be used to determine current produce quality metrics and adjust a price of the produce based on the determined quality. The quality assessment system 104, user devices 106A-N, a pricing system 202, produce models data store 116, produce data store 118, and a pricing models data store 204 can communicate (e.g., wired and/or wireless) via the network(s) 110. In some implementations, systems 104 and 202 can be a same computing system or server. In some implementations, one or more of the data stores 116, 118, and 204 can be a same data store (e.g., the data store 108 in FIG. 1A), database, server, immutable ledger, and/or cloud storage.

A user (such as a shopper, a grocer, a store employee, and/or a restaurant/food service employee) at one of the user devices 106A-N, such as user device 106A, can scan produce (step A). The user device 106A can request produce quality information from the quality assessment system 104 (step B). As described throughout, the request can include information such as the scanned data that was collected by the user device 106A. The information can include an image or multiple images of the scanned produce, a product identifier associated with the produce, and any other information that the user device 106A can scan or otherwise collect (e.g., as input from the user) about the produce.

Using the information in the request, the quality assessment system 104 can identify the produce (step C). As described herein, the quality assessment system 104 can use object recognition techniques to extract an image of the produce from the information, which can include image data scanned/captured by the user device 106A. The quality assessment system 104 can also use object recognition or other image analysis techniques to identify the product identifier and decode the product identifier.

Once the produce is identified, the quality assessment system 104 can retrieve data associated with the produce from the produce data store 118 using the produce identifier (step D). The produce data can include information such as historic ripening information, storage conditions, place of origin, historic quality information, quality features, etc. The quality assessment system 104 can also retrieve quality assessment model(s) associated with the produce from the produce models data store 116 using the produce identifier (step E). The models can be trained using machine learning techniques to detect one or more quality features in the information received in the request. The models can also be configured to determine an overall quality of the produce based on the produce data and the information received in the request.

The quality assessment system 104 can apply the model(s) to the information in the request (step F). For example, if the information includes image data of the produce, a model can be trained to identify the produce in a bounding box in the image data. Another model can be trained to perform object recognition techniques on the bounding box portion of the image data to identify one or more quality features of the produce. In some implementations, different models can be applied to identify different quality features. Thus, each model can be trained to identify a different quality feature. For example, one model can be trained to identify browning of produce skin based on color data. Another model can be trained to identify rotting or desiccation based on external and/or internal produce color data. Another model can be trained to identify firmness based on texture. Another model can be trained to identify taste based on color data. One or more additional models can be trained to identify one or more other quality features of the produce. Another model can be trained to determine an overall quality of the produce based on the features identified by the previous model. Additional or fewer models can be applied to determine the quality of the produce. Moreover, the models can be applied in series, which can be advantageous to develop more robust an accurate quality analyses.

The quality assessment system 104 can determine a current, overall quality of the produce (step G). As described throughout this disclosure, the quality assessment system 104 can use one or more machine learning trained models and the retrieved produce data to determine the current quality of the produce. Thus, the quality assessment system 104 can determine the quality of the produce at the time that the user scanned the produce (step A) and the request for produce quality metrics was transmitted to the quality assessment system 104 (step B). The quality assessment system 104 can also determine overall quality of the produce, a ripeness curve for the produce, and/or other freshness parameter values/quality metrics for the produce based on collection and analysis/modeling of volatiles and compounds released by the produce. Refer to FIGS. 1B-F for additional discussion about determining quality metrics of produce based on volatiles.

Figure 7:
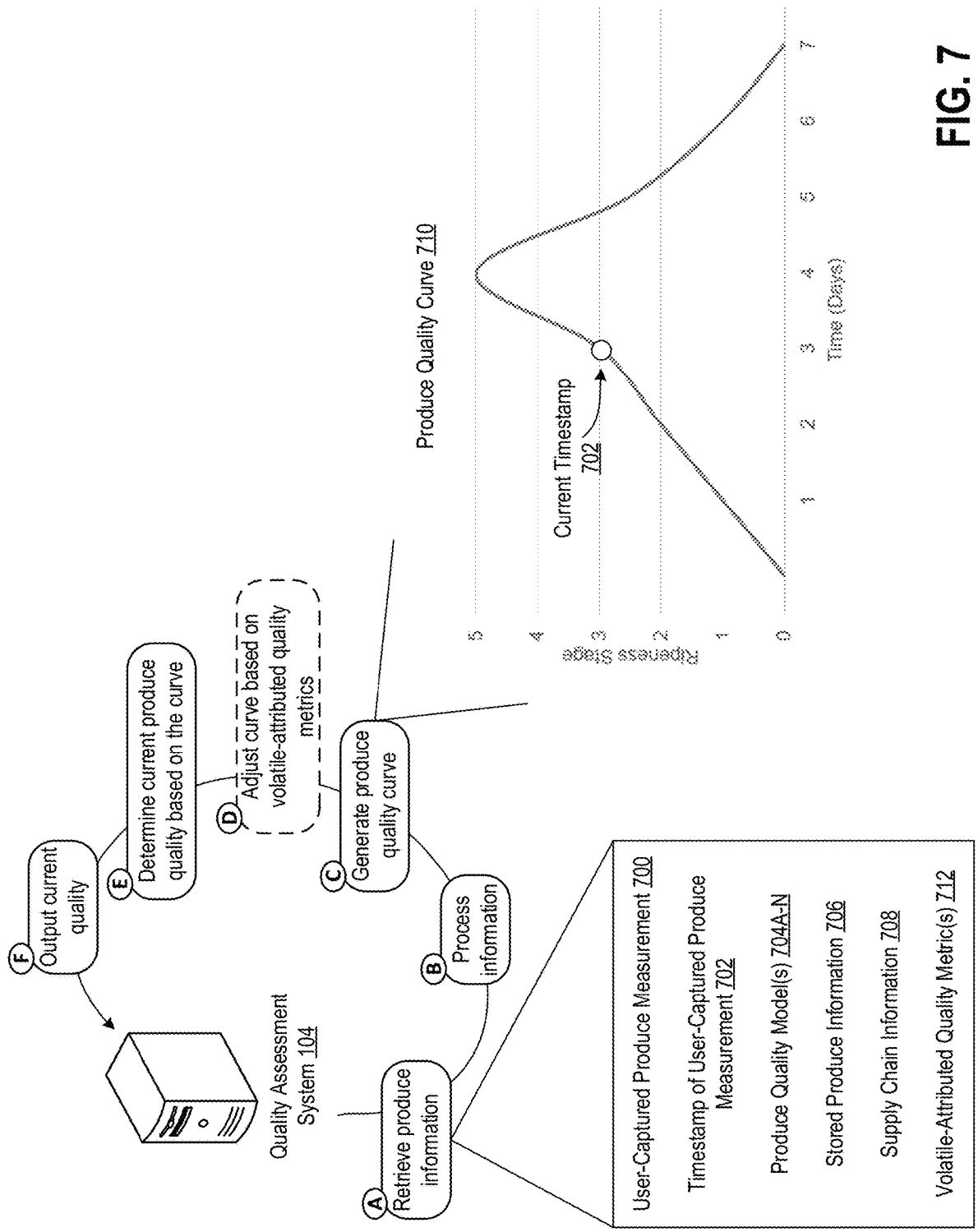
FIG. 7 is a conceptual diagram of determining current quality of produce.

The determined produce quality metric can be a numeric, Boolean, and/or string value. For example, the determined produce quality metric can be one or more of the following descriptors: "currently ripe," "reaching peak ripeness," "overripe," "not yet ripe," etc. One or more other descriptors and/or values can be used to indicate the determined produce quality metrics. In some implementations, as described herein, the quality metric can be a ripeness curve for the produce. The ripeness curve can indicate past, current, and projected/future ripeness of the produce. Refer to FIG. 7 for additional discussion.

Moreover, as described throughout this disclosure, the determined produce quality metrics can also include additional information. The additional information, which can be determined using one or more machine learning trained models by the quality assessment system 104 can include projected remaining shelf life of the produce, projected remaining time until peak ripeness, projected remaining time until the produce is no longer consumable, firmness, softness, taste, nutritional content, suggested recipes based on the current quality of the produce, and suggested recipes based on a projected quality of the produce.

The quality assessment system 104 can store the determined produce quality metrics in the produce data store 118 (step H). This information can be used to train and/or improve the machine learning trained models and other algorithms that can be used by the quality assessment system 104 in determining produce quality metrics.

The quality assessment system 104 can also transmit the determined produce quality metrics to the pricing system 202 (step I). In this data packet, the quality assessment system 104 can transmit additional information, such as the produce identifier associated with the produce and one or more of the produce data that was retrieved in step D. The quality assessment system 104 can also transmit the determined produce quality metrics to the user device 106A.

The pricing system 202 can be configured to determine price adjustments and/or discounts based on the current quality of the produce. In some implementations, the pricing system 202 can also determine price adjustments and/or discounts based on projected quality of the produce. The pricing system 202 can retrieve produce pricing model(s) from the pricing models data store 204 (step J). The system 202 can use information in the data packet received in step I to determine which pricing models to retrieve. In some implementations, the system 202 can also retrieve pricing models that are specific to not only the produce but also a user and/or a relevant stakeholder in the supply chain. For example, the grocery store where the produce is being sold can have specific pricing models that can be used for different categories of produce sold at that store. Thus, the system 202 can retrieve one or more pricing models that are associated with the grocery store.

The pricing system 202 can apply the model(s) (step K). A pricing model for the grocery store can, for example, be trained to reduce a price of the produce by a predetermined percentage once the produce is at peak ripeness. One or more pricing models can be trained to reduce price based on quality of the produce lowering. One or more pricing models can be trained to increase price based on quality of the produce raising. One or more pricing models can also be trained to implement a logarithmic decrease in price once past peak ripeness. One or more pricing models can be trained to plummet the price once the produce is no longer ripe.

Based on the applied models, the pricing system 202 can determine a price adjustment for the produce (step L). The price adjustments can also be determined based on modeling volatiles released by the produce. For example, some volatiles released by produce can indicate sweetness, tartness, juiciness, flavor, etc. of the produce. Models can be applied to the volatiles to determine such characteristics about the produce. Then, the pricing system 202 can adjust the price of the produce based on whether the sweetness, tartness, juiciness, flavor, etc. of the produce meet desired or threshold levels for the produce. As an illustrative example, volatiles released by a bin of oranges can be modeled using a juiciness model. The model output can indicate that the bin of oranges are dry rather than juicy. The pricing system 202 can use this determination to decrease the price of the oranges since the oranges are not a consumer-desired level of juiciness. As another example, volatiles released by a bin of apples can be modeled using a tartness model. The model output can indicate that the bin of apples are very tart/sour rather than sweet. The pricing system 202 can use this determination to decrease the price of the apples since they do not have a consumer-desired level of taste. As yet another example, volatiles released by another bin of apples can be modeled using a crunchiness model. The model output can indicate that this bin of apples are an ideal level of crunchiness. Therefore, the pricing system 202 can determine to increase the price of the apples since they have a consumer-desired level of crunch. The pricing system 202 can adjust the price of the apples based on one or more other quality characteristics of the produce that can be determined by modeling volatiles released by the produce. Such quality characteristics can include, but are not limited to, citrus levels, fermentation, flavor, sweetness, and overall taste. As described herein, models can be generated and used per produce type and per quality characteristic of the particular produce type.

As mentioned, the price adjustment can be an increase or decrease in price based on current and/or projected quality of the produce. The price can be reduced as quality of the produce is reduced, according to a curve that can describe price elasticity of the quality of the produce. The price adjustment can also include a discount, which can be applied at the current time to the price of the produce. The discount can also be applied at a later time to the price of the produce (e.g., once the produce is no longer at peak ripeness). In some implementations, less ripe produce can be priced higher than more ripe produce to incentivize consumers to purchase the less ripe produce first. Doing so can reduce produce-based waste.

In step L, the pricing system 202 can also determine or project an amount of time until a next price reduction. This determination can be based on projected quality information that can be received from the quality assessment system 104 in step I and/or retrieved from the produce data store 118. For example, if the produce is projected to be at peak ripeness for the next 2 days, then the pricing system 202 can determine that after the next 2 days, the price can be reduced. The system 202 can also determine how much the price will be reduced after the next 2 days using the techniques described herein.

The pricing system 202 can transmit the price adjustment back to the user device 106A (step M). The pricing system 202 can also transmit the produce quality metrics to the user device 106A. In some implementations, the quality assessment system 104 can transmit the produce quality metrics to the user device 106A (step I). Sometimes, the determined produce quality metrics can be transmitted to the user device 106A before the price adjustment is transmitted to the user device 106A. Sometimes, the determined produce quality metrics and price adjustment can be transmitted to the user device 106A at the same time.

The user device 106A can then output the produce quality metrics and price adjustment (e.g., refer to FIGS. 13-16). This information can be presented in a graphical user interface (GUI) display at the user device 106A. For example, if the user device 106A is a mobile phone of a shopper, the produce quality metrics and price adjustment can be outputted in a mobile application (e.g., refer to FIGS. 4, 16). If the user device 106A is a point-of-sale (POS) terminal at a checkout lane, the produce quality metrics and the price adjustment can be outputted at the POS terminal (e.g., refer to FIG. 3). The price adjustment can then be automatically applied to a transaction at the POS terminal. Thus, in some implementations, the user device 106A can also implement the price adjustment. As another example, the price adjustment can be presented at the user device 106A of a shopper in the form of a coupon or discount barcode. The shopper can select the coupon or discount barcode on their device 106A and then present the barcode at checkout to have the price adjustment automatically applied.

Figure 3:
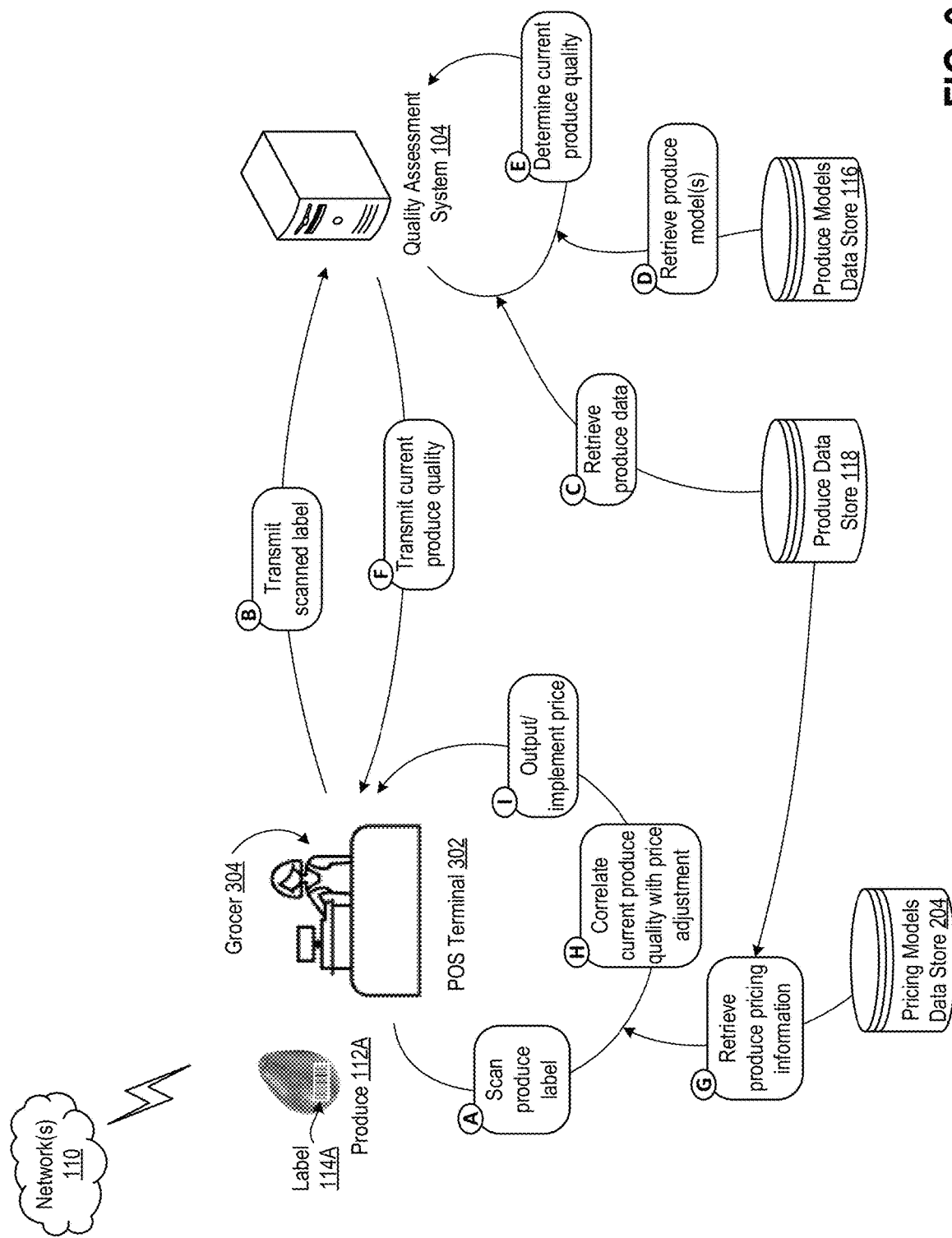
FIG. 3 is a conceptual diagram of dynamically adjusting produce pricing based on the produce quality.

FIG. 3 is a conceptual diagram of dynamically adjusting produce pricing metrics based on the produce quality metrics. In this example, a grocer 304 is operating a POS terminal 302. A shopper can approach the grocer 304 with produce 112A. The produce 112A includes a product identifier, label 114A. The grocer 304 can scan the produce label 114A at the POS terminal 302 (step A). For example, the label 114A can be scanned using a barcode scanner or other scanning device at the POS terminal 302. In some implementations, the grocer 304 can scan the label 114A by inputting a value on the label 114A into the POS terminal 302.

The POS terminal 302 can transmit the scanned label 114A to the quality assessment system 104 (step B). The quality assessment system 104 can proceed to retrieve produce data from the produce data store 118 (step C), and retrieve produce model(s) from the produce models data store 116 (step D), as described throughout this disclosure (e.g., refer to FIG. 1A). The system 104 can determine current produce quality metrics (step E) and transmit the current produce quality metrics back to the POS terminal 302 (step F).

In the example of FIG. 3, the POS terminal 302 can be configured to determine pricing metric adjustments for the produce 112A. Thus, the POS terminal 302 can be the same or similar to the pricing system 202 in FIG. 2 and can perform same or similar operations as the pricing system 202 (e.g., refer to FIGS. 2, 11). Therefore, once the POS terminal 302 receives the current produce quality metrics in step F, the POS terminal 302 can retrieve produce pricing information from the pricing models data store 204 and the produce data store 118 (step G). As mentioned throughout, the pricing information can include pricing models that are specific to the produce 112A, the grocery store, or other relevant stakeholders in the supply chain. Using the retrieved information, the POS terminal 302 can correlate the current produce quality metrics with a price adjustment (step H). The POS terminal 302 can then output and/or implement the price adjustment (step I). For example, the price of the produce 112A can be automatically discounted and reflected at an output display at the POS terminal 302 and on the shopper's receipt.

Figure 4:
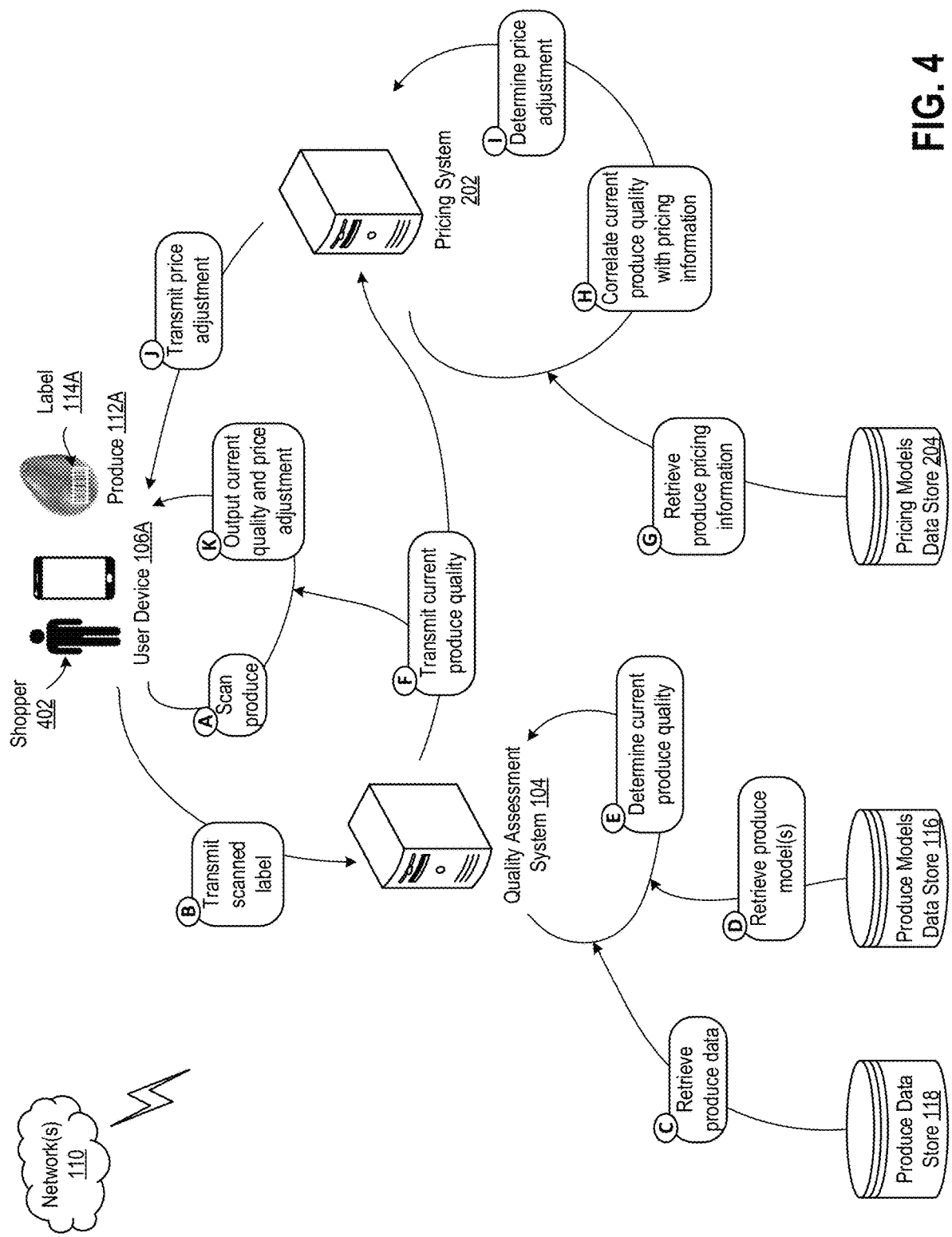
FIG. 4 is a conceptual diagram of determining produce quality for a consumer, such as a shopper.

FIG. 4 is a conceptual diagram of determining produce quality metrics for a consumer, such as a shopper. As depicted, shopper 402 can use the user device 106A to scan the produce 112A (step A). Scanning the produce 112A can include capturing an image, using a camera on the user device 106A, of the label 114A. For example, the shopper can capture an image of an avocado using their mobile device. Current quality of the avocado can be determined based on the captured image of the avocado, as described herein. The user device 106A can then transmit the scanned label 114A to the quality assessment system 104 (step B). As described throughout this disclosure, the system 104 can retrieve produce data from the produce data store 118 (step C) and retrieve produce model(s) from the produce models data store 116 (step D). Accordingly, the system 104 can determine a current produce quality metrics for the produce 112A (step E). The system 104 can transmit the current produce quality metrics to the user device 106A and the pricing system 202 (step F).

The pricing system 202 can retrieve produce pricing information from the pricing models data store 204 (step G). The system 202 can then correlate the current produce quality metrics with the retrieved pricing information (step H). Based on such correlation, the pricing system 202 can determine a price adjustment for the produce 112A (step I). The pricing system 202 can then transmit the price adjustment to the user device 106A (step J). The user device 106A can output the current produce quality metrics and the price adjustment for display to the shopper 402 (step K).

Based on the outputted information, the shopper 402 can make an informed decision about whether to purchase the produce 112A. Moreover, the shopper 402 may not have to use their value judgements to determine whether or not the produce 112A is a preferred quality. For example, the shopper 402 may not have to use destructive techniques such as squeezing the produce 112A to determine whether it is ripe enough and/or firm enough. Furthermore, the shopper 402 can be incentivized to purchase the produce 112A at a lower price, which can indicate that the produce 112A is of declining or lower quality than other produce. By purchasing the produce 112A at a lower price, produce-based waste can be avoided and overall quality of produce on a shelf or in a produce department of a store can be increased.

Figure 5A:
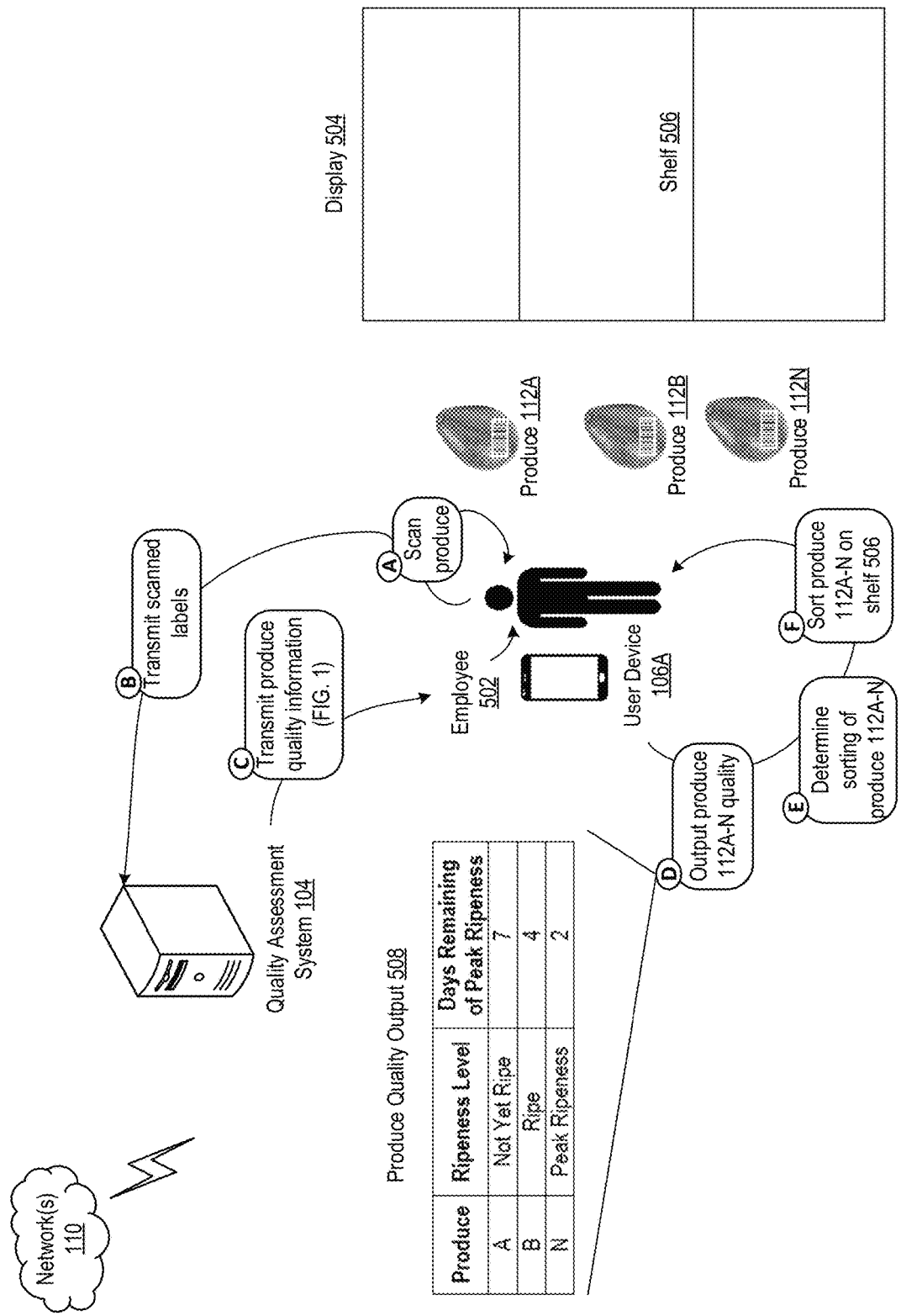
FIG. 5A is a conceptual diagram of a store employee arranging a display shelf based on produce quality.

FIG. 5A is a conceptual diagram of a store employee arranging a display shelf based on produce quality metrics. Employee 502 can use the user device 106A to determine how to arrange produce 112A-N on a display 504. The display 504 can include multiple shelves, such as shelf 506. The employee 502 can be tasked with stocking the shelf 506 with the produce 112A-N. In order to avoid or reduce produce-based waste, it can be preferred to stock the shelf 506 with lower quality produce in front of higher quality produce. As a result, shoppers can purchase the lower quality produce before the lower quality produce is no longer consumable. The lower quality produce may not be wasted then.

As depicted in FIG. 5A, the employee 502 can scan labels of the produce 112A-N using the user device 106A (step A). The employee can, for example, take a picture of the produce 112A-N, which can be used to determine current quality of the produce 112A-N. The user device 106A can transmit the scanned labels to the quality assessment system 104 (step B). The quality assessment system 104 can then transmit back to the user device 106A determined produce quality information (e.g., refer to FIG. 1A) (step C).

Figure 5B:
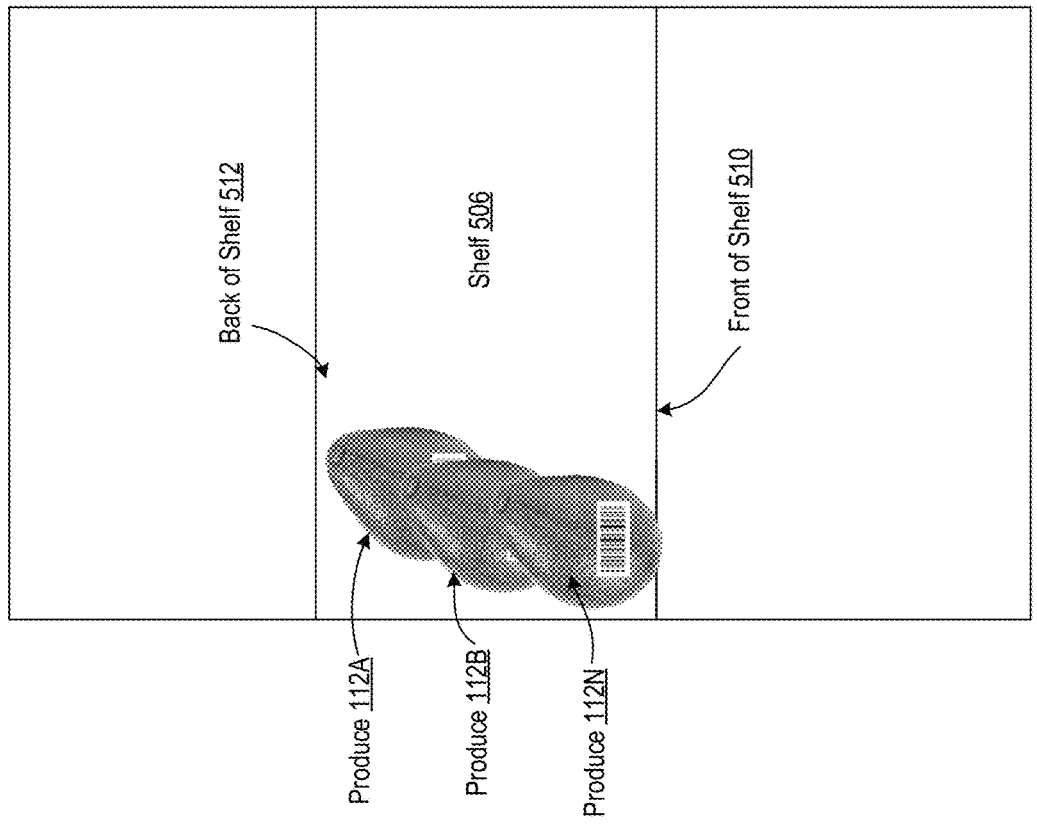
FIG. 5B depicts the display shelf of FIG. 5A as arranged by the store employee.

The user device 106A can output the quality information associated with the produce 112A-N (step D). As an illustrative example, produce quality output 508 can include a table indicating a ripeness level and days remaining of peak ripeness for each of the produce 112A-N. In the example of FIGS. 5A-B, the produce 112A can have a ripeness level of "not yet ripe" and 7 days remaining until peak ripeness. The produce 112B can have a ripeness level of "ripe" and 4 days remaining until peak ripeness. The produce 112C can have a ripeness level of "peak ripeness" and 2 days remaining until peak ripeness.

Based on the output 508, the user device 106A can determine a sorting sequence of the produce 112A-N (step E). In some implementations, the user device 106A and/or the quality assessment system 104 can automatically determine how to sort the produce 112A-N based on their current quality information. In some implementations, the employee 502 can determine how to sort the produce 112A-N based on the outputted information.

The employee 502 can then proceed to sort the produce 112A-N on the shelf 506 (step F).

FIG. 5B depicts the display shelf 506 of FIG. 5A as arranged by the store employee 502. The produce 112N has been placed at a front of the shelf 510 while the produce 112A has been placed at a back of the shelf 512. The produce 112B has been placed between the produce 112N and 112A. This sorting of the produce 112A-N was determined based on the produce quality output 508. It can be desirable to place produce that is likely to turn or of lesser quality at the front 510 of the shelf 506 while placing produce that is not yet peak or is of higher quality at the back 512 of the shelf 506. Therefore, as described throughout this disclosure, shoppers can be incentivized to purchase the lesser quality produce before the higher quality produce, thereby reducing or otherwise avoiding produce-based waste. Moreover, since price can be adjusted for each of the produce 112A-N based on their current quality, the shoppers can be further incentivized to purchase the lower priced lesser quality produce before the higher priced higher quality produce. Once the lower quality produce (e.g., the produce 112N) is purchased, the higher quality produce (e.g., the produce 112B and 112A) can be positioned closer to the front 510 of the shelf 506. The shelf 506 can also be replenished by adding higher quality produce at the back 512 of the shelf 506.

Referring to both FIGS. 5A-B, in some implementations, the quality of the produce 112A-N can change on a daily basis. Thus, the employee 502 can sort the produce 112A-N whenever the quality of the produce 112A-N changes such that the lesser quality produce can always be presented at the front 510 of the shelf 506 while the higher quality produce can always be positioned at the back 512 of the shelf 506.

Figure 5C:
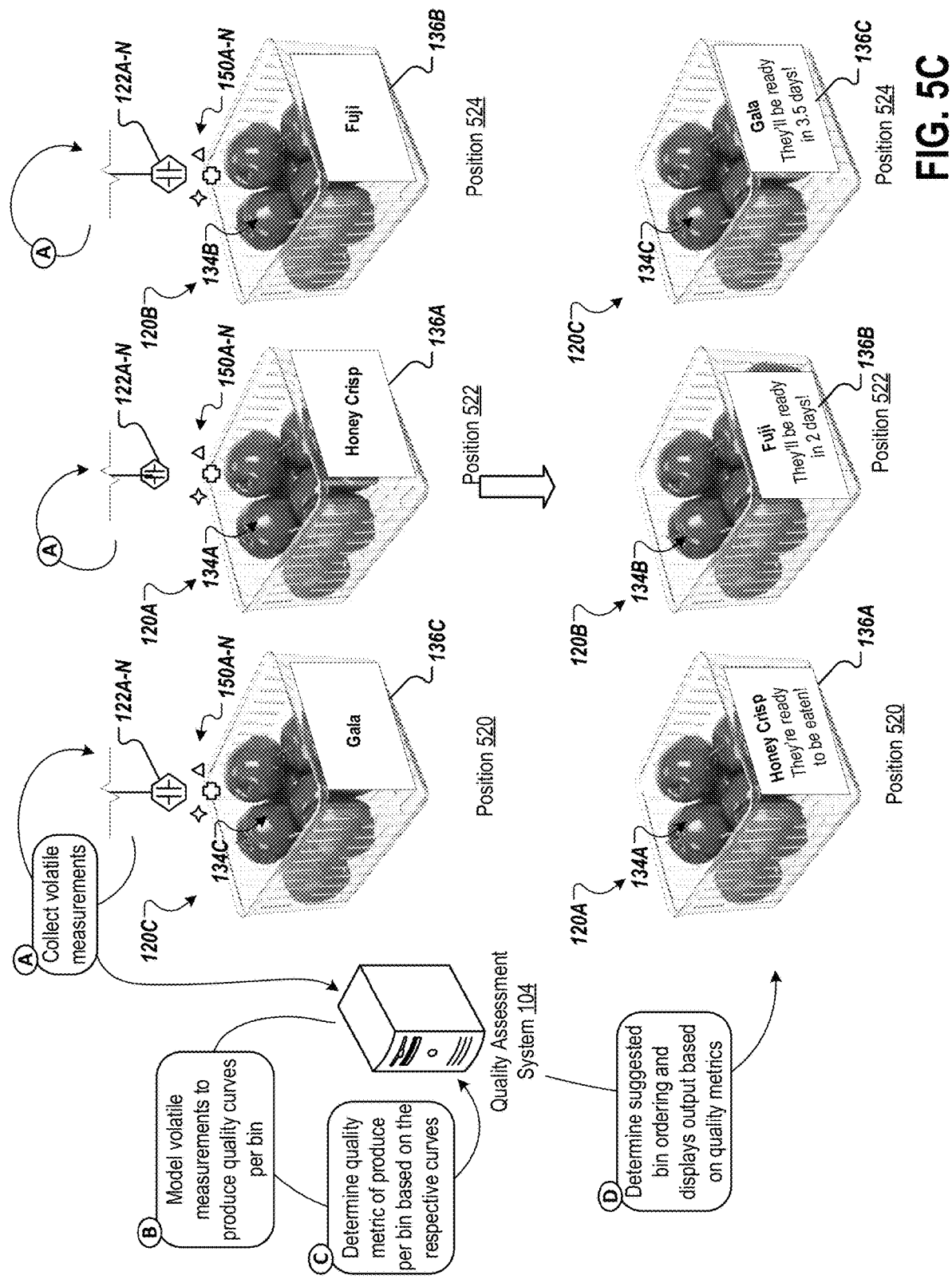
FIG. 5C is a conceptual diagram for sorting produce bins based on quality assessments of produce in the bins.

FIG. 5C is a conceptual diagram for sorting produce bins 120A-C based on quality assessments of produce 134A-C in the bins. Volatile 150A-N measurements can be collected at each of the produce bins 120A-C by the respective sensors 122A-N (step A). The volatile measurements can be transmitted to the quality assessment system 104, which can model the volatile measurements to produce quality curves per bin (step B). In other words, the system 104 can determine a quality (e.g., ripeness) curve for the produce 134A in the produce bin 120A based on volatiles 150A-N emitted by the produce 134A, another curve for the produce 134B in the produce bin 120B based on volatiles 150A-N emitted by the produce 134B, and another curve for the produce 134C in the produce bin 120C based on volatiles 150A-N emitted by the produce 134B. Refer to FIG. 7 for additional discussion about generating the produce quality curves. Based on the respective quality curves, the quality assessment system 104 can determine a quality metric of the produce per bin (step C). For example, the system 104 can determine a current ripeness level of each batch of the produce 134A, 134B, and 134C from the respective quality curves. The current ripeness level, or other determined quality metric (e.g., remaining shelf life, taste, flavor, sweetness, crunchiness, tartness, odor, firmness, etc.) can be used by the system 104 to determine suggested bin ordering and displays output (step D). As a result, the produce bins 120A-C can be sorted/arranged in an order in a produce display system (e.g., refer to FIG. 1B) based on the determined quality of the respective produce 134A-C.

In the example of FIG. 5C, the produce bins 120A-C can be sorted from most ripe (e.g., ready to be eaten) to least ripe (e.g., not yet ready to be eaten) produce. The produce bins 120A-C can also be sorted based on other metrics, including but not limited to sweetest to least sweet, juiciest to less juicy, least tart to most tart, least crunchy to most crunchy, etc.

Here, from left to right, the produce bin 120C having Gala apples 134C is originally in position 520, the produce bin 120A having Honey Crisp apples 134A is originally in position 522, and the produce bin 120B having Fuji apples 134B is originally in position 524. Once the quality assessment system 104 performs steps A-D, the system 104 can determine a new suggested ordering of the produce bins 120A-C based on the produce 134A-N quality. In the new arrangement, the produce bin 120A containing the Honey Crisp apples 134A can be placed in the position 520, the produce bin 120B containing the Fuji apples 134B can be placed in the position 522, and the produce bin 120C containing the Gala apples 134C can be placed in the position 524.

Moreover, the system 104 can determine and generate updated outputs to be presented at the displays 136A-C of the produce bins 120A-N based on the determined quality of the produce 134A-C. As shown in FIG. 5C, the display 136A for the produce bin 120A can be updated with text indicating that the Honey Crisp apples are ready to be eaten. The display 136B for the produce bin 120B can be updated with text indicating that the Fuji apples will be ready to be eaten in 2 days. The display 136C for the produce bin 120B can be updated with text indicating that the Gala apples will be ready to be eaten in 3.5 days. The text outputted at each of the displays 136A-C can be independently and dynamically updated/modified over time as the current quality and/or projected quality of the respective produce 134A-C changes over time. In some implementations, the displays 136A-C can display pricing information based on the determined quality of the produce 134A-C in the respective produce bins 120A-C, as described in FIG. 5D.

FIG. 5D is a conceptual diagram for determining produce pricing based on quality assessments of the produce 134A-C in their respective bins 120A-N. Here, the displays 136A-C of the respective produce bins 120A-C can be updated to reflect price adjustments based on determined quality of the produce 134A-C. Price adjustments can be made based on a variety of quality characteristics/metrics determined for the produce 134A-C, as described in relation to FIG. 2. In the example of FIG. 5D, price adjustments are determined based on current ripeness of the produce 134A-C. The more ripe the produce, the more discounted the price. The discount can incentivize consumers to purchase the more ripe produce now to avoid or otherwise reduce produce-based waste. The price adjustments can also be determined based on one or more other quality metrics described herein, including but not limited to taste, odor, firmness, juiciness, crunch, and other metrics specific to particular types of produce.

As described in reference to FIG. 5C, volatile 150A-N measurements can be collected at each of the bins 120A-C using the respective sensors 122A-N (step A). The volatile measurements can be transmitted to the quality assessment system 104 to model the volatile measurements to produce quality curves per bin (step B). The system 104 can determine a quality metric of the produce per bin based on the respective curves (step C). The quality metric can be transmitted to the pricing system 202, which can determine price adjustments per bin and displays 136A-C output based on the respective quality metrics (step D).

Here, the produce bin 120C containing the Gala apples 134C is in, and remains in, position 520, the produce bin 120A containing the Honey Crisp apples 134A is in position 522, and the produce bin 120B containing the Fuji apples 134B is in position 524. Based on the steps B-D performed by the quality assessment system 104 and the pricing system 202, the pricing system 202 transmits pricing information to be outputted at the respective displays 136A-C of the produce bins 120A-C in their respective positions 520, 522, and 524.

In the example of FIG. 5D, the Gala apples 134C in the produce bin 120C are ready to be eaten (as determined by the system 104 in steps B-C), so the display 136C is updated to include text indicating that the Gala apples 134C are discounted and ready to be eaten. The text may also include the discounted price of the apples 134C in the produce bin 120C. Since the Honey Crisp apples 134A are almost at peak ripeness/readiness, the display 136A is updated to include text indicating that the Honey Crisp apples 134A are almost ready to be eaten. The text can include an adjusted price of the apples 134A, which can be more expensive than the Gala apples 134C since the Honey Crisp apples 134A are not as ready/ripe for eating as the Gala apples 134C. Since the Fuji apples 134B are not yet ready to be eaten, the display 136B is updated to include text reflecting the current level of ripeness/readiness of the Fuji apples 134B. The text can also include an adjusted price of the Fuji apples 134B, which can be more expensive than the Gala apples 134C and the Honey Crisp apples 134A since the Fuji apples 134B are not yet prime/ideal for consumer consumption.

Figure 6:
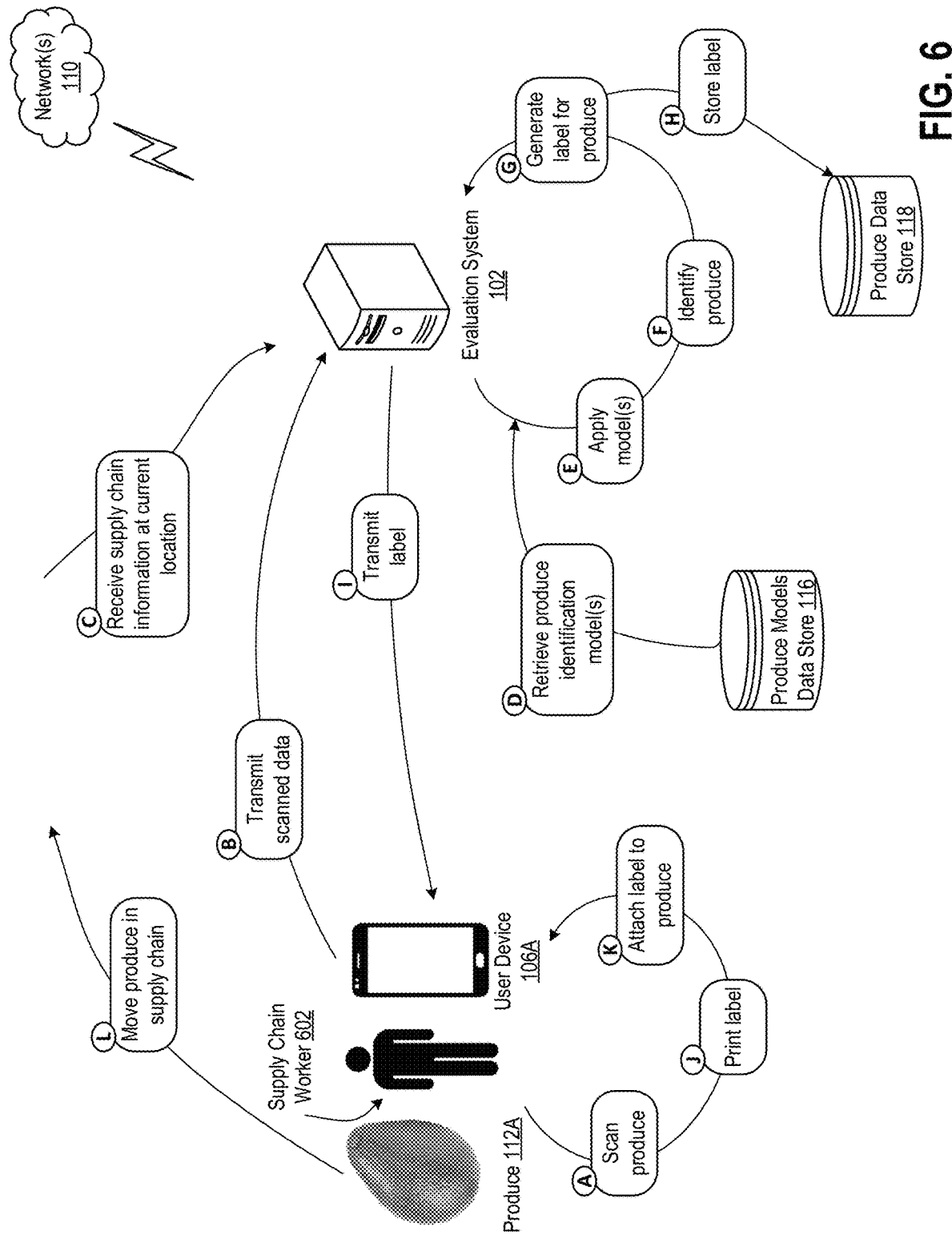
FIG. 6 is a conceptual diagram of identifying and labeling produce.

FIG. 6 is a conceptual diagram of identifying and labeling produce. When produce is shipped from a farm to a distribution center and/or a packing house, for example, the produce may not yet be classified, labeled, or otherwise identified. Once at the distribution center or the packing house, the produce can be labeled such that it can be identified further down the supply chain. As described herein the produce can be classified or labeled as part of a packaging process. The produce can also be classified or labeled as part of coating the produce in ripening agent treatment(s). Moreover, information about the produce, such as its storage conditions, current quality, current ripeness, place of origin, etc., can be stored and associated with the produce via the produce's label (e.g., product identifier, barcode, QR code, SKU).

A supply chain worker 602 can use the user device 106A to scan the produce 112A (step A). Scanning the produce 112A can include taking an image of the produce 112A with a camera of the user device 106A. In some implementations, an imaging device can be placed in the distribution center and configured to automatically capture image data of the produce 112 as it is moved into and throughout the distribution center.

The supply chain worker 602 can be at the distribution center or other storage facility. For example, the worker 602 can be tasked with scanning produce as they enter the distribution center. The supply chain worker 602 can also be located anywhere else along the supply chain, such as at a farm, a location before or during transit to the distribution center, and/or a location before or during transit to a grocery store or other end consumer.

The user device 106A can transmit the scanned data to the evaluation system 102 (step B). As an example, the scanned data can be image data. The image data can include hyperspectral data, associated metadata, and/or color models. The evaluation system 102 can also receive supply chain information at a current location of the produce 112A (step C). The supply chain information can include storage conditions of the produce 112A, how long the produce 112A was in transit, how long the produce 112A is expected to be stored at the distribution center before being shipped to an end consumer, what end consumer is expecting to receive the produce 112A, how long transit will be between the distribution center and the end consumer, information about the end consumer, and whether the produce 112A received any ripening treatment or coating before reaching the current location.

The evaluation system 102 can retrieve produce identification models from the produce models data store 116 (step D). The identification models can be trained using machine learning techniques to identify a type of produce from the scanned data. For example, one or more of the models can be trained to extract the produce 112A from the image data and identify feature points in the extracted portion of the image data that can be used to identify the produce 112A. Once the feature points are extracted, one or more models can be used to associate the feature points with a type of produce. Thus, the evaluation system 102 can apply the models (step E) and identify the produce 112A (step F). The produce 112A can also be identified using the supply chain information that was received in step C. For example, if the supply chain information indicates a farm/place of origin, the evaluation system 102 can use that information to eliminate possible matches between the scanned produce 112A and produce types that the models are trained to identify. As an illustrative example, if the farm only produces bell peppers and green beans, then possible produce type matches of cucumbers, avocados, and bananas can be eliminated.

Once the evaluation system 102 identifies the produce 112A in step F, the evaluation system 102 can generate a label for the produce 112A (step G). The label can be a unique identifier that can be used to associate any information about the produce 112A with the produce 112A. The label can then be stored in the produce data store 118 (step H). Any additional information about the produce 112A that was identified using the models can also be stored in the produce data store 118.

The evaluation system 102 can then transmit the label to the user device 106A (step I). The user device 106A can print the label (step J). The label can then be attached to the produce 112A (step K). In some implementations, the user device 106A can be in communication with an automated machine that automatically attaches the label to the produce 112A. In some implementations, the supply chain worker 602 can attach the label to the produce 112A. Once the produce 112A is identified and labeled, the produce 112A can be moved in the supply chain (step L). For example, the produce 112A can be moved into storage. The produce 112A can be moved to an end consumer, such as a grocery store or a restaurant. The produce 112A can also be moved to a food processing plant or any other relevant stakeholder in the supply chain.

FIG. 7 is a conceptual diagram of determining current quality of produce. The quality assessment system 104 can determine the current quality of a particular piece of produce. The system 104 can also determine the current quality for a batch of produce, such as produce of a same type contained in a produce bin. As described throughout this disclosure, the quality assessment system 104 can be configured to determine quality of produce at a time that the system 104 receives a user request. That time can be later than a time when the produce is initially evaluated (e.g., when the evaluation system 102 initially identifies and labels the produce and determines quality features associated with that produce). The system 104 can also determine quality of the produce earlier in the supply chain, before or without receiving the user request (e.g., when the produce is routed in the produce bins from a storage facility to a store). As a result, the current quality of the produce can be determined accurately and early in the supply chain to make proactive upstream supply chain modifications.

To determine the current quality of the produce, the system 104 can retrieve information associated with the produce, as described throughout this disclosure (step A). The retrieved information can include, but is not limited to, user-captured produce measurement 700, timestamp of the user-captured produce measurement 702, produce quality model(s) 704A-N, stored produce information 706, supply chain information 708, and volatile-attributed quality metric(s) 712. The information 700-712 can be retrieved, accessed, and/or received from one or more different computers, systems, servers, and/or devices. For example, the user-captured produce measurement 700 and the timestamp 702 can be received with a user request for produce quality information from the user's device. The produce quality model(s) 704A-N and stored produce information 706 can be retrieved from one or more data stores. The supply chain information 708 can be received from a device of a relevant stakeholder (e.g., a grocer, distribution center worker, store employee, farmer, vendor, etc.) and/or retrieved from a data store. The volatile-attributed quality metric(s) 712 can be determined by the quality assessment system 104 at a current time or retrieved from a data store after being previously determined by the system 104.

The user-captured produce measurement 700 can be data that is inputted and/or scanned by the user device. The measurement 700 can represent the produce. For example, the measurement 700 can be one or more image data as captured by a camera or other optical sensor at the user device. The image data can capture just the produce, a label or other product identifier of the produce, the produce with the label, and/or one or more produce in an environment. The environment can include multiple produce, a display shelf, product identifiers, etc. The measurement 700 can also include user-inputted values. For example, the user can manually input the product identifier at the user device. The user can also look up and select the produce in a search interface at the user device. Once selected, the product identifier and other identifying information for the produce can be the measurement 700.

The timestamp 702 can indicate a time at which the user scanned the produce and requested the quality of the produce. The timestamp 702 can be used by one or more of the models 704A-N to determine the quality of the produce at the current time, which is the time indicated by the timestamp 702. Thus, one or more of the model(s) 704A-N can be trained to correlate the time indicated by the timestamp 702 with expected quality features of the produce throughout the produce's lifecycle.

As mentioned throughout, the models 704A-N can be trained using machine learning techniques to identify the produce in the measurement 700, identify quality features of the produce, correlate the quality features with the current time as indicated by the timestamp 702, and determine a current overall quality of the produce. One or more of the models 704A-N can also be trained to project quality of the produce over a remaining shelf life or lifecycle of the produce.

The stored produce information 706 can include historic information about the particular produce or other produce of the same type. The historic information can include prior, typical, or expected ripening of the produce, bruising, rotting, molding, softening, etc. The historic information can also include prior pricing metrics and discounting of the produce. The produce information 706 can also include storage conditions, transit conditions, ripening conditions, historic shelf life, and place of origin conditions as they relate to the particular produce or other produce of the same type. The produce information 706 can be used by one or more models 704A-N to fine tune and more accurately determine the current quality of the produce.

Similarly, the supply chain information 708 can be used by one or more of the models 704A-N to more accurately determine the current quality of the produce. As an illustrative example, the produce can be an avocado, which typically reaches peak ripeness after 3 days. However, the supply chain information 708 can indicate that there was a holdup during transit of this particular avocado, which delayed delivery of the avocado to the grocery store by 4 days. The supply chain information 708 can also indicate that during the holdup, refrigeration conditions were maintained but no ripening agent was applied and no process was applied to slow ripening of the avocado. Thus, the quality assessment system 104 can determine that typically, at the current time, the avocado should be at its peak ripeness, but because of the holdup during transit, the avocado is no longer at peak ripeness at the current time. Thus, the supply chain information 708 can be used to more accurately determine current quality of the produce.

The volatile-attributed quality metric(s) 712 can be used to confirm a ripeness curve generated by the quality assessment system 104. The metric(s) 712 can also be used to update and/or further train one or more models used for determining quality features of the produce, such as ripeness. Refer to FIG. 1B for additional discussion about determining the metric(s) 712.

The quality assessment system 104 can process the produce information (step B). Processing the information can include applying one or more of the produce quality models 704A-N to the user-captured produce measurement 700. The models 704A-N can also receive the timestamp 702 and the supply chain information 708 as inputs to determine quality of the produce. Moreover, the stored produce information 706 can be used to further refine or otherwise determine the quality of the produce at the time indicated by the timestamp 702, as described above.

By processing the information, the quality assessment system 104 can generate a quality curve for the produce (step C). A produce quality curve 710 can map quality of the particular produce over a certain period of time, including the current time, as indicated by the timestamp 702. For example, the first time represented on the produce quality curve 710 can be a time of initial evaluation of the particular produce by the evaluation system 102.

The produce quality curve 710 can be output from one or more of the models 704A-N. The one or more models 704A-N can be trained to generate different quality curves based on information such as the place of origin, different timeframes during the produce's life cycle, storage conditions, and other information about the produce. As described above, the produce quality curve 710 can also be adjusted based on information such as the stored produce information 706 and the supply chain information 708. The quality assessment system 104 can also generate one or more quality curves. For example, a quality curve can be generated for each quality feature that is identified by the models 704A-N. Each of the quality curves can then be correlated with each other to determine an overall quality of the produce at the current time.

In the example produce quality curve 710 in FIG. 7, the produce can be an avocado. The curve 710 indicates ripeness stages of the avocado over a 7-day timeframe. One or more different timeframes can be used. The timeframe can be based on a projected ripeness curve or other quality curve of the produce, from a time the produce leaves a farm to the last time that the produce can be consumed by end-consumers. Here, the curve 710 can indicate that at day 1, the avocado left the farm and was not yet ripe. By day 7, the quality assessment system 104 projected that the avocado would be overripe. In other words, the quality assessment system 104 can project that day 7 may be the last day that the avocado is consumable.

Optionally, the quality assessment system 104 can adjust the produce quality curve 710 based on the volatile-attributed quality metric(s) 712 (step D). For example, the models 704A-N can generate the produce quality curve 710 shown in FIG. 7 with a current ripeness stage of 3 at the current timestamp 702. However, based on analysis and modeling of the volatiles measured at the current timestamp 702, the quality assessment system 104 can determine that the actual ripeness stage of the produce is 2.5. In step D, the system 104 can then adjust the produce quality curve 710 so that the current timestamp 702 corresponds to the ripeness stage of 2.5 instead of 3. In so doing, accuracy of the produce quality curve 710 can be improved. Moreover, the system 104 can further train the models 704A-N in step D using the metric(s) 712 to improve accuracy in quality curve generation and determination of other quality metrics described herein. The metric(s) 712 can also be used to confirm the produce quality curve 710 (and thus validate the models 704A-N that are used in steps B-C) in step D.

Using the produce quality curve 710, the quality assessment system 104 can determine the current produce quality (step E). For example, the quality assessment system 104 can determine which day on the curve 710 correlates to the timestamp 702. As shown in FIG. 7, the current time 702 is day 3 on the produce quality curve 710. At day 3, the particular produce, the avocado, is at ripeness stage 3. The quality assessment system 104 can also determine that the produce is approaching peak ripeness, which would be day 4. Moreover, the quality assessment system 104 can determine that the produce has approximately 4 days of remaining shelf life before the produce is no longer consumable.

The quality assessment system 104 can output the current quality of the produce (step F). As described herein, the quality assessment system 104 can transmit the current quality back to the user device for display to the user. The quality assessment system 104 can also transmit the current quality to the pricing system 202, which can determine price adjustments and/or discounts based on the current quality. Moreover, the quality assessment system 104 can store the current quality determination. Once stored, the current quality determination can be used for subsequent quality determinations of other produce of the same type. The current quality determination can also be used for training and improving the assessment system 104 as well as the models 704A-N that are used to identify quality of the produce.

Figure 8:
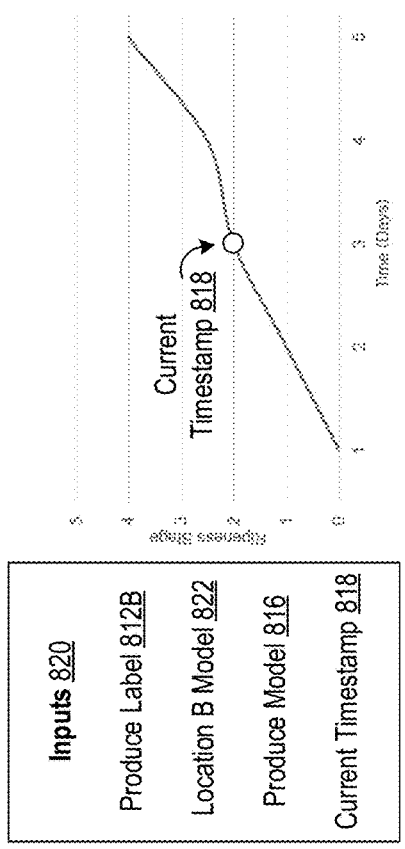
FIG. 8 is graphical depictions of produce of a same type having different quality levels at a current time.
Figure 8:
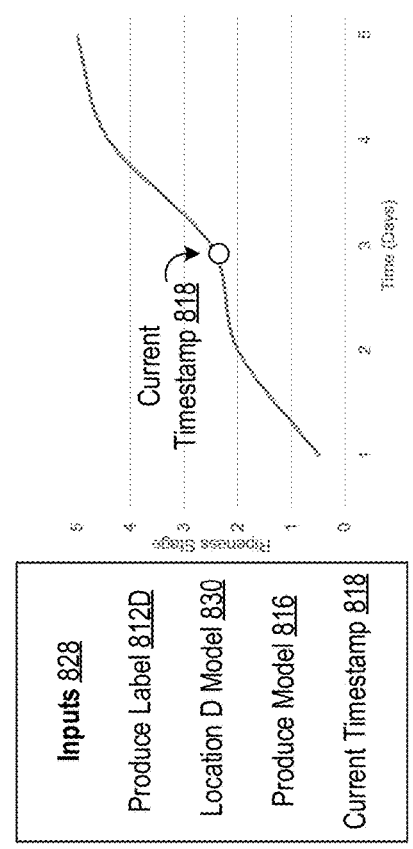
Figure 8:
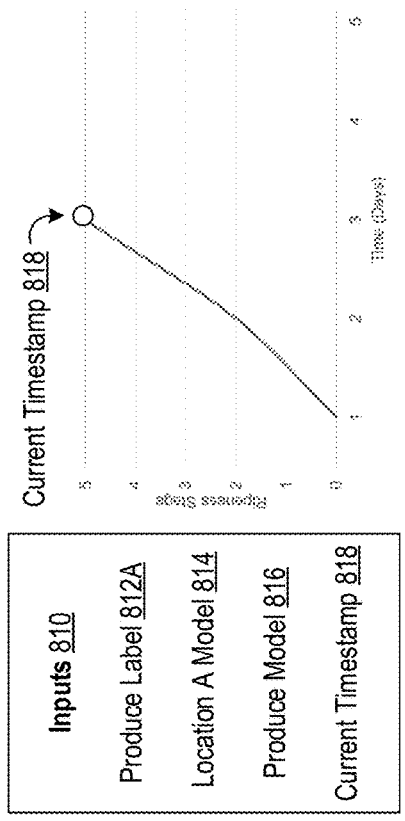
Figure 8:
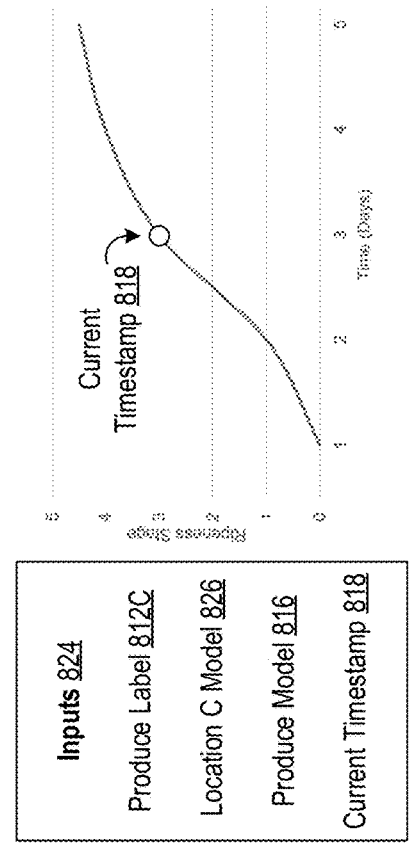

FIG. 8 is graphical depictions of produce of a same type having different quality levels at a current time. The produce depicted in FIG. 8 can be of a same type but can be from different places of origin. The different places of origin can impact the overall quality of the produce at a same current time. Moreover, the different places of origin can impact an overall trend in quality of each of the produce of the same type, as depicted herein.

As shown in this illustrative example, produce location A quality curve 802, produce location B quality curve 804, produce location C quality curve 806, and produce location D quality curve 808 map ripeness over 5 days for a produce of the same type but from different locations, A-D.

The quality assessment system 104 used inputs 810 to generate the produce location A quality curve 802. The inputs 810 can include produce label 812A, location A model 814, produce model 816, and current timestamp 818. The produce label 812A can be used to identify the particular produce being modeled in the curve 802. The label 812A can also be used to retrieve additional information about the particular produce being modeled in the curve 802. The location A model 814 can be trained to identify quality of the produce based on conditions (e.g., travel, storage, ripening, transit) associated with the location A. The produce model 816 can be trained to identify quality features of produce of the same type, regardless of place of origin of the produce. Finally, the current timestamp 818 can represent a time at which a request for quality of the produce is received by the quality assessment system 104. The produce location A quality curve 802 indicates that at day 3, the current timestamp 818, the produce from location A has reached ripeness stage 5.

The quality assessment system 104 used inputs 820 to generate the produce location B quality curve 804. The inputs 820 can include produce label 812B, location B model 822, produce model 816, and current timestamp 818. The produce label 812B identifies the particular produce, which is the same type as the produce modeled in the curve 802 but from a different place of origin. Since the place of origin is different, the quality assessment system 104 uses the model 822 associated with the produce 812B's place of origin: location B. The produce model 816 can be the same as the model 816 used to generate the produce location A quality curve 802 since the produce modeled in both curves is of the same type. Moreover, the current timestamp 818 can be the same for both curves 802 to 804 to represent how produce of the same type from different places of origin can have different current qualities. The produce location B quality curve 804 therefore indicates that at day 3, the current timestamp 818, the produce from location B has reached ripeness stage 2.

The quality assessment system 104 used inputs 824 to generate the produce location C quality curve 806. The inputs 824 can include produce label 812C, location C model 826, produce model 816, and current timestamp 818. The produce label 812C identifies the particular produce, which is the same type as the produce modeled in the curves 802 and 804 but from a different place of origin. Since the place of origin is different, the quality assessment system 104 uses the model 826 associated with the produce 812C's place of origin: location C. The produce model 816 can be the same as the model 816 used to generate the produce location A and B quality curves 802 and 804 since the produce modeled in all three curves are of the same type. Moreover, the current timestamp 818 can be the same for the curves 802, 804, and 806 to represent how produce of the same type from different places of origin can have different current qualities and projected qualities over time. The produce location C quality curve 806 therefore indicates that at day 3, the current timestamp 818, the produce from location C has reached ripeness stage 3.

The quality assessment system 104 used inputs 828 to generate the produce location D quality curve 808. The inputs 828 can include produce label 812D, location D model 830, produce model 816, and current timestamp 818. The produce label 812D identifies the particular produce, which is the same type as the produce modeled in the curves 802, 804, and 806 but from a different place of origin. Since the place of origin is different, the quality assessment system 104 uses the model 830 associated with the produce 812D's place of origin: location D. The produce model 816 can be the same as the model 816 used to generate the produce location A, B, and C quality curves 802, 804, and 806 since the produce modeled in all four curves are of the same type. Moreover, the current timestamp 818 can be the same for the curves 802, 804, and 806 to represent how produce of the same type from different places of origin can have different current qualities. The produce location D quality curve 808 therefore indicates that at day 3, the current timestamp 818, the produce from location D has reached ripeness stage 2.25.

Figure 9A:
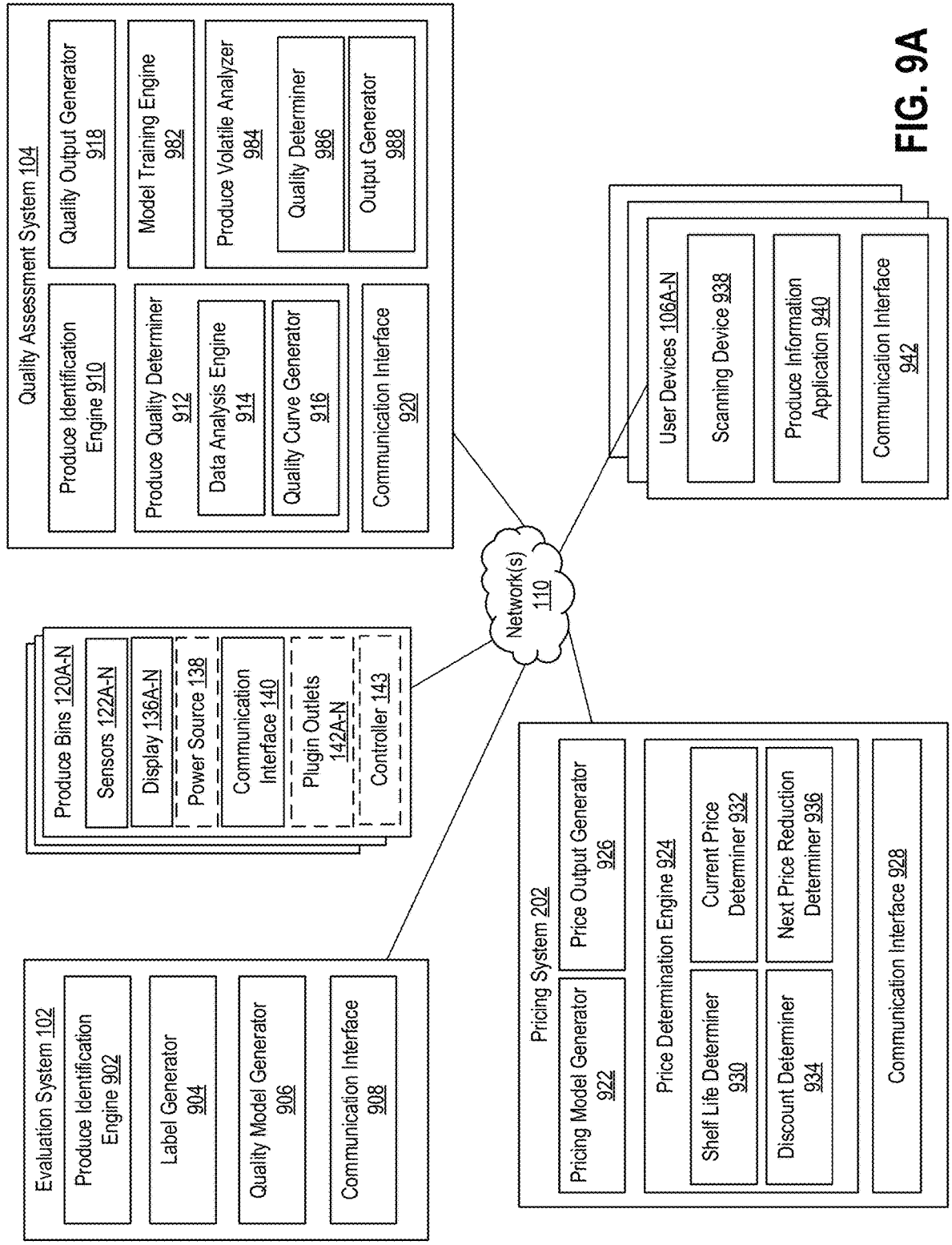
FIGS. 9A-B are system diagrams of components that are used to perform the techniques described throughout this disclosure.
Figure 9B:
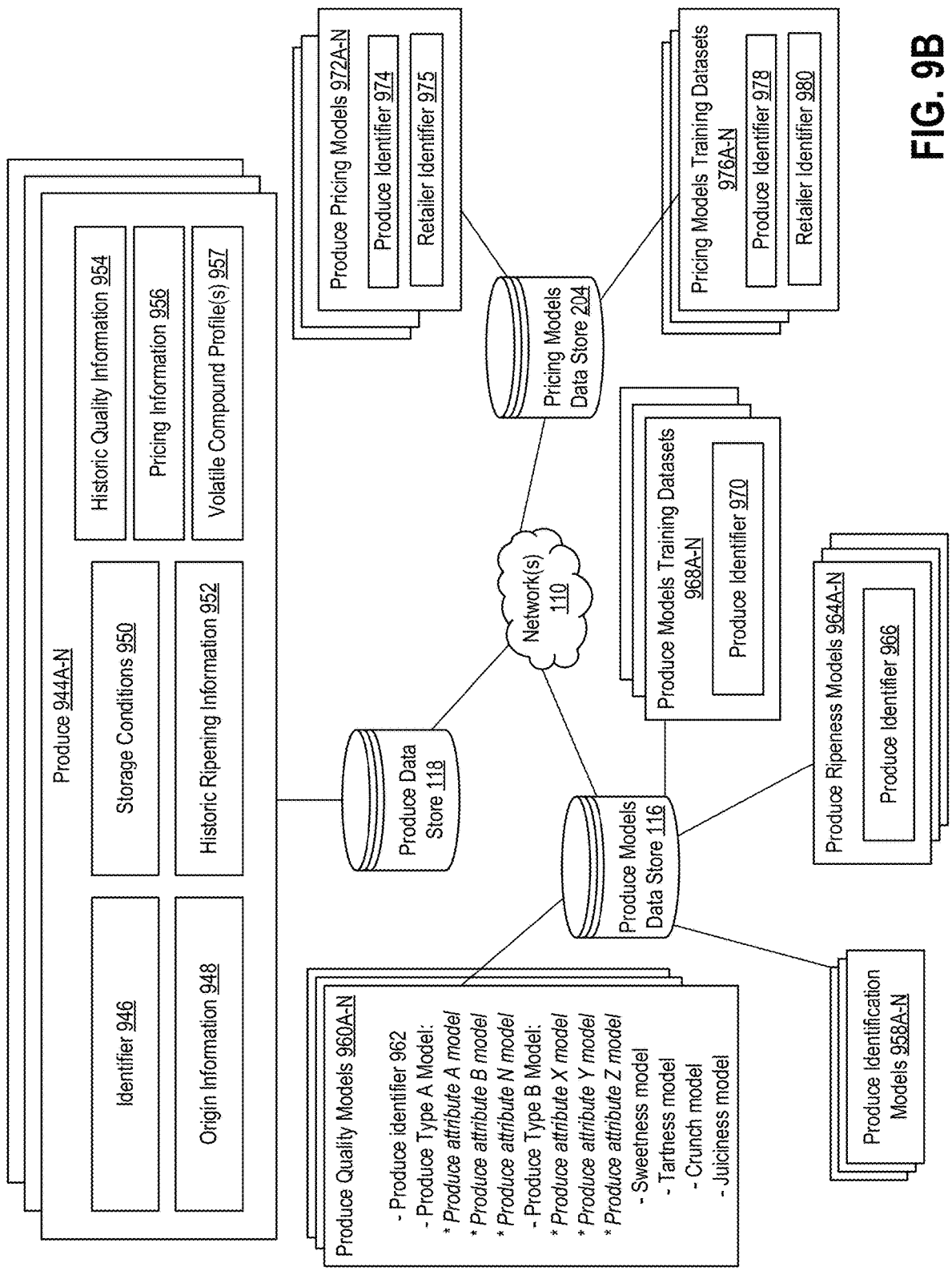

FIGS. 9A-B are system diagrams of components that are used to perform the techniques described throughout this disclosure. FIG. 9A depicts components of computer systems that can be used. FIG. 9B depicts data stores that can be used. Referring to both FIGS. 9A-B, the evaluation system 102, produce bins 120A-N, quality assessment system 104, pricing system 202, user devices 106A-N, produce data store 118, produce models data store 116, and pricing models data store 204 can communicate via the network(s) 110. As described herein, one or more of the systems can be combined into a computing system, servers, network, etc. Moreover, one or more of the data stores can also be combined.

The evaluation system 102 can include a produce identification engine 902, a label generator 904, a quality model generator 906, and a communication interface 908. The produce identification engine 902 can be configured to identify produce during an initial evaluation. For example, the engine 902 can receive image data of produce. The engine 902 can extract a portion of the image data that includes one of the produce (if there are multiple produce in the image data) or the only piece of produce. Using one or more machine learning and/or deep learning techniques, algorithms, and/or models (e.g., convolution neural networks), the engine 902 can identify and label features in the extracted portion of the image data that can associate the imaged produce with a type of produce. Moreover, the engine 902 can use object detection techniques in order to accurately identify the produce. Any information that is identified or learned about the produce by the produce identification engine 902 can be stored in the produce data store 118.

The produce data store 118 can contain produce profiles 944A-N. Each produce that is identified by the evaluation system 102 can be assigned a profile. The profile can be a collection of information that is received or learned by the evaluation system 102 as well as the quality assessment system 104 and/or the pricing system 202. The produce profiles 944A-N can each include an identifier 946, origin information 948, storage conditions 950, historic ripening information 952, historic quality information 954, and pricing information 956. Any of the information 948, 950, 952, 954, and 956 can be dynamically updated in real-time as assessments and determinations are made by the evaluation system 102, the quality assessment system 104, and the pricing system 202. Moreover, any of the information 948, 950, 952, 954, and 956 can be dynamically updated in real-time based on information that is received or otherwise stored by relevant stakeholders throughout the supply chain.

The label generator 904 can be configured to generate a unique identifier (e.g., barcode, label, sticker, QR code, SKU) for the produce once the produce is identified. The unique identifier 946 can be used to identify the particular produce throughout the supply chain. The unique identifier 946 can also be used to associate quality information with the particular produce. The unique identifier 946 can also be used to store and retrieve information about the particular produce from one or more of the data stores 118, 116, and 204.

The quality model generator 906 can be configured to generate one or more machine learning models to identify particular features in the particular produce. The models can be trained, as described throughout this disclosure, to identify the features indicative of quality of the produce when the quality assessment system 104 receives a request for the quality of the produce. The generator 906 can generate multiple models per produce that is identified by the produce identification engine 902. For each example, each model can be configured to determine a different quality feature of the particular produce, as described throughout this disclosure. The quality model generator 906 can also be configured to improve existing models based on quality determinations made by the quality assessment system 104 at a later time. The generator 906 can also improve existing models using information that is received about a supply chain and/or the particular produce from relevant stakeholders throughout the supply chain.

Models generated by the quality model generator 906 can be stored in the produce models data store 116. The produce data store 116 can contain different types of models, such as produce identification models 958A-N, produce quality models 960A-N, and produce ripeness models 964A-N. The produce data store 116 can also contain produce models training datasets 968A-N. The produce identification models 958A-N can be used by the produce identification engine 902 of the evaluation system 102. One or more of these models 958A-N can also be used by a produce identification engine 910 of the quality assessment system 104. The models 960A-N and 964A-N can also include produce identifiers 962 and 966, respectively. The identifiers 962 and 966 can be used to associate the models 960A-N and 964A-N with the particular produce.

Moreover, as described throughout this disclosure, the quality model generator 906 can improve any of the models 958A-N, 960A-N, and 964A-N using the produce models training datasets 968A-N. The training datasets 968A-N can be associated with different produce based on a produce identifier 970. As an example, one training dataset can be associated with avocados while another training dataset can be associated with bananas. The produce identifiers 970 can be used to determine which training datasets 968A-N to apply to which models 958A-N, 960A-N, and 964A-N. The training datasets 968A-N can be made up of quality assessments and determinations made by the quality assessment system 104. The training datasets 968A-N can be made up of pricing metric adjustments and determinations made by the pricing system 202. The training datasets 968A-N can also be made up of information that is received from relevant stakeholders throughout the supply chain. For example, the information can include supply chain conditions, historic ripening information, transit conditions, ripening conditions, farming conditions, place of origin information, etc. Information can be continuously added to the datasets 968A-N such that they become robust collections of data that can be used to improve accuracy of any of the models 958A-N, 960A-N, and 964A-N described herein.

The produce bins 120A-N can include the sensors 122A-N, displays 136A-N, and the communication interface 140. Optionally, the produce bins 120A-N can include the power source 138, plugin outlets 142A-N, and/or controller 143. Refer to FIGS. 1B-F for additional discussion about the configuration of the produce bins 120A-N. As described herein, the produce bins 120A-N can be any type of structure configured to directly hold produce, such as boxes, bins, containers, crates, pallets, and/or shelves. The produce bins 120A-N can also include support structures, such as racks and/or shelves, configured to hold produce or containers of produce. Moreover, any of the components described in reference to the produce bins 120A-N can be embedded into the produce bins 120A-N and/or retrofitted to existing produce bins in a store or other part of the supply chain lifecycle.

In some implementations, the controller 143 can perform one or more of the techniques described herein. For example, the controller 143 can receive volatiles collected by the sensors 122A-N and process/model the volatiles using one or more produce quality models 960A-N from the produce models data store 116. In some implementations, the volatiles can be transmitted to the quality assessment system 104 for processing and analysis/modeling.

The quality models 960A-N can be generated and trained using the disclosed techniques to determine and predict various quality metrics of various types of produce. For example, the quality models 960A-N can include at least one model per produce type with sub-models for each quality metric of that produce type. Each of the quality models 960A-N can include a respective produce identifier 962, which can be used by components, such as the controller 143 and/or the quality assessment system 104, to retrieve the appropriate models to apply in runtime. The quality models 960A-N can also include a produce type A model and sub-models for produce type A that can include produce attribute A model, produce attribute B model, to produce attribute N model. The quality models 960A-N can also include a produce type B model and sub-models for produce type B that include produce attribute X model, produce attribute Y model, to produce attribute Z model. Produce type A can be avocados and the sub-models can include avocado ripeness, avocado firmness, avocado taste, avocado odor, etc. Produce type B can be oranges and the sub-models can include orange sweetness, orange tartness, orange juiciness, orange dryness, etc. As described above, the quality models 960A-N can include models for various other produce types as well. The quality models 960A-N can also include more generic models that can be applied to a variety of produce types, such as a sweetness model, tartness model, crunch model, and/or juiciness model. One or more of the quality models 960A-N can also use varying inputs. For example, some of the quality models 960A-N can use the volatile measurements collected by the sensors 122A-N as inputs while other models can use produce identification scans, barcodes, or other non-invasive measurements as input.

Volatiles that are processed and analyzed by either the controller 143 or the quality assessment system 104 can be stored as volatile compound profile(s) 957 in produce data 944A-N in the produce data store 118. The profile(s) 957 can include quality curves determined based on the volatiles, current quality metrics of the produce, projected quality metrics of the produce, and/or a breakdown of volatiles that were collected and analyzed for the particular produce 944A-N.

The controller 143 can determine one or more updated outputs to be presented at the respective display 136A-N of the respective produce bin 120A-N. In some implementations, the quality assessment system 104 can determine the updated output and transmit it to the respective produce bin 120A-N for display at the respective display 136A-N.

The quality assessment system 104 can include a produce identification engine 910, a produce quality determiner 912, a quality output generator 918, a model training engine 982, a produce volatile analyzer 984, and a communication interface 920. The produce identification engine 910 can operate similarly to the produce identification engine 902 of the evaluation system 102. The produce identification engine 910 can receive image data or other data about produce that a user requests to have assessed by the quality assessment system 104. Using the received data and one or more of the produce identification models 958A-N, the produce identification engine 910 can identify the produce. Identifying the produce can include identifying a label or other identifier associated with the particular produce.

Once the produce is identified, the produce quality determiner 912 can retrieve information from one or more of the data stores that can be used to assess the current quality of the produce. The produce quality determiner 912 can include a data analysis engine 914 and a quality curve generator 916. The data analysis engine 914 can be configured to process information about the produce that can be used to determine the current quality of the produce.

For example, the quality analysis engine 914 can apply one or more quality models to the produce information. Using the produce identifier that was identified by the produce identification engine 910, the quality analysis engine 914 can retrieve one or more produce quality models 960A-N and/or produce ripeness models 964A-N from the produce models data store 116. Each of the models 960A-N and 964A-N can have produce identifiers 962 and 966, respectively, that can be correlated and associated with the identifier that was found by the produce identification engine 910. Thus, appropriate models can be selected to determine quality of the particular produce.

The quality curve generator 916 can be configured to generate a quality curve that can indicate quality of the produce over a period of time. The curve, as described throughout this disclosure (e.g., refer to FIGS. 7, 8), can demonstrate quality of the produce from a time of first evaluation by the evaluation system 102, a current time of the request for the produce quality metrics, and a projected future time. Using the generated curve, the produce quality determiner 912 can determine an overall current quality of the produce. The determiner 912 can also determine a projected future quality of the produce, a remaining shelf life of the produce, an amount of time until the produce is at peak ripeness, a remaining amount of time that the produce is at peak ripeness, etc. The produce quality determiner 912 can make such determinations using one or more machine learning trained models and/or deep learning algorithms. Furthermore, quality determinations can be stored in the produce data store 118.

The quality output generator 918 can generate output that indicates the current quality of the produce. The output can include visuals, graphical depictions, numeric values, Boolean values, and/or string descriptors that indicate the current quality of the produce, as determined by the produce quality determiner 912. The quality output generator 918 can also transmit the output to one or more of the user devices 106A-N (such as the requesting user device) for display to a user.

Figure 18:
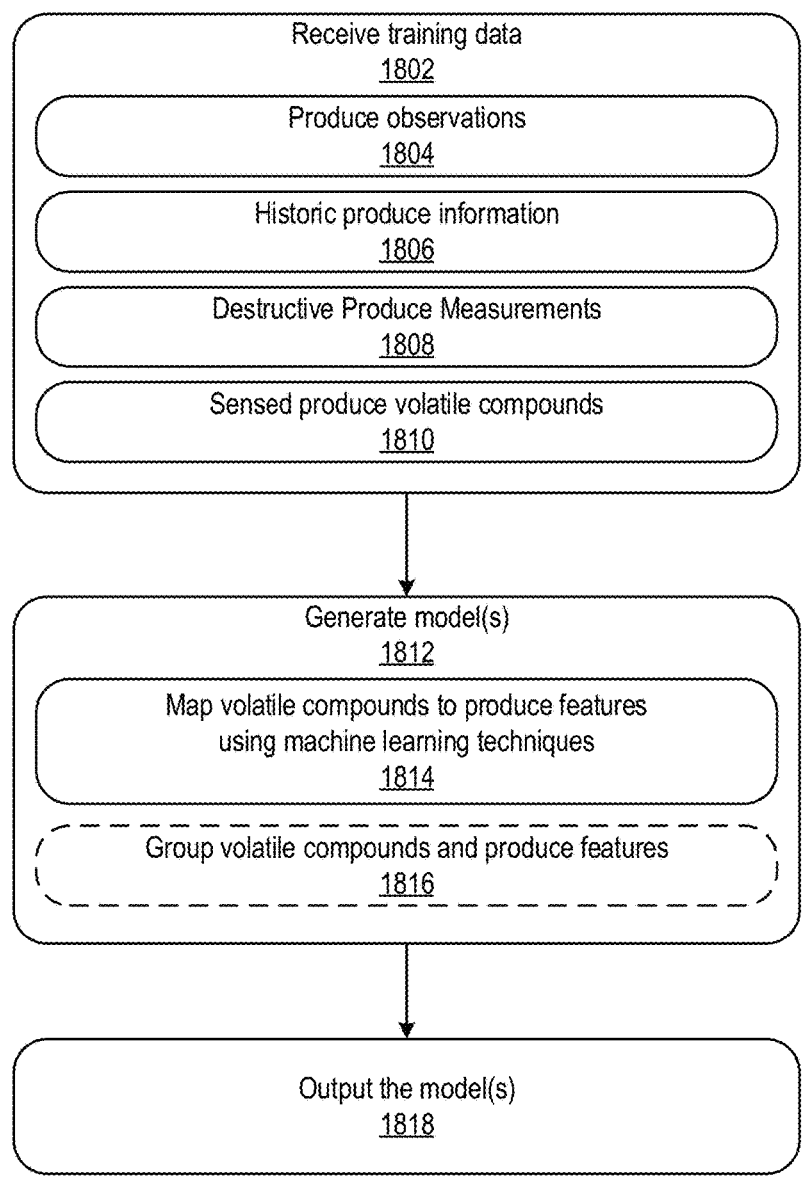
FIG. 18 is a flowchart of a process for training models that assess produce quality.

The model training engine 982 can be configured to generate, train, validate, and/or update any of the models described throughout this disclosure. The engine 982 can perform similar or the same functions as the quality model generator 906 of the evaluation system 102. Refer to FIG. 18 for additional discussion about model training.

The produce volatile analyzer 984 can be configured to receive the volatiles collected by the sensors 122A-N at the respective produce bin 120A-N. The analyzer 984 can process and analyze the received volatiles to determine quality metrics for the respective produce in the respective produce bin 120A-N. The analyzer 984 can include a quality determiner 986 and an output generator 988.

The quality determiner 986 can be configured to model the volatiles using any one or more of the quality models 960A-N described above. By modeling the volatiles, the quality determiner 986 can determine current quality metrics of produce that released the volatiles. The quality determiner 986 can also predict future quality metrics of the produce based on providing volatiles data as input to the retrieved quality models 960A-N. As described in reference to FIG. 7, the quality determiner 986 can generate a produce quality curve based on analyzing and modeling the volatiles released by the produce and optionally one or more other non-destructive measurements of the produce. In some implementations, the quality determiner 986 can retrieve the volatile compound profile(s) 957 for the produce from the produce data store 118, which can then be provided as input to the retrieved quality models 960A-N.

The output generator 988 can be configured to generate output to be presented at the respective display 136A-N of the respective produce bin 120A-N containing the produce that was assessed. For example, the generator 988 can generate text indicating a level of ripeness, firmness, taste, sweetness, juiciness, or readiness to eat of the produce in the respective produce bin 120A-N. The generator 988 can also generate text indicating a current price, price adjustments, offers, and/or discounts for the produce in the respective produce bin 120A-N. The output can be generated based on the quality metric(s) or other quality determinations made by the determiner 986. In some implementations, the output can be generated based on determinations made by other components, such as price adjustments made by the pricing system 202 and other quality determinations made by the produce quality determiner 912 of the quality assessment system 104.

The pricing system 202 can include a pricing model generator 922, a price determination engine 924, a price output generator 926, and a communication interface 928. The pricing model generator 922 can be configured to generate and train one or more models that can be used to determine price adjustments and discounts of produce based on the produce's quality. The models can be generated using training data sets including information specific to the produce as well as grocers, retailers, or other relevant stakeholders in the supply chain. The training datasets can be stored in the pricing models data store 204 as pricing models training datasets 976A-N. Each of the pricing models training datasets 976A-N can also include corresponding produce identifier 978 and retailer identifier 980. The pricing models training datasets 976A-N can be updated over time to include additional information that can be used to train and improve the pricing models. For example, the pricing models training datasets 976A-N can include pricing metric determinations that have been made by the pricing system 202. The pricing models training datasets 976A-N can also include consumer surveys that indicate what dimensions of quality they care about when it comes to making a purchase decision.

As mentioned, different pricing models can be generated for different retailers. For example, one grocery store retailer can prefer a steady percentage decrease in price every day after a particular type of produce reaches peak ripeness. Another retailer can prefer that once any produce passes peak ripeness, the produce's price is discounted by a set amount, such as 50%. The pricing model generator 922 can train and generate machine learning based models that cater to the preferences and standards of each retailer. These models can then be associated with particular retailers using the retailer identifier 980 in the pricing models data store 204.

Moreover, the pricing models can be generated based on quality features of the produce. Each type of produce can have one or more different pricing models. As an example, one pricing model can be generated for adjusting price of avocados that develop internal rot, another pricing model can be generated for adjusting price of avocados based on firmness, and another pricing model can be generated for adjusting price of avocados based on ripeness stage.

The pricing model generator 922 can also improve the generated pricing models using information received from relevant stakeholders in the supply chain. For example, one retailer can decide to put all produce that has reached peak ripeness during a holiday time period. This information can be provided to the pricing model generator 922 and used to accordingly modify and train one or more models for that particular retailer.

Pricing models generated by the pricing model generator 922 can be stored in the pricing models data store 204. The models can be stored as produce pricing models 972A-N. Each of the produce pricing models 972A-N can also be stored with corresponding produce identifier 974 and/or retailer identifier 975. Therefore, produce pricing the models 972A-N can be identified and retrieved in the data store 204 using the produce identifier 974 and/or the retailer identifier 975.

The price determination engine 924 can be configured to determine price adjustments and/or discounts in real-time. The price determination engine 924 can also determine an amount of time that adjustments or discounts can be applied. Such a determination can be based off retailer preferences. Moreover, the price adjustments or discounts can be provided by the retailer, supplier, or other relevant stakeholder in the supply chain.

The price determination engine 924 can be triggered once the quality assessment system 104 receives a request for quality information of a scanned produce. Once the quality assessment system 104 determines the current quality of the produce, that quality information can be transmitted to the pricing system 202. The price determination engine 924 can apply one or more of the pricing models 972A-N to the quality information to determine pricing adjustments for the particular produce. The price determination engine 924 can include one or more modules. For example, the engine 924 can include a shelf life determiner 930, a current price determiner 932, a discount determiner 934, and a next price reduction determiner 936.

The shelf life determiner 930 can be configured to determine a remaining shelf life of the produce. The shelf life determiner 930 can access, from the produce data store 118, historic information about the particular produce and/or standards and procedures of the retailer that has the produce on the shelf. The shelf life determiner 930 can also retrieve one or more models from the models data stores 116 and/or 204. Using the quality information received from the quality assessment system 104, the information from the data store 118, and the model(s) from the data stores 116 and/or 204, the shelf life determiner 930 can identify how much time the produce has left on the shelf before it is no longer consumable or desirable for purchase. The shelf life determiner 930 can also identify protocols for getting the produce off the shelf, shelf arrangement, and/or pricing decisions that correspond to the remaining shelf life of the produce. Determinations made by the shelf life determiner 930 can be used by one or more modules of the price determination engine 924 in identifying pricing metric adjustments for the produce.

The current price determiner 932 can be configured to determine a price for the produce. The price may not be tailored or specific to the current quality of the particular produce. Instead, the price can be generic and applicable to all produce of the same type, regardless of their quality. The current price determiner 932 can retrieve one or more pricing models 972A-N from the pricing models data store 204 that correspond to the particular produce and the retailer or other relevant stakeholder. In some implementations, the current price determiner 932 can also receive information about current market conditions and/or competitor pricing, which can also be used to determine a current price of the produce.

The discount determiner 934 can be configured to determine an adjustment to the price of the produce based on the current and/or projected quality of the produce. The discount can be based on the remaining shelf life of the produce, as determined by the shelf life determiner 930. The discount can also be based on any quality information that is received from the quality assessment system 104 and/or retrieved from the produce data store 118. The discount determiner 934 can be configured to increase or decrease the current price of the produce. The discount determiner 934 can also take into consideration prices or discounts of other produce of the same type to determine a pricing metric adjustment for the particular produce. For example, if the produce is an avocado and the avocado has not yet reached peak ripeness, the discount determiner 934 can increase the price of this particular avocado. The increased price can deter consumers from purchasing the particular avocado. As a result, the consumers can be more inclined to purchase the less expensive avocados, which may already be ripe or past peak ripeness. This can be advantageous to reduce or eliminate produce-based waste. The price of the particular avocado can then be adjusted at a later time to reflect the quality of the avocado at that later time (e.g., the avocado may reach peak ripeness and the price can begin to decrease).

The next price reduction determiner 936 can be configured to project when the produce's price will be adjusted in the future and by how much. In some implementations, the next price reduction determiner 936 can receive projected quality conditions of the produce from the quality assessment system 104. For example, the quality curve generator 916 of the quality assessment system 104 can generate a ripeness curve for a particular avocado that depicts a current ripeness of the particular avocado as well as projected ripeness over the avocado's remaining shelf life. The next price reduction determiner 936 can receive the ripeness curve and apply one or more machine learning trained models to determine where along the ripeness curve one or more price adjustments can be made. The next price reduction determiner 936 can also correlate those points along the ripeness curve with days from a current time. For example, the avocado can be at peak ripeness at the current time. The ripeness curve can indicate that the avocado will pass peak ripeness two days from the current time. The next price reduction determiner 936 can therefore project that the next price reduction will be two days from the current time. The next price reduction determiner 936 can apply one or more additional models to determine what the next price reduction will be two days from the current time. In some implementations, the next price reduction determiner 936 can communicate with the discount determiner 934 and request the discount determiner 934 to identify the price reduction that may occur two days from the current time.

The next price reduction determiner 936 can also project future price changes based on the remaining shelf life determination of the shelf life determiner 930. In some implementations, the next price reduction determiner 936 can also project future price changes based on information received from stakeholders throughout the supply chain. The information can include changes in retailer preferences, current or future retailer sales or promos, market changes, competitor changes, etc.

The price output generator 926 can be configured to generate output indicating pricing information for the produce. The output can include the current price of the produce, a discount on the current price, when the next price reduction will occur, and/or what the next price reduction will be. Different output can also be generated based on a type of user requesting the quality and price information of the produce. For example, the price output generator 926 can generate output for a grocer at a checkout lane that is different than output for a consumer at a display shelf. The output for the grocer can indicate an adjusted price for the produce, which can automatically be applied to a consumer's bill/receipt. The output for the consumer can indicate what discount the consumer should be expecting if they decide to purchase the produce. In other words, the output for the consumer may not automatically apply the adjusted price to the consumer's bill/receipt.

The price output generator 926 can also be configured to generate coupons that can be applied at time of purchase. For example, the coupons can be digital, and the consumer can save the coupons to their user device. The consumer can then present the digital coupons at the checkout counter such that the discount can be applied to the consumer's bill/receipt. The coupons can also be physical coupons that can be printed at a device in the store. The device can be located near the produce shelf such that the consumer can pick up a corresponding physical coupon after receiving information about the quality and price of the produce at their user device. The user can then present the physical coupon at the checkout counter.

Pricing metric determinations, adjustments, and/or discounts made by the pricing system 202 can be stored in the produce data store 118 for the corresponding produce profiles 944A-N.

The user devices 106A-N can be used by different types of users to request quality information about produce. The users can include but are not limited to consumers in a grocery store, retailers, vendors, grocers, store employees and any other relevant stakeholders in the supply chain. The user devices 106A-N can include computers, tablets, laptops, mobile devices, smartphones, and/or cell phones. For example, a shopper in a grocery store can use a smartphone to request quality information about produce that the shopper desires to purchase.

The user devices 106A-N can include at least a scanning device 938, a produce information application 940, and a communication interface 942. The scanning device 938 can include optical sensors for capturing information about produce in the user's surrounding environment. For example, the scanning device 938 can be one or more cameras, such as a camera on a smartphone. The scanning device 938 can also include a barcode scanner or reader or other similar scanning devices. As an example, the shopper can take a picture of the produce using the scanning device 938. The shopper can take multiple pictures of the produce. The shopper can also provide other input to the user device 106A-N using one or more input devices, such as a keyboard, microphone, and/or touchscreen. For example, the shopper can manually type in a name or other product identifier for the produce.

The produce information application 940 can be downloaded or otherwise accessible at the user devices 106A-N. The produce information application 940 can be presented to the user via a graphical user interface (GUI) display of one or more output devices (e.g., touch screen, display, etc.) of the user devices 106A-N. As described further below, the user can use the produce information application 940 to request and view information about quality of produce (e.g., refer to FIGS. 13-16). The produce information application 940 can also be used to view pricing information about the particular produce.

As an illustrative example, the user device can be a shopper's mobile phone. The shopper can take a picture of an avocado using the scanning device 938 of the mobile phone (e.g., camera). The mobile phone can send a request for quality information to the quality assessment system 104. The request can include the picture of the avocado. The produce information application 940 can then present, to the shopper, the quality information as determined by the quality assessment system 104.

As another example, if the user is a store employee, the produce information application 940 can present information to the employee such as ripeness trends for produce that the employee is using to stock shelves. The produce information application 940 can also present suggestions of how the employee should arrange the produce on the shelves based on the produces' current quality.

As yet another example, the user device can be a POS terminal at a checkout lane. The produce information application 940 at the POS terminal can present, to a grocer, an adjusted price of produce that is scanned by the grocer at the POS terminal.

Finally, the communication interfaces 908, 920, 928, and 942 of the evaluation system 102, quality assessment system 104, pricing system 202, and user devices 106A-N can be configured to provide communication between one or more of the components, systems, and data stores described herein.

Figure 10A:
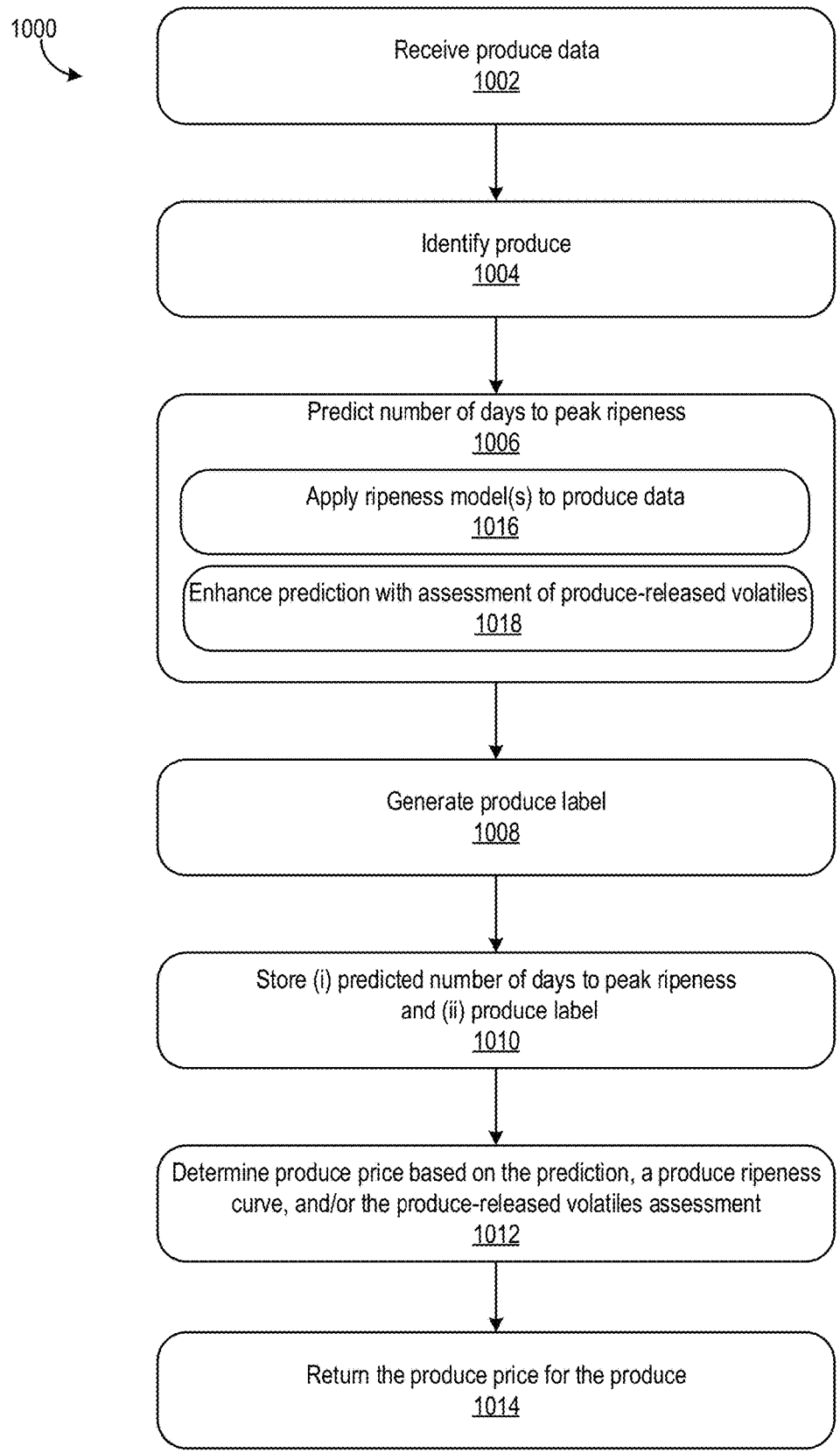
FIG. 10A is an overview flowchart of a process for evaluating produce.

FIG. 10A is an overview flowchart of a process 1000 for evaluating produce. One or more blocks in the process 1000 can be performed before the produce is put on shelves in a grocery store or otherwise presented to end consumers. For example, the process 1000 can be performed once the produce arrives at a distribution center or another storage facility in the supply chain. One or more blocks in the process 1000 can be performed by the evaluation system 102, quality assessment system 104, and/or pricing system 202. The process 1000 can also be performed by any other computer, device, and/or network of computers, devices, and/or servers. For illustrative purposes, the process 1000 is described from perspective of a computer system. The computer system can include one or more of the evaluation system 102, the quality assessment system 104, and/or the pricing system 202.

Referring to the process 1000 in FIG. 10A, produce data can be received by the computer system in 1002. The data can include image data, spectral data, x-ray data, and/or any other type of data that can be used by the computer system to identify the produce. For example, a distribution center worker can take images of the produce once it arrives at the distribution center. As another example, the produce can be automatically scanned by one or more imaging or scanning devices upon arrival at the distribution center. The produce can be moved along a conveyor belt and the one or more imaging or scanning devices can be arranged along the conveyor belt to continuously capture data (e.g., images) of the produce as it moves through the distribution center.

Using the received data, the computer system can identify the produce in 1004. One or more object recognition techniques and machine learning trained models can be used to identify the produce, as described throughout this disclosure. For example, the computer system can receive an image of a plurality of produce. The computer system can identify each produce in the image by generating a bounding box and grid structure around each produce. The computer system can then select each bounding box, extract the produce therein, and perform object recognition techniques to identify particular features of the produce. Using one or more machine learning trained models, the computer system can correlate the identified features to a particular type of produce, thereby identifying the produce.

The computer system can also predict a number of days until peak ripeness in 1006. Once the produce is identified, the computer system can apply one or more machine learning models associated with the particular type of produce to predict ripeness of the produce over time. For example, the computer system can apply at least one ripeness model to the produce data in 1016. As described herein, the models can be trained to identify and score features of the produce from image data that indicate stages of ripeness. The models can be trained using one or more destructive and non-destructive measurements to correlate color and/or spectral data with different stages of ripeness. The models can then be applied to the received produce data to determine the produce ripeness in a non-destructive manner.

The computer system can also enhance the prediction of the number of days until peak ripeness with an assessment of produce-released volatiles in 1018. As described throughout this disclosure, volatiles released by the produce can be collected by sensors positioned around/near the produce. The volatiles can be analyzed by the computer system using one or more models to determine quality metrics of the produce. For example, the volatiles can be modeled to determine a current ripeness of the produce. The volatiles can also be modeled to predict peak ripeness of the produce and/or future ripeness stages of the produce. The output from modeling the volatiles can be used to confirm or adjust the predictions made by applying the ripeness model(s) to the produce data in 1016. Therefore, the predictions can be more accurate. Enhancing the prediction with the assessment of the produce-released volatiles can also include further training or improving the ripeness model(s) that was applied in 1016. As a result, the ripeness model(s) can more accurately predict the number of days to peak ripeness for produce represented by the produce data.

The computer system can generate a produce label in 1008. For example, the computer system can assign a unique identifier, such as a barcode, stamp, sticker, QR code, and/or SKU, to the particular identified produce. The label can be used to identify the produce throughout the supply chain. A distribution center worker and/or an automated machine/device can also be configured to apply/attach the label to the particular produce.

The predicted number of days to peak ripeness and the produce label can then be stored by the computer system 1010. As described herein, the information can be stored in a data store, such as the produce data store 118.

The computer system can determine price of the identified produce in 1012 based on the prediction, a produce ripeness curve, and/or the produce-released volatiles assessment. For example, the computer system can determine an initial price of the produce. The initial price can be a price at which produce is sold at a grocery store, regardless of the produce's quality. One or more price adjustments and/or discounts can then be made to the initial price at a later time. The adjustments and/or discounts can be made when a consumer requests quality information and the quality of the produce is determined by the computer system to have changed since a time that process 1000 was performed.

In some implementations, the initial price can be the same for all produce of the same type. The initial price can be a price set by a store retailer. In some implementations, the initial price can be specific to the quality or current ripeness of the particular produce. Thus, each produce that is identified may have a different initial price. In yet some implementations, the initial price can be determined for one produce in a batch and all remaining produce in the batch can receive that initial price, regardless of the quality of each remaining produce. The price can be based on the predicted number of days to peak ripeness. The price can also be based on one or more other quality features or conditions of the produce that are identified by the computer system in 1004. Moreover, the price can be based on preferences of different stakeholders throughout the supply chain. The price can therefore be determined based on a plurality of different conditions, as described throughout this disclosure.

Still referring to 1012, the produce price can be based on the produce ripeness curve, which can be generated by the computer system as described in FIG. 7. The curve can be generated by modeling the produce data and/or the volatiles collected for the produce. The curve can indicate a current ripeness (or other quality metric) of the produce as well as past and predicted future ripeness levels of the produce. The curve, especially when adjusted or validated using the produce-released volatiles assessment, can be an indicator of how to adjust the price of the produce over time to avoid produce-based waste and encourage consumers to purchase the produce before it is no longer edible or consumable.

Similarly, the produce price can also be based on the produce-released volatiles assessment in 1012. For example, a level of ripeness of the produce can be determined from the volatiles assessment described throughout this disclosure. If the produce has a level of ripeness exceeding some threshold ripeness level for that type of produce, the price of the produce can be decreased by a predetermined amount. If, on the other hand, the produce has a level of ripeness that is less than the threshold ripeness level, the price of the produce can be increased by another predetermined amount. One or more other price adjustments can be determined and made based on the prediction, produce ripeness curve, and/or produce-released volatiles assessment in 1012.

In 1014, the computer system can return the produce price for the produce. Returning the produce price can include outputting the produce price in a mobile application presented at a user device of a shopper. Returning the produce price can include storing the price associated with the produce in a data store for later retrieval. For example, a shopper can scan the produce in the store. Based on identifying the produce from the scan, the user device can request the produce price from the data store and present the produce price in the mobile application at the user device. Returning the produce price can also include transmitting the produce price to a display of a produce bin containing the produce in the store. The display can then output the price along with other information about the produce.

In some implementations, the computer system can generate the produce label (1008) before predicting the number of days until peak ripeness (1006). In some implementations, blocks 1006 and 1008 can be performed simultaneously. Moreover, the computer system can determine the produce price (1012) at a same time that the computer system predicts the number of days until peak ripeness (1006). Blocks 1012 and 1006 can therefore be performed before, after, and/or simultaneously with generating the produce label in 1008 and storing the information in 1010.

Figure 10B:
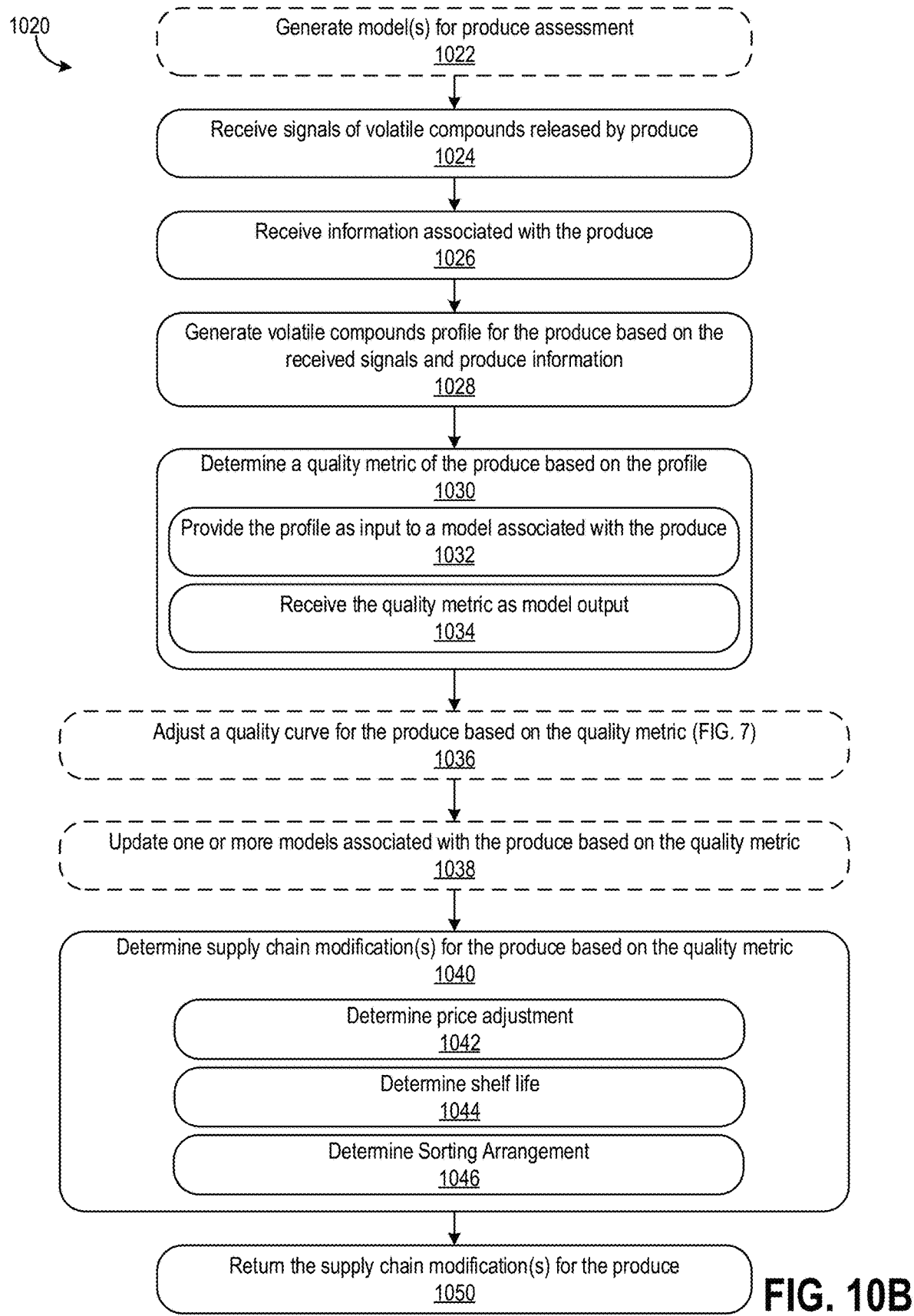
FIG. 10B is a flowchart of a process for evaluating produce based on assessment of volatiles emitted by the produce.

FIG. 10B is a flowchart of a process 1020 for evaluating produce based on assessment of volatiles emitted by the produce. The process 1020 can be performed in combination with one or more other processes described herein, such as the process 1000 in FIG. 10A, to determine supply chain modifications based on non-destructively assessed quality of the produce.

One or more blocks in the process 1020 can be performed by the evaluation system 102, quality assessment system 104, and/or pricing system 202. The process 1020 can also be performed by any other computer, device, and/or network of computers, devices, and/or servers, such as the controller 143 of each of the produce bins 120A-N. For illustrative purposes, the process 1020 is described from perspective of a computer system.

Figure 17:
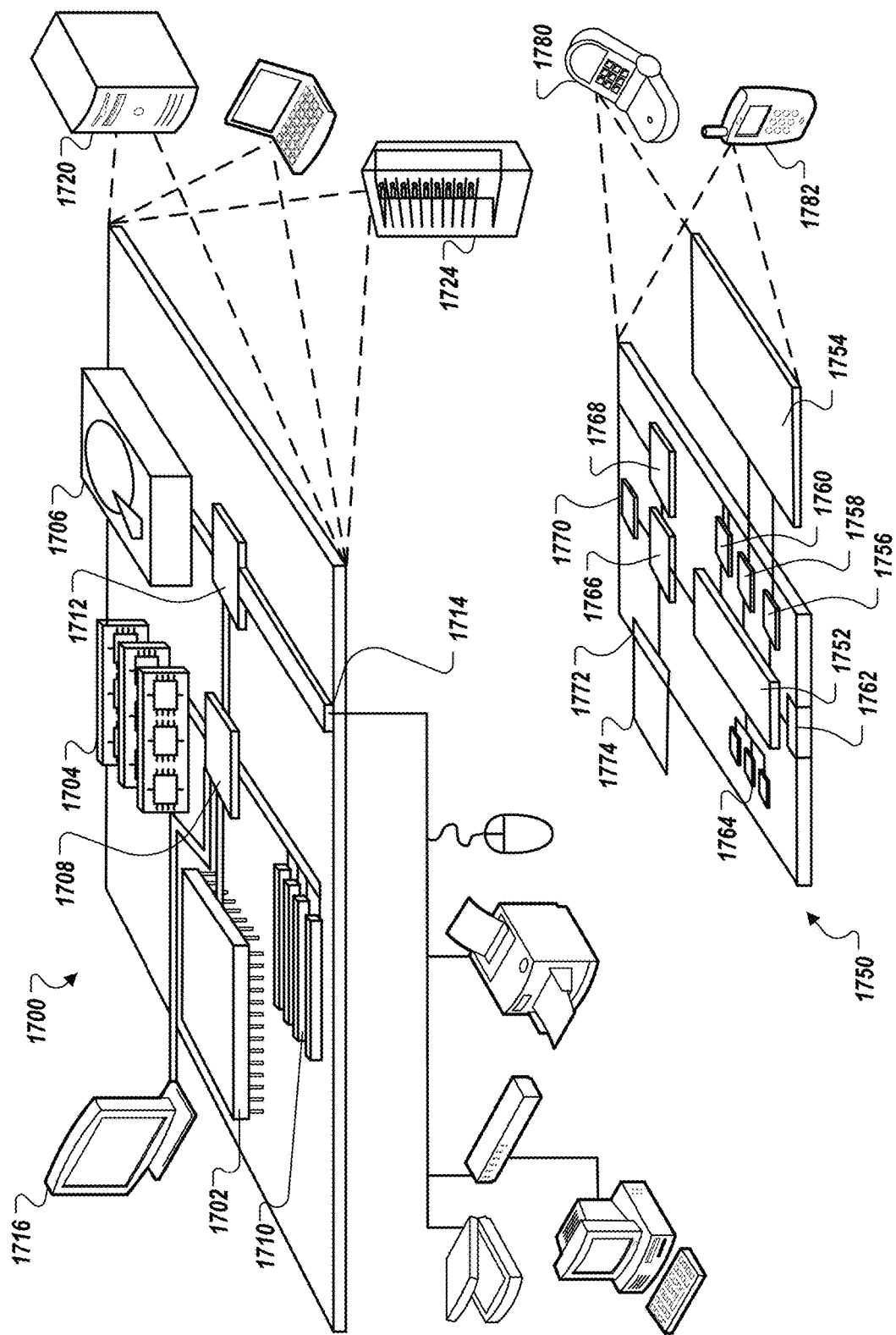
FIG. 17 is a block diagram of system components that can be used to implement a system for assessing the quality of one or more food items.

Referring to the process 1020 in FIG. 10B, machine learning models can be used to determine quality metrics and supply chain modifications based on the quality metrics from assessment of the volatiles released by the produce. Accordingly, the computer system can optionally generate the model(s) for produce assessment in 1022. The model(s) can be generated before runtime use with volatiles assessment. The model(s) can also be generated during runtime use. Refer to FIG. 17 for additional discussion about training the model(s).

The computer system receives signals indicative of volatile compounds released by the produce in 1024. More specifically, the computer system can receive signals indicative of the presence and/or amount of the released volatile compounds. The signals can be received from sensors positioned around/near the produce, as described in reference to FIGS. 1C-F. The sensors can transmit one signal that batches all signals from the sensors around/near the produce. In some implementations, the each of the sensors can transmit individual signals to the computer system for processing.

The computer system can receive additional information associated with the produce in 1026. The additional information can include produce type, produce age, produce storage time, produce quantity, produce storage conditions, produce transit conditions, information about a place of origin of the produce, supply chain conditions associated with the produce, etc. The additional information can also include historic information about the produce or produce of the same type as the produce in 1024. The historic information can include past volatile compound profiles for the produce at one or more various stages in the produce's lifecycle. The historic information can be used, for example, to determine whether predicted quality metrics of the produce based on current volatiles assessment are in line with expected quality metrics of the produce. In some implementations, the additional information can include a produce quality curve, such as the ripeness curve described further in FIG. 7.

The computer system can generate a volatile compound profile for the produce based on the received signals and produce information in 1028. The profile can include information contained in the signal, such as presence and/or amounts of detected volatile compounds. The computer system can generate the volatile compound profile to be a data structure that can be provided as input to one or more machine learning trained models described herein.

The computer system can determine a quality metric (e.g., one or more freshness parameter values) of the produce based on the profile in 1030. For example, the computer system can provide the volatile compound profile as input to a model associated with the produce in 1032. The model receives and processes the volatile compound profile to determine the quality metric for the produce. The computer system can then receive the quality metric as model output in 1034. The model can be any one or more of the machine learning trained models described throughout this disclosure. Moreover, the quality metric can be any of the quality metrics and/or freshness parameter values described throughout this disclosure. The determined quality metric can vary depending on the type of produce and/or characteristics of the produce that are assessed from the volatile compounds and modeled. The quality metric can include, but is not limited to, ripeness, freshness, shelf life, firmness, odor, sweetness, juiciness, tartness, dryness, and other quality metrics that may impact consumer decisions in purchasing and consuming the produce.

Optionally, the computer system can adjust a quality curve for the produce based on the quality metric in 1036. Adjusting the quality curve for the produce can result in improving accuracy of the model(s) in non-destructively determining current and projected quality of the produce. Refer to FIG. 7 for additional discussion.

Additionally or alternatively, the computer system may optionally update one or more models associated with the produce based on the quality metric in 1038. The computer system may also update the model(s) based on the adjusted quality curve for the produce. As mentioned above in reference to 1036, updating the model(s) can increase accuracy of the model(s) in non-destructively determining current and/or projected quality of the produce.

In 1040, the computer system can determine one or more supply chain modifications for the produce based on the quality metric. Determining supply chain modifications can include determining a price adjustment (1042), determining a shelf life (1044), and/or determining a sorting arrangement (1046). Refer to at least FIGS. 2-4 for discussion about determining the price adjustment, at least FIGS. 1A and 4 for determining the shelf life of the produce, and at least FIGS. 5A-D for determining the sorting arrangement. In some implementations, the model used for determining the quality metric in 1030-1034 can also determine the supply chain modification(s) in 1040-1046 and provide the supply chain modification(s) as output to the computer system.

As an illustrative example, the computer system can determine the price adjustment in 1042 by comparing a ripeness value (the quality metric) of the produce to a pricing table containing one or more ripeness value ranges correlated with respective pricing values. If the ripeness value provided as output from the produce model is within one of the ripeness value ranges, the computer system returns the corresponding pricing value for the price adjustment in 1042.

As another illustrative example, the computer system can determine the shelf life in 1044 by comparing the presence and/or amount of one or more volatile compounds of the volatile compound profile to a shelf life table containing one or more exemplary volatile compound profiles correlated with respective shelf lives of the particular type of produce. If the presence and/or amount of the one or more volatile compounds is within one of the exemplary value ranges in the table, the computer system returns the corresponding shelf life for the shelf life determination in 1044.

As another illustrative example, the computer system can determine the sorting arrangement in 1046 by comparing the quality metric to one or more sorting arrangement tables containing suggested arrangements of the particular type of produce based on the quality metric. The computer system can also compare the determined quality metric for a first group of produce to a determined quality metric for a second group of produce to determine where to arrange the first group of produce relative to the second group of produce. If, as an illustrative example, the second group of produce is riper than the first group of produce, the second group of produce can be arranged closer to an entrance of a store or a consumer's travel path through the store to incentivize the consumer to purchase the riper produce before the less ripe produce.

The computer system can return the supply chain modification(s) for the produce in 1050. As described herein, the supply chain modification(s) can be transmitted to a display of a produce bin that contains the produce. The modification(s) can then be presented as output on the display, such as the price adjustment, the shelf life, or another quality metric of the produce. The modification(s) can also be transmitted to a user device of a consumer and presented in a mobile application at the user device. The modification(s) can also be transmitted to a device of an employee in the store such that the employee can accordingly arrange the produce in a display at the store. Returning the supply chain modification(s) can also include storing them in a data store in association with the produce.

Figure 11:
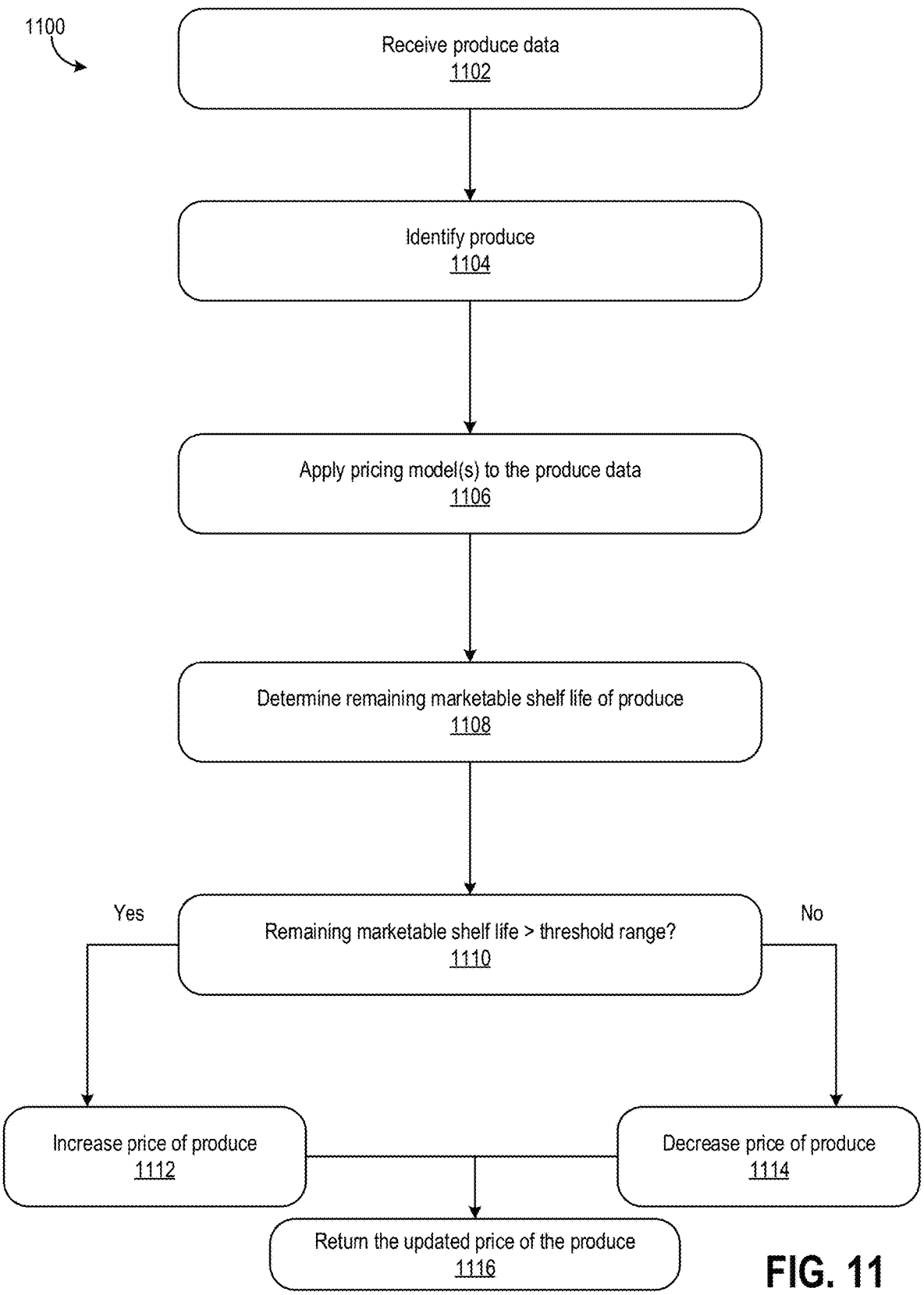
FIG. 11 is a flowchart of a process for determining a price of produce.

FIG. 11 is a flowchart of a process 1100 for determining a price of produce. One or more blocks in the process 1100 can be performed at a current time when a consumer or other user requests quality information for the produce. For example, the process 1100 can be performed when the user scans the produce on a display shelf at a grocery store. One or more blocks in the process 1100 can be performed by the evaluation system 102, quality assessment system 104, and/or pricing system 202. The process 1100 can also be performed by any other computer, device, and/or network of computers, devices, and/or servers. For illustrative purposes, the process 1100 is described from perspective of a computer system. The computer system can include one or more of the evaluation system 102, the quality assessment system 104, and/or the pricing system 202.

The computer system can receive produce data in 1102. As described herein, the data can be image data captured by an optical sensor of a mobile device. For example, a consumer can take a picture of the produce at the grocery store. In some implementations, the produce data can include a determination of the current quality of the produce. In some implementations, as described herein, the produce data can include a volatiles compound profile for the produce. The volatiles compound profile can then be analyzed by the computer system and modeled in order to determine quality metrics of the produce, such as the current quality of the produce and/or a remaining marketable shelf life of the produce.

The computer system can identify the produce in the data, as described throughout this disclosure (1104). Identifying the produce can include detecting and decoding a product identifier that appears in the produce data. In some implementations, identifying the produce can also include determining a current quality of the produce, as described herein.

The computer system can then apply one or more pricing models to the produce data in 1106. The computer system can select pricing models that are associated with the identified produce. For example, the computer system can use the decoded product identifier to retrieve pricing models from a data store that correspond to the particular type of produce. The computer system can also select pricing models that are associated with the particular grocery store or other relevant stakeholder. The models can be used to determine pricing metric adjustments based on the current quality of the produce.

Quantifiable metrics of quality can be used to dynamically adjust price. Such quantifiable metrics can be identified using one or more of the pricing models. The metrics of quality can be different according to produce category. The metrics can include size, color, firmness, likelihood of mold, flavor, nutrient content, use of pesticides, etc. The quantifiable dimensions of quality can be predicted as a function of a position of the produce in the supply chain by making a limited number of upstream measurements. Thus, the pricing models can be trained using large amounts of training data that can be collected using non-destructive measurement techniques. The non-destructive measurement techniques can be linked to destructive measurements that have been established in order to provide accurate ground truth information about how pricing metrics can be adjusted based on quality.

The computer system can also determine a remaining marketable shelf life of the produce in 1108. This determination can impact adjustments to the price of the produce. In some implementations, this determination can impact future prices of the produce. This determination can be made by the computer system using one or more of the pricing models that are applied in 1106.

The computer system can determine whether the remaining marketable shelf life exceeds a threshold range in 1110. The threshold range can be different based on the type of produce and/or retailer preferences/selling conditions. For example, some retailers can prefer to keep produce on the shelves until they are sold, regardless of their quality. Other retailers can prefer to remove produce from the shelves once the produce hits a certain low level of quality. Price can therefore be reduced closer to the end of the produce's marketable shelf life.

If the remaining marketable shelf life exceeds the threshold range, the computer system can increase the price of the produce (1112). In other words, the produce has a long shelf life. The long shelf life can indicate that the produce is not yet ripe. The long shelf life can also indicate that it will take a longer amount of the time for the produce to lower in quality. Increasing the price can be advantageous to deter consumers from purchasing the particular produce until the produce has less of a shelf life. The higher price can therefore attract consumers to purchasing produce having a lower price, which can correspond to a shorter shelf life. If consumers purchase the lower priced produce first, then produce-based waste can be avoided or mitigated. The lower priced produce can be removed from the shelves before that produce's marketable shelf life expires.

If the remaining marketable shelf life does not exceed the threshold range, the computer system can decrease the price of the produce (1114). In other words, the produce has a shorter shelf life. The shorter shelf life can indicate that the produce has passed peak ripeness. The short shelf life can indicate that the produce's quality is on a decline. Decreasing the price of such produce can be advantageous to attract consumers to purchase this produce before its shelf life expires. As a result, produce-based waste can be avoided or mitigated.

The computer system can then return the updated price of the produce in 1116. As described herein, the updated price can be transmitted to a display at a produce bin containing the produce. The updated price can be outputted at the display. The updated price can also be transmitted to a user device of a consumer in the store. The updated price can be transmitted to a POS terminal in a checkout lane of the store. The updated price can also be stored in a data store for future retrieval and use.

Figure 12:
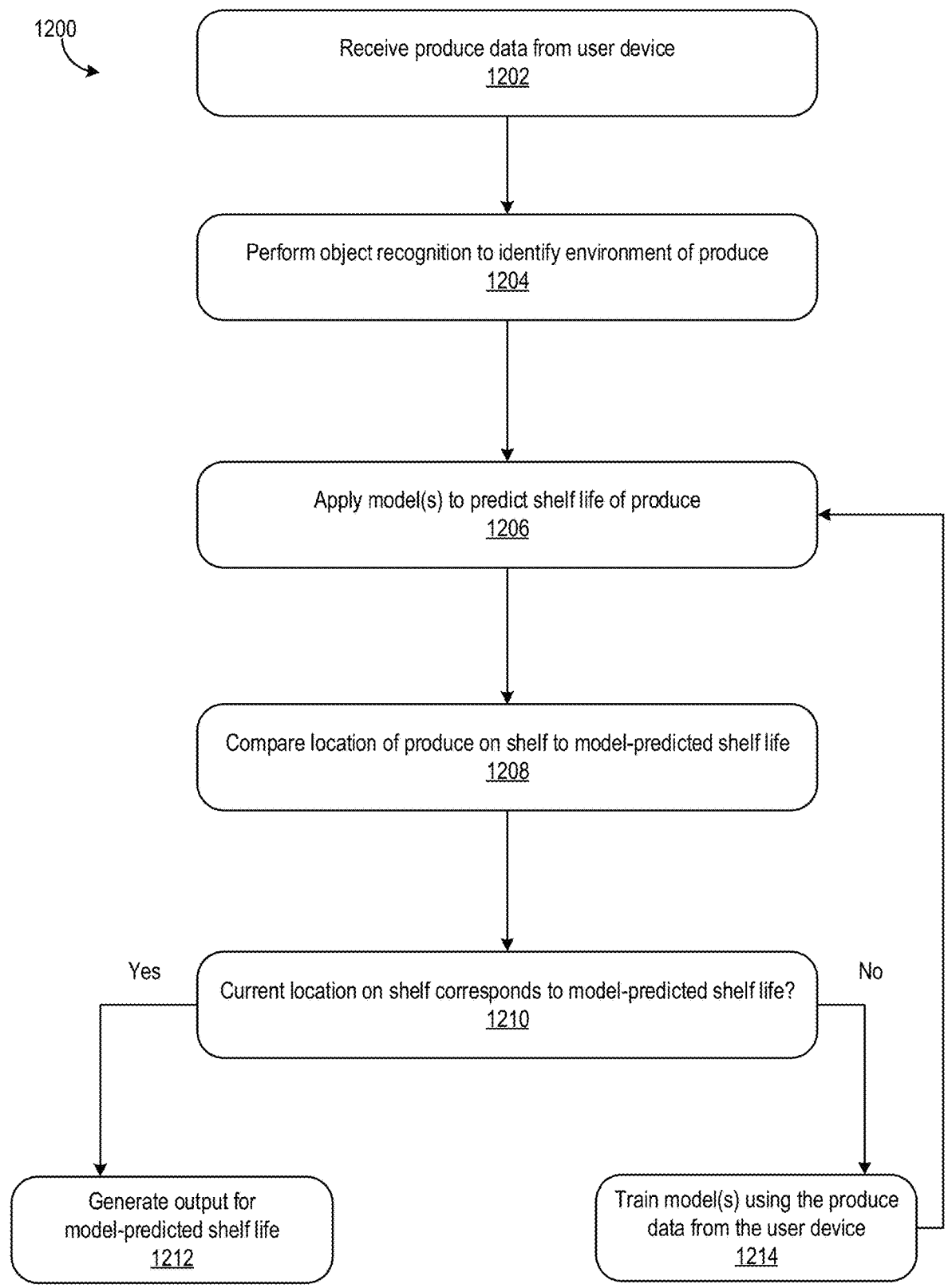
FIG. 12 is a flowchart of a process for improving models that are used to determine produce quality.

FIG. 12 is a flowchart of a process 1200 for improving models that are used to determine produce quality metrics. The process 1200 can be performed to continuously improve fidelity of one or more prediction models and algorithms. One or more blocks in the process 1200 can be performed at any point in the supply chain and/or during the produce's life. For example, the process 1200 can be performed after a user scans the produce on a display shelf and purchases the produce. One or more blocks in the process 1200 can be performed by the evaluation system 102, quality assessment system 104, and/or pricing system 202. The process 1200 can also be performed by any other computer, device, and/or network of computers, devices, and/or servers. For illustrative purposes, the process 1200 is described from perspective of a computer system. The computer system can include one or more of the evaluation system 102, the quality assessment system 104, and/or the pricing system 202.

Referring to the process 1200, the computer system can receive produce data from a user device in 1202. As described throughout this disclosure, the data can be image data. The computer system can perform object recognition techniques to identify an environment of the produce from the image data in 1204. For example, the computer system can determine a shelf that the produce is on and/or a position of the produce on the shelf relative to other produce or objects in the image data. In some implementations, the computer system can extract specific colors in a product identifier to normalize lighting in the image data. By normalizing the lighting, the computer system can more accurately identify the surrounding environment and placement of the produce in that environment.

Once the produce is isolated or otherwise extracted from the environment in the image data, the computer system can apply one or more machine learning trained models to predict a current shelf life of the produce in 1206. In some implementations, the computer system can also predict a remaining shelf life of the produce. The current shelf life can indicate a current quality of the produce. For example, the current shelf life can indicate whether the produce is currently ripe, reaching peak ripeness, or past peak ripeness. The predicted shelf life of the produce can also be determined or otherwise adjusted/enhanced by assessment and modeling of volatile compounds emitted by the produce, as described throughout this disclosure.

The computer system can then compare a location of the produce on the shelf to the model-predicted shelf life in 1208. In other words, the identified environment of the produce from 1204 can be used to determine where on the shelf the produce is located. For example, the produce can be located at a front of the shelf, in the middle of the shelf, or at a back of the shelf. The computer system can compare this image-based location of the produce with the model-predicted shelf life to determine whether the produce has been placed in a desirable location on the shelf. For example, produce having a long remaining shelf life can be placed at the back of the shelf while produce having a short remaining shelf life can be placed at the front of the shelf. Putting the produce with the short remaining life at the front of the shelf can incentivize shoppers to purchase such produce before produce having more remaining life.

The computer system can determine whether the current location on the shelf corresponds to the model-predicted shelf life in 1210. For example, the computer system can determine that if the produce is predicted to be passed peak ripeness, then the produce should be located at the front of the shelf. Similarly, if the produce is located at the front of the shelf, then the produce should be predicted to be passed peak ripeness. The computer system can therefore compare the image data to shelf life predictions to determine how closely the supply chain resembles what is assumed via the models.

If the current location on the shelf corresponds to the model-predicted shelf life, then the computer system can generate output for the model-predicted shelf life in 1212. In other words, the computer system can determine that the models used to predict shelf life are accurate, or at least predicting shelf life within a predetermined margin of error. Therefore, the models may not need to be improved upon at the particular time. Since the models are accurate, the predicted shelf life can be outputted to a user device and/or used by one or more computer systems to make additional predictions and determinations, such as price adjustments and discounts.

If the current location on the shelf does not correspond to the model-predicted shelf life, then the computer system can train the model(s) using the produce data received from the user device in 1214. In other words, the computer system can determine that one or more of the models are not accurately predicting shelf life. The model(s) therefore can be trained to more accurately predict shelf life. Once the models are trained, the computer system can return to block 1206 and repeat blocks 1206-1214 until the models accurately predict the shelf life of the produce.

In some implementations, the process 1200 can be used as a means to challenge a price or quality determination that is made by the computer system. For example, a consumer can take a picture of the produce they thought was incorrectly priced. The process 1200 can be performed using the picture of the produce to determine whether a discount should be applied for the produce. If the image justified the consumer's challenge about the incorrect price, then the discount can be applied.

Figure 13:
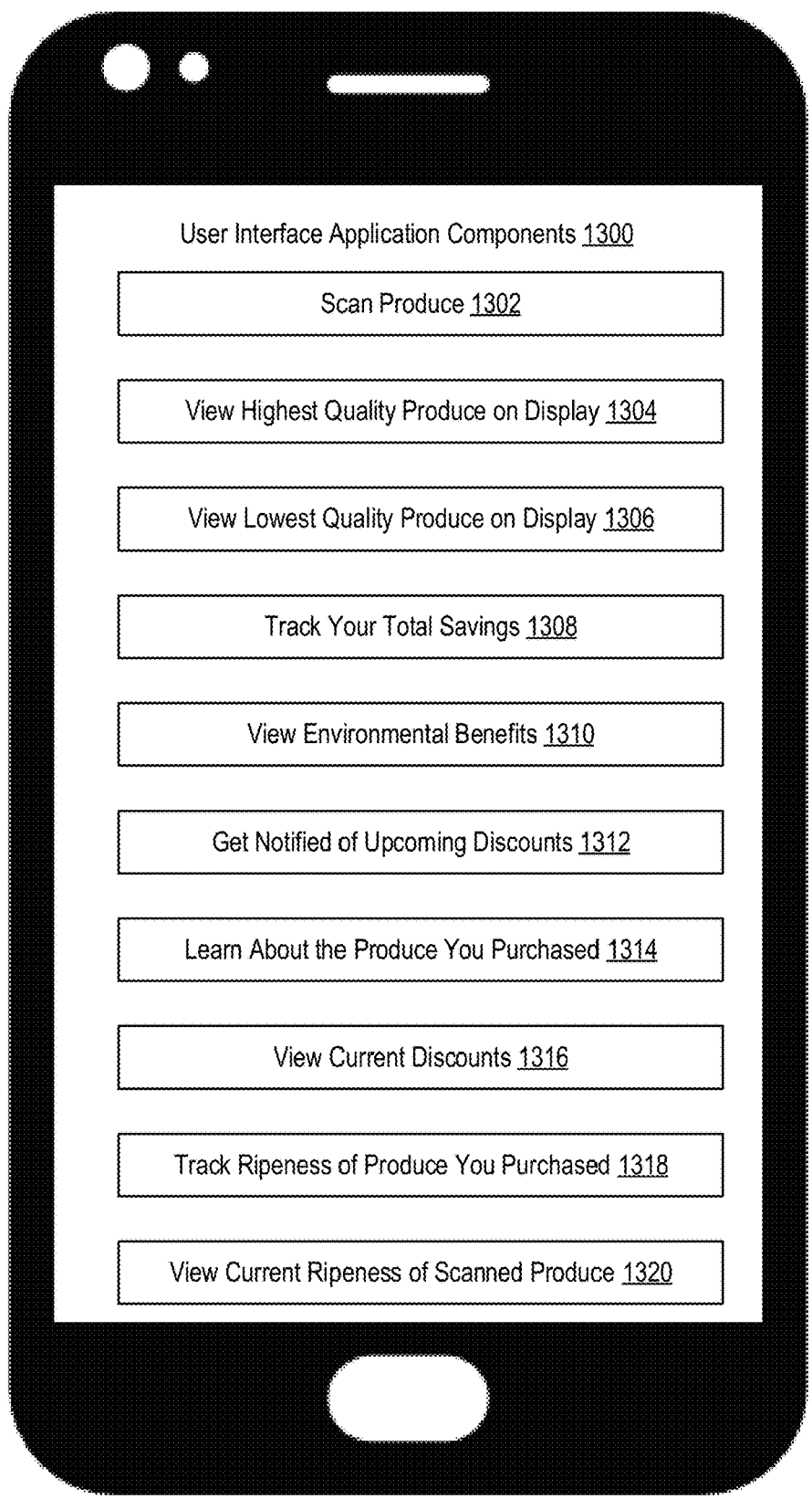
FIG. 13 depicts example components of a user device application interface.

FIG. 13 depicts example components of a user device application interface 1300. The interface components 1300 can be presented in the produce information application 940 described in reference to FIGS. 9A-B. The interface components 1300 can be presented at the user device 106A and/or any other user devices 106A-N described throughout this disclosure.

The interface components 1300 can present information to a user about different produce. For example, a shopper can use one or more of the interface components 1300 to learn about different produce in a grocery store and to determine whether or not to purchase the produce. The interface components 1300 can include options to scan produce 1302, view highest quality produce on display 1304, view lowest quality produce on display 1306, track your total savings 1308, view environmental benefits 1310, get notified of upcoming discounts 1312, learn about the produce you purchased 1314, view current discounts 1316, track ripeness of produce you purchased 1318, and view current ripeness of scanned produce 1320. One or more additional or fewer interface components 1300 can be presented, displayed, and/or selectable at the user device 106A. For example, different components can be presented, displayed, and/or selectable at the user device of a grocer versus a store employee versus a shopper.

The shopper can select the option to scan produce 1302. The shopper can use an optical sensor, such as a camera on a smartphone, to scan a product identifier for the produce. The shopper can also manually input the unique identifier or other information about the produce. By scanning the produce, the shopper can receive information about the current quality of the produce and the price of that particular produce.

Figure 14A:
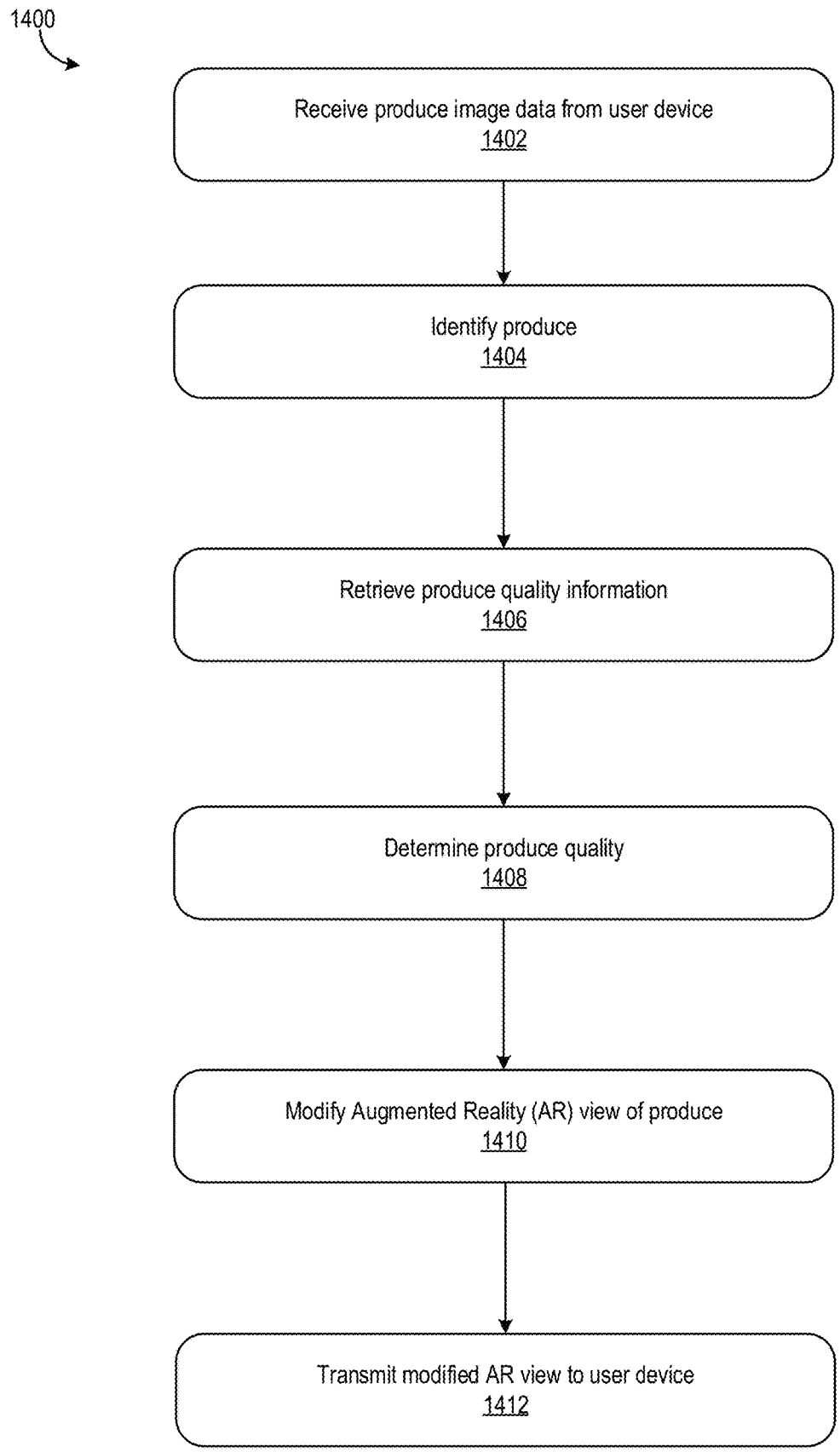
FIG. 14A is a flowchart of a process for displaying produce based on quality with augmented reality (AR) in the user device application.
Figure 14B:
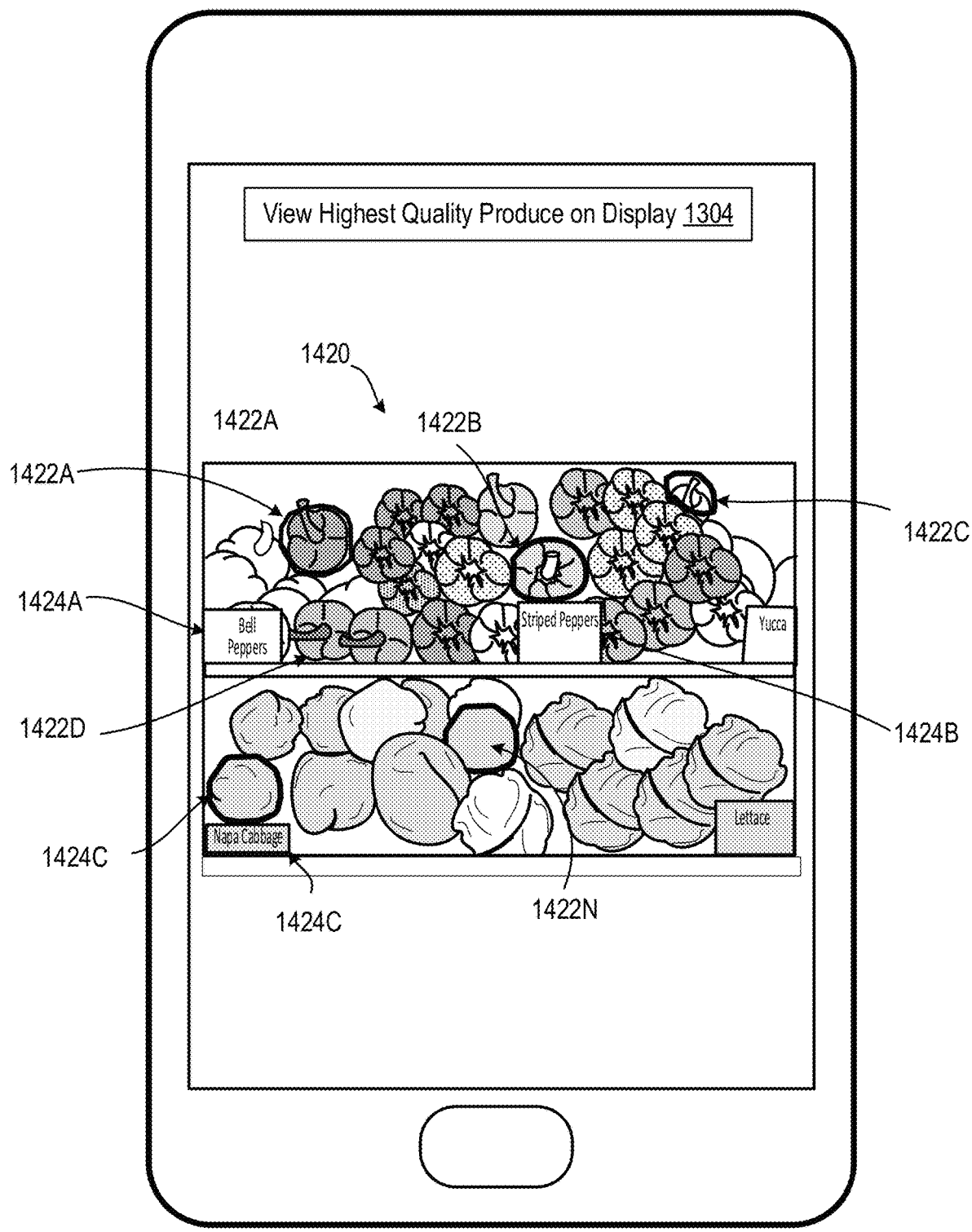
FIG. 14B is an example AR display of the produce in the user device application.

The shopper can also select the options to view highest quality produce on display 1304 and view lowest quality produce on display 1306 (e.g., refer to FIGS. 14A-B). The shopper can point their user device 106A at an entire produce display and see an augmented reality (AR) view of highest or lowest quality produce. This can be advantageous to help the shopper decide on which produce to purchase.

By selecting the option to track your total savings 1308, the shopper can see how much money they saved over time. The savings can include price adjustments and discounts that were applied to produce that the shopper scanned via the scan produce option 1302 and then purchased.

By selecting the option to view environmental benefits 1310, the shopper can see how they helped the environment by purchasing the produce. For example, the view environmental benefits option 310 can demonstrate how much produce-based waste was avoided as a result of the shopper purchasing the produce. When the shopper purchases produce of lesser quality, the environmental benefits can be greater since the lesser quality produce is not going to waste.

The shopper can also select the option to get notified of upcoming discounts 1312. As a result, the shopper can receive alerts when stores near their location are discounting certain produce. The shopper can select what type of produce they want to be alerted about. The shopper can also receive notifications whenever the store(s) discount any type of produce. Since the produce can be discounted as its current quality lowers, being notified about the lower prices can incentivize the shoppers to purchase that produce. As a result, produce-based waste can be avoided or mitigated and overall shelf life of the produce department can be increased.

The shopper can select the option to learn about the produce you purchased 1314. Since each produce is assigned a unique identifier, the produce can be tracked throughout the supply chain. Therefore, movement of the produce throughout the supply chain can be presented to the shopper. For example, the shopper can view where the produce was grown, when it was shipped to a distribution center and/or the store, how many hands the produce was passed through, how long the produce was in storage, and/or when the produce was in different ripeness stages. The shopper can also view information about who grew the produce and what production methods were used up to the time that the produce was put on the shelf Such transparency can be advantageous to encourage the shopper to purchase more produce that is described throughout this disclosure.

The shopper can select view current discounts 1316 to see what produce is currently being offered at a lower price. The shopper can view current discounts for produce that the shopper scanned with the user device 106A. The shopper can also view current discounts for all the produce in the store. In some implementations, the shopper can also view future discounts for produce.

By selecting the option to track ripeness of produce you purchased 1318, the shopper can continue to learn about the quality of their produce once they leave the store. Once the produce is scanned and purchased, the produce can be logged in a digital pantry. The digital pantry can keep track of how much time the produce has remaining until it is no longer consumable (e.g., refer to FIGS. 15A-B). The shopper can then be notified of when the produce should be eaten, opened, and/or otherwise used by the shopper. As a result, the shopper can know when to open the produce during its peak ripeness. The shopper can also know when to use the produce before it becomes waste. In some implementations, the shopper can also learn recipes for using the produce at its current stage of ripeness or quality. For example, recipes can be presented to the shopper that can be made with the produce before the produce is about to expire. The shopper can also be presented with suggestions for other items that the shopper can purchase to best make use of the expiring produce. As a result, produce-based waste can be avoided even once the produce leaves the store.

Figure 16:
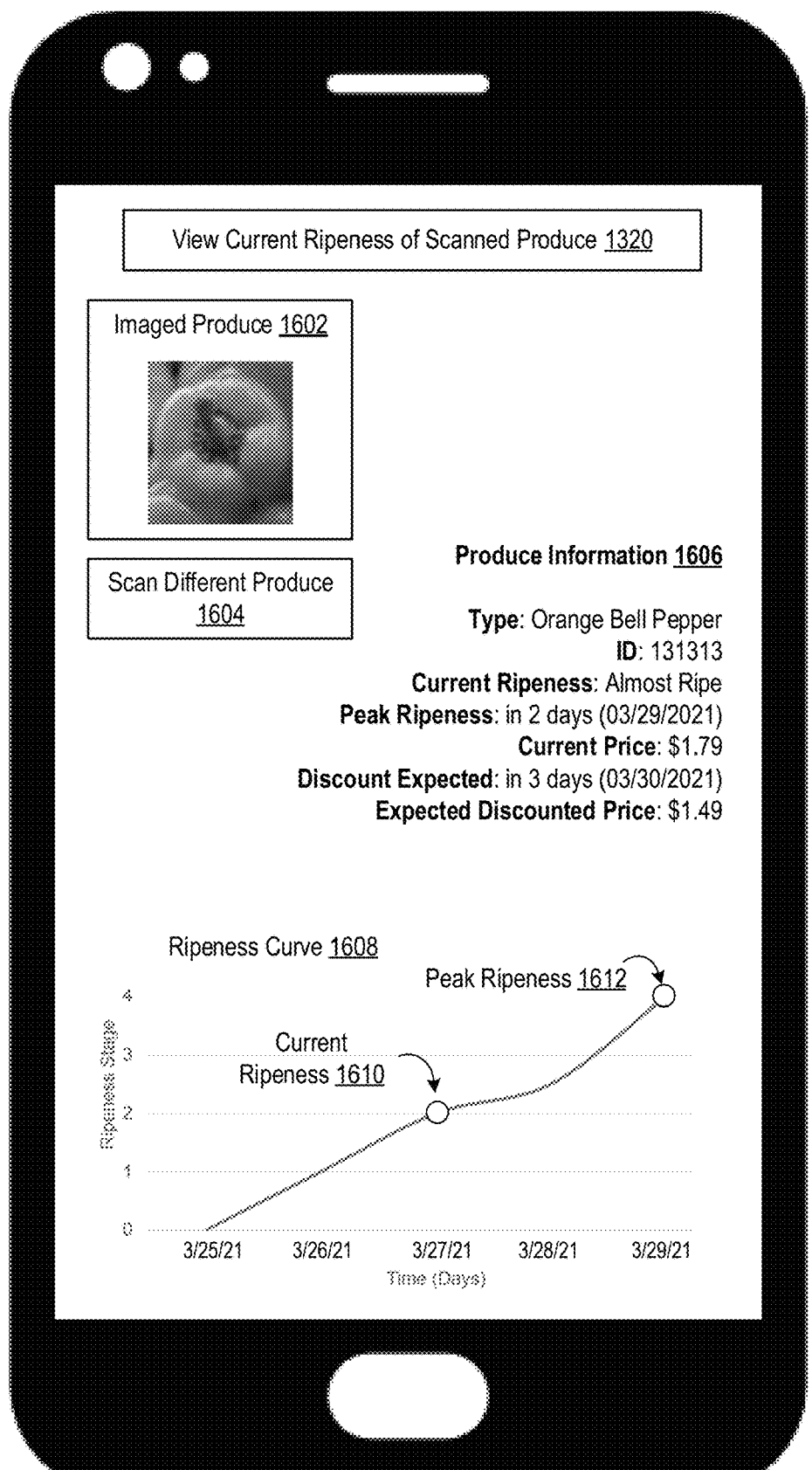
FIG. 16 is an example display for viewing current ripeness of scanned produce in the user device application.

The shopper can also select the option view current ripeness of scanned produce 1320 to learn about quality and pricing of that scanned produce (e.g., refer to FIG. 16). The shopper can view a ripeness or other quality curve for the produce. The shopper can also view current pricing of the produce, discounts, and/or future price reductions. In some implementations, the shopper can view how the price adjustments, discounts, and/or initial prices were determined. This transparency in pricing can be advantageous to incline the shopper to use the application more and to purchase more of the produce described throughout this disclosure.

FIG. 14A is a flowchart of a process 1400 for displaying produce based on quality with augmented reality (AR) in the user device application (e.g., refer to 1304-1306 in FIG. 13). FIG. 14B is an example AR display of the produce in the user device application. One or more blocks in the process 1400 in FIG. 14A can be performed at a current time when a consumer or other user requests quality information for the produce. For example, the process 1400 can be performed when the user scans the produce on a display shelf at a grocery store. One or more blocks in the process 1400 can be performed by the quality assessment system 104. The process 1400 can also be performed by any other computer, device, and/or network of computers, devices, and/or servers. For illustrative purposes, the process 1400 is described from perspective of a computer system.

Referring to the process 1400 in FIG. 14A, the computer system can receive produce image data from a user device (e.g., user devices 106A-N) in 1402. As mentioned throughout, a shopper can take a picture of an entire shelf display using the shopper's smartphone. The computer system can then identify the produce in the image data in 1404. The computer system can, for example, apply one or more machine learning trained models to the image data to detect all pieces of produce that may appear in the image data. Identifying all pieces of produce can include identifying a product identifier for one produce and then determining which other pieces of produce in the image data are the same as the produce with the identifier. Object recognition techniques can be used to compare the different pieces of produce and group them based on type.

The computer system can then retrieve produce quality information for all of the produce depicted and identified in the image data in 1406. For example, the computer system can retrieve information associated with just the product identifier(s) that was identified and decoded. Even though each produce can have a unique identifier, all the unique identifiers can link produce of the same type to some of the same produce quality information. For example, all the produce from the same place of origin can have the same ripening storage conditions. In some implementations, the computer system can retrieve information for each individual piece of produce based on the unique identifier for that produce.

The computer system can determine quality of each piece of produce in 1408. The current quality of the produce can be determined using the techniques described throughout this disclosure.

Once the computer system determines the quality of each piece of produce, the computer system can modify an augmented reality (AR) view of the produce on the display shelf in 1410. In other words, the computer system can modify a presentation of the produce as seen at the user device. When the user points their device at the display shelf, the user can view the shelf with AR improvements on the display of the user's device. For example, the AR view can be modified such that when the produce identified as good quality are within field of view of an optical sensor of the user's device, that produce is highlighted. Such highlighting can bring the user's attention to that produce, which can aid the user in selecting what produce to purchase. Similarly, the AR view can be modified such that when the produce identified as low or poor quality are within field of view of the optical sensor of the user's device, that produce is highlighted (e.g., refer to FIG. 14B).

In some implementations, the user can click on or select produce that is highlighted in the AR view to see more information about that produce (e.g., current quality, projected quality, current price, discount, future discounts, etc.). The information can be presented in the AR view and/or in another window or display screen.

After modifying the AR view, the AR view can be transmitted to the user device in 1412. As a result, the user can view the entire display shelf in augmented reality to assist the user in determining which produce to purchase.

FIG. 14B depicts an example AR view 1420 at the user device 106A. The user has selected the option to view highest quality produce on display 1304. When the user points their device 106A at a display shelf, the AR view 1420 of the display shelf is presented to the user. As shown, the user is looking at display shelves including a variety of peppers, cabbage, and lettuce. Using the process 1400 depicted and described in FIG. 14A, the computer system generated the AR view 1420 in which produce 1422A-N are highlighted.

Thus, the computer system determined that produce 1422A-N are the highest quality produce on the display. To make this determination, the computer system can identify each type of produce by decoding the produce signs 1424A-C. The computer system can also identify each type of produce by decoding product identifiers that may be visibly attached to the produce. Once each type of produce is identified, the computer system can determine which produce are within each type of produce. For example, the computer system can determine and identify orange bell peppers (e.g., produce sign 1424A). The computer system can determine and identify striped peppers (e.g., produce sign 1424B) and Napa cabbage (e.g., produce sign 1424C). Within each type of produce (e.g., orange bell peppers, striped peppers, and Napa cabbage), the computer system can determine and rank quality of that produce. Thus, the computer system identified produce 1422A and 1422B as the highest quality orange bell peppers. Produce 1422C is identified as the highest quality striped pepper. Produce 1422D and 1422N are identified as the highest quality Napa cabbages. In some implementations, as the user moves the user device 106A in front of the display shelf and different produce comes into view, the AR view 1420 can be dynamically updated to reflect which of the different produce is of a highest quality.

Figure 15A:
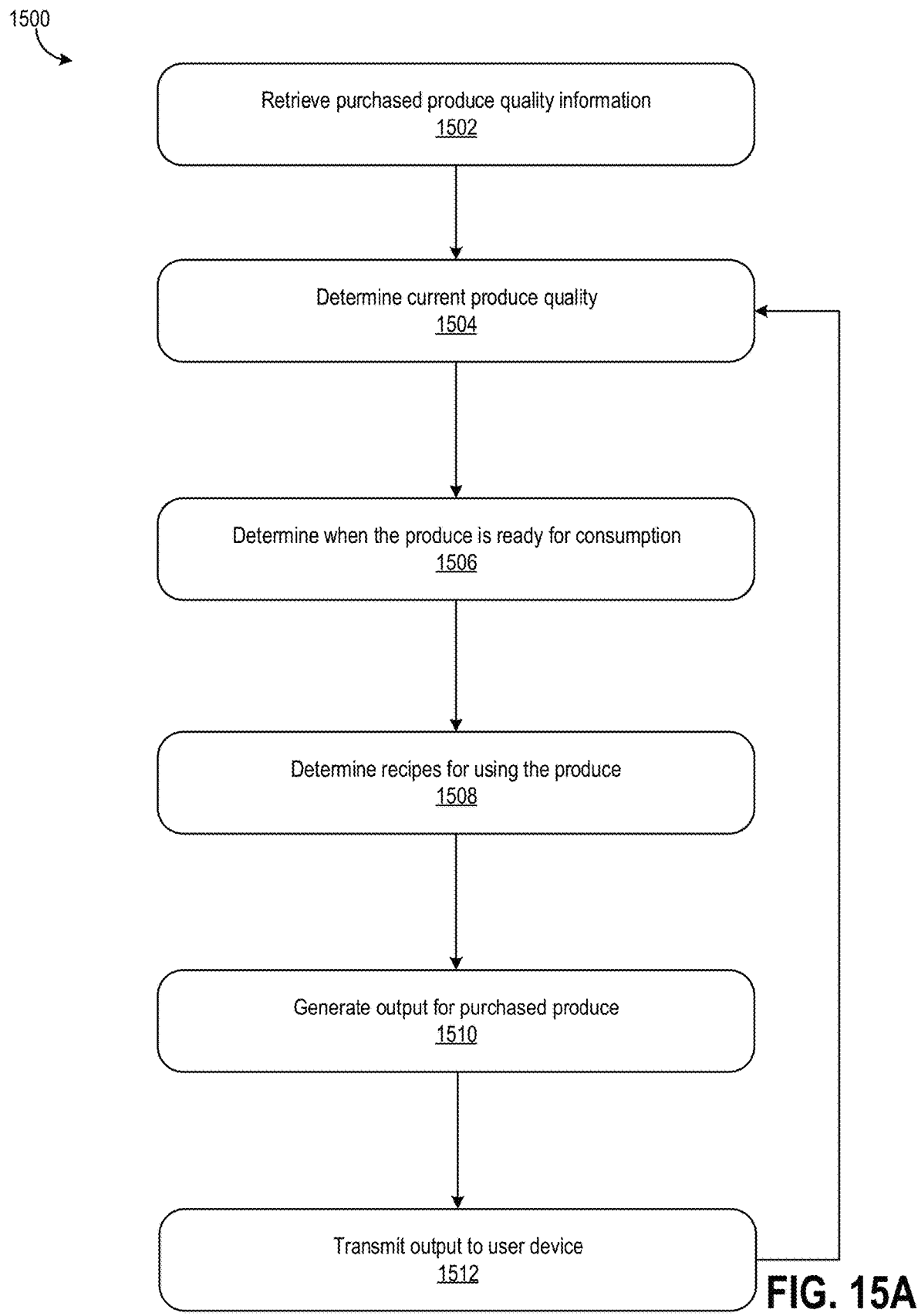
FIG. 15A is a flowchart of a process for tracking ripeness of purchased produce.

FIG. 15A is a flowchart of a process 1500 for tracking ripeness of purchased produce. One or more blocks in the process 1500 can be performed at any time after a user purchases the produce. For example, the process 1500 can be performed after purchase of the produce is reflected on the user's bill/receipt. The process 1500 can be performed at predetermined times. The predetermined times can depend on a remaining life of the produce. For example, if, at the time of purchase, the produce is expected to have 5 days of remaining life, the process 1500 can be performed daily for the remaining 5 days. As another example, if at the time of purchase the produce has 10 days of remaining life, it can be preferred to perform the process 1500 every other day for the remaining 10 days.

One or more blocks in the process 1500 can be performed by the quality assessment system 104. The process 1500 can also be performed by any other computer, device, and/or network of computers, devices, and/or servers. For illustrative purposes, the process 1500 is described from perspective of a computer system.

Referring to the process 1500 in FIG. 15A, the computer system can retrieve quality information about the purchased produce in 1502. In some implementations, this can include retrieving information about the quality of the produce at the time that the produce was purchased. The computer system can also retrieve historic information about the produce and any other information that can be stored about the produce. The information can be retrieved from one or more data stores, such as the produce data store 118 described throughout this disclosure.

In some implementations, the computer system can also receive information from a device of the user. The information can include storage conditions, such as whether the user is keeping the produce out on the counter, in direct sunlight, in a pantry, in the fridge, etc. The information can also include input about appearance of the produce, such as user-observed yellowing or browning of skin, firmness, spotting, etc. The information can even include image data captured by the user once the user brings the produce home.

The produce quality information can be used by the computer system to determine a current quality of the produce in 1504. The techniques described throughout this disclosure can be used to determine the current quality of the purchased produce. Based on the current quality, the computer system can determine when the produce will be ready for consumption (1506). The techniques described throughout this disclosure can also be used to make such a determination. The computer system can, for example, determine when the produce is at peak ripeness, especially if the produce was purchased before it reached peak ripeness. The computer system can, for example, determine how much longer the produce will be at peak ripeness, especially if the produce was purchased once at peak ripeness. The computer system can also determine remaining life of the produce before it is no longer consumable.

The computer system can determine recipes for using the produce in 1508. The recipes can be based on the current quality of the produce. The recipes can also be based on when the produce is at peak ripeness. In some implementations, the recipes can be based on when the produce is past peak ripeness. Thus, the recipes can provide suggestions about how to use the produce so that the produce does not go to waste. The recipes can also suggest what other products the user can purchase in order to use the produce.

The computer system can generate output for the purchased produce in 1510. The output can be presented at the user's device, as depicted and described in reference to FIGS. 13 and 15B. The output can indicate the current quality of the produce, projected quality of the produce, remaining life of the produce, readiness for consumption, and suggested recipes.

The output can then be transmitted to the user device for display in 1512.

One or more blocks in the process 1500 can be repeated. For example, the computer system can return to block 1504 and repeat blocks 1504-1512. The blocks 1504-1512 can be repeated at predetermined times during the remaining life of the produce, upon user request, and/or continuously. As a result, the quality of the purchased produce can be continuously tracked and reported to the user. The user can make better and more informed decisions on when to use the produce such that the produce can be used at peak ripeness and/or before the produce is no longer consumable.

Figure 15B:
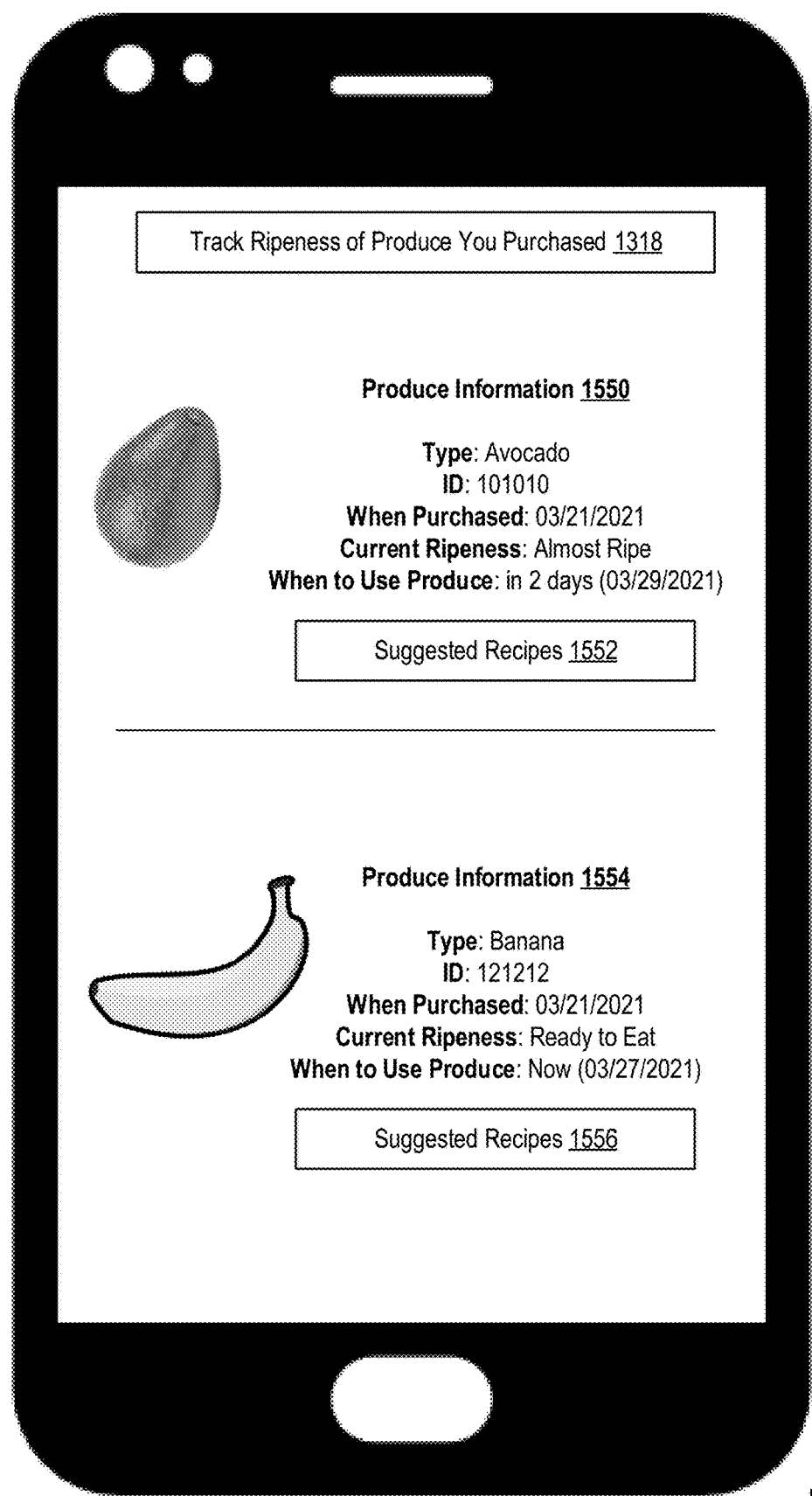
FIG. 15B is an example display for tracking ripeness of the purchased produce in the user device application.

FIG. 15B is an example display for tracking ripeness of the purchased produce in the user device application. Depicted in FIG. 15B is output produced by the computer system in the process 1500 (e.g., refer to FIG. 15A) once the user selects the option to track ripeness of produce you purchased 1318 at the user device 106A.

In this example, the user has purchased two produce items: an avocado and a banana. Produce information 1550 is presented for the avocado and produce information 1554 is presented for the banana. The produce information 1550 indicates that the user purchased an avocado having an ID 101010 (e.g., unique product identifier, barcode, label, etc.). This avocado was purchased on Mar. 21, 2021 and it is currently "Almost ripe." The produce information 1550 suggests that the avocado should be used in 2 days, on Mar. 29, 2021. The user can also select option suggested recipes 1552 in order to view recipes that the user can make with the avocado.

The produce information 1554 indicates that the user purchased a banana having an ID 121212. This banana was also purchased on Mar. 21, 2021 and it's currently "Ready to eat." The produce information 1554 suggests that the banana be eaten now, on Mar. 27, 2021. The user can also select option suggested recipes 1556 to view recipes that the user can make with the banana.

Produce information can be presented for each piece of produce that the user purchased. For example, if the user purchased 3 avocados, produce information can be presented for each of the 3 avocados. After all, each of the avocados can ripen at different times. One of the avocados can be ready to eat at a present time while another avocado may no longer be ripe for consumption. Moreover, guacamole recipes can be presented for the avocado that is no longer ripe but not presented for the avocado that is ready to eat at the present time.

FIG. 16 is an example display for viewing current ripeness of scanned produce in the user device application. Depicted in FIG. 16 is output produced once the user selects the option to view current ripeness of scanned produce 1320 at the user device 106A. In this example, the user took a picture of a pepper. The user-captured image can be presented to the user as imaged produce 1602. If the user would like to scan a different piece of produce or the wrong produce was identified from the user-captured picture, the user can select scan different produce option 1604.

As described throughout this disclosure, current quality of the scanned produce can be determined and presented to the user as produce information 1606. The produce information 1606 can include a type of the produce, a unique identifier associated with the produce, a current ripeness level, when the produce is expected to reach peak ripeness, a current price, when the price is expected to be discounted, and an expected discounted price of the produce. In this illustrative example, the pepper is identified as an orange bell pepper. The particular scanned produce has identifier 131313. This produce is currently "Almost ripe" and is expected to reach peak ripeness in 2 days, on Mar. 29, 2021. Moreover, the current price of the orange bell pepper is $1.79 but in 3 days, on Mar. 30, 2021, the price is expected to decrease. The price can be decreased after the pepper reaches peak ripeness to incentivize consumers to purchase the pepper when it is discounted before purchasing other peppers that are not discounted. As a result, the scanned pepper can be purchased before it becomes waste. As shown, the produce information 1606 can also indicate the expected discounted price to be $1.49 on Mar. 30, 2021.

The user can also be presented with a ripeness curve 1608. The ripeness curve 1608 can indicate a current ripeness 1610 of the scanned produce as well as peak ripeness 1612 of the scanned produce. The ripeness curve 1608 can also depict different stages of the produce's ripeness over time, including before the produce was put on the display shelf and scanned by the produce. In the example ripeness curve 1608, the orange bell pepper's current ripeness 1610 is at stage 2 on Mar. 27, 2021. The pepper's projected peak ripeness 1612 is stage 4 on Mar. 29, 2021.

One or more additional or fewer information can be presented to the user to assist the user in deciding whether to purchase the scanned produce.

FIG. 17 is a block diagram of system components that can be used to implement a system for assessing the quality of one or more food items. The computing device 1700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 1700 includes a processor 1702, a memory 1704, a storage device 1706, a high-speed interface 1708 connecting to the memory 1704 and multiple high-speed expansion ports 1710, and a low-speed interface 1712 connecting to a low-speed expansion port 1714 and the storage device 1706. Each of the processor 1702, the memory 1704, the storage device 1706, the high-speed interface 1708, the high-speed expansion ports 1710, and the low-speed interface 1712, are interconnected using various busses, and can be mounted on a common motherboard or in other manners as appropriate. The processor 1702 can process instructions for execution within the computing device 1700, including instructions stored in the memory 1704 or on the storage device 1706 to display graphical information for a GUI on an external input/output device, such as a display 1716 coupled to the high-speed interface 1708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1704 stores information within the computing device 1700. In some implementations, the memory 1704 is a volatile memory unit or units. In some implementations, the memory 1704 is a non-volatile memory unit or units. The memory 1704 can also be another form of computer-readable medium, such as a magnetic or optical disk.

The storage device 1706 is capable of providing mass storage for the computing device 1700. In some implementations, the storage device 1706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1704, the storage device 1706, or memory on the processor 1702.

The high-speed interface 1708 manages bandwidth-intensive operations for the computing device 1700, while the low-speed interface 1712 manages lower bandwidth-intensive operations. Such allocation of functions is exemplary only. In some implementations, the high-speed interface 1708 is coupled to the memory 1704, the display 1716 (e.g., through a graphics processor or accelerator), and to the high-speed expansion ports 1710, which can accept various expansion cards (not shown). In the implementation, the low-speed interface 1712 is coupled to the storage device 1706 and the low-speed expansion port 1714. The low-speed expansion port 1714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1700 can be implemented in a number of different forms, as shown in the figure. For example, it can be implemented as a standard server 1720, or multiple times in a group of such servers. In addition, it can be implemented in a personal computer such as a laptop computer 1722. It can also be implemented as part of a rack server system 1724. Alternatively, components from the computing device 1700 can be combined with other components in a mobile device (not shown), such as a mobile computing device 1750. Each of such devices can contain one or more of the computing device 1700 and the mobile computing device 1750, and an entire system can be made up of multiple computing devices communicating with each other.

The mobile computing device 1750 includes a processor 1752, a memory 1764, an input/output device such as a display 1754, a communication interface 1766, and a transceiver 1768, among other components. The mobile computing device 1750 can also be provided with a storage device, such as a micro-drive or other device, to provide additional storage. Each of the processor 1752, the memory 1764, the display 1754, the communication interface 1766, and the transceiver 1768, are interconnected using various buses, and several of the components can be mounted on a common motherboard or in other manners as appropriate.

The processor 1752 can execute instructions within the mobile computing device 1750, including instructions stored in the memory 1764. The processor 1752 can be implemented as a chipset of chips that include separate and multiple analog and digital processors. The processor 1752 can provide, for example, for coordination of the other components of the mobile computing device 1750, such as control of user interfaces, applications run by the mobile computing device 1750, and wireless communication by the mobile computing device 1750.

The processor 1752 can communicate with a user through a control interface 1758 and a display interface 1756 coupled to the display 1754. The display 1754 can be, for example, a TFT (Thin-Film-Transistor Liquid Crystal Display) display or an OLED (Organic Light Emitting Diode) display, or other appropriate display technology. The display interface 1756 can comprise appropriate circuitry for driving the display 1754 to present graphical and other information to a user. The control interface 1758 can receive commands from a user and convert them for submission to the processor 1752. In addition, an external interface 1762 can provide communication with the processor 1752, so as to enable near area communication of the mobile computing device 1750 with other devices. The external interface 1762 can provide, for example, for wired communication in some implementations, or for wireless communication in other implementations, and multiple interfaces can also be used.

The memory 1764 stores information within the mobile computing device 1750. The memory 1764 can be implemented as one or more of a computer-readable medium or media, a volatile memory unit or units, or a non-volatile memory unit or units. An expansion memory 1774 can also be provided and connected to the mobile computing device 1750 through an expansion interface 1772, which can include, for example, a SIMM (Single In Line Memory Module) card interface. The expansion memory 1774 can provide extra storage space for the mobile computing device 1750, or can also store applications or other information for the mobile computing device 1750. Specifically, the expansion memory 1774 can include instructions to carry out or supplement the processes described above, and can include secure information also. Thus, for example, the expansion memory 1774 can be provide as a security module for the mobile computing device 1750, and can be programmed with instructions that permit secure use of the mobile computing device 1750. In addition, secure applications can be provided via the SIMM cards, along with additional information, such as placing identifying information on the SIMM card in a non-hackable manner.

The memory can include, for example, flash memory and/or NVRAM memory (non-volatile random-access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1764, the expansion memory 1774, or memory on the processor 1752. In some implementations, the computer program product can be received in a propagated signal, for example, over the transceiver 1768 or the external interface 1762.

The mobile computing device 1750 can communicate wirelessly through the communication interface 1766, which can include digital signal processing circuitry where necessary. The communication interface 1766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1768 using a radio-frequency. In addition, short-range communication can occur, such as using a Bluetooth, WiFi, or other such transceiver (not shown). In addition, a GPS (Global Positioning System) receiver module 1770 can provide additional navigation- and location-related wireless data to the mobile computing device 1750, which can be used as appropriate by applications running on the mobile computing device 1750.

The mobile computing device 1750 can also communicate audibly using an audio codec 1760, which can receive spoken information from a user and convert it to usable digital information. The audio codec 1760 can likewise generate audible sound for a user, such as through a speaker, e.g., in a handset of the mobile computing device 1750. Such sound can include sound from voice telephone calls, can include recorded sound (e.g., voice messages, music files, etc.) and can also include sound generated by applications operating on the mobile computing device 1750.

The mobile computing device 1750 can be implemented in a number of different forms, as shown in the figure. For example, it can be implemented as a cellular telephone 1780. It can also be implemented as part of a smart-phone 1782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

FIG. 18 is a flowchart of a process 1800 for training models that assess produce quality. The process 1800 can be used to train any of the models described herein. The process 1800 can be performed to train models that receive volatile measurements, volatile compound profiles, non-destructive measurements, produce images, produce barcodes or other labels/identifiers as input to determine current quality metrics and/or predict future quality metrics of the produce. The process 1800 can also be performed to train models per produce type and/or per produce attributes or other quality metrics.

One or more blocks in the process 1800 can be performed by the evaluation system 102 and/or the quality assessment system 104. The process 1800 can also be performed by any other computer, device, and/or network of computers, devices, and/or servers. For illustrative purposes, the process 1800 is described from perspective of a computer system.

Referring to the process 1800 in FIG. 18, the computer system can receive training data in 1802. The training data can include produce observations (1804), historic produce information (1806), destructive produce measurements 1808), and/or sensed produce volatile compounds (1810). Any combination of training data can be received to train a particular model. Moreover, different training data can be received based on a type of model being trained, a type of produce for which the model is being trained, and/or a type of quality characteristics for which the model is being trained to determine/predict.

The produce observations in 1804 can include values for features of the produce that can be identified using sensors such as cameras or other image sensors. The produce observations may also include human-identified features or characteristics of the produce. The produce observations can be indicative of one or more freshness parameters or quality characteristics of the produce, such as different stages of ripeness and/or firmness of the produce. The produce observations can be made at any time throughout the life cycle of the produce, such as early in the supply chain (e.g., time between shipping the produce from place of origin to stocking shelves in a store), during storage of the produce (e.g., when the produce is stored in a warehouse or other facility for later transportation to a store), during transportation of the produce, when the produce is on display in a store, etc.

The historic produce information in 1806 can include attributes about other produce of a same type that have been determined and stored for that produce type. The attributes can include ripeness stages or other quality characteristics of the produce that have been determined, predicted, or otherwise observed over time. The historic produce information can also include historic pricing information, such as pricing tables that indicate correlations between various quality characteristics of the produce and prices.

The destructive produce measurements in 1808 can include measurements obtained by destroying produce. The measurements can be made using one or more devices. For example, the destructive measurements can include measurements captured by puncturing an outer layer of the produce, squeezing the produce, cutting into the produce, and/or tasting the produce. Penetrometers and/or durometers can be used to capture the destructive produce measurements. These measurements can be taken early in the supply chain, for example before produce is delivered to a store and put on display for purchase. In some implementations, produce that is destroyed using the techniques described in 1808 may not be sold in the store. Such destructive measurements can be labeled automatically by the computer system or manually by a human user. The measurements can be labeled with various quality characteristics, such as stages of ripeness, firmness levels, changes in taste, etc.

The sensed produce volatile compounds in 1810 can be volatiles or other compounds that have been detected by sensors during any stage of the produce life cycle. The sensors can be positioned at, near, or around the produce when the produce is in storage, transit, or on display, as described throughout this disclosure. For example, volatile compounds can be collected before the produce is transported from farm to distribution center, during transit to the distribution center, upon arrival at the distribution center, while being stored in the distribution center, during transit from the distribution center to an end-consumer retail environment, and/or upon arrival at the end-consumer retail environment. Time series of volatile compounds data (1810) can be advantageous to train models to accurately correlate volatile compounds data with different freshness parameters, such as ripeness, sweetness, taste, juiciness, firmness, and other quality characteristics.

Any of the data received in 1802-1810 can be labeled automatically by the computer system and/or manually by human workers. The data can be collected then labeled with annotations indicating various types of quality characteristics, such as stages of ripeness, different firmness levels, taste, juiciness, etc. The model(s) can then be trained with the labeled data to determine or otherwise predict the quality characteristics from produce data received during runtime.

The computer system can then generate one or more models in 1812 using the received training data. Various machine learning techniques, such as supervised machine learning, deep neural networks, principal component analysis, and/or random forest modeling, can be used to process the volatile compounds and correlate them with quality characteristics identified in at least one of the produce observations (1804), historic produce information (1806), and/or destructive produce measurements (1808).

The computer system can map the volatile compounds to produce features (e.g., quality metrics) using the machine learning techniques in 1814. The produce features can include any of the quality metrics described herein. Optionally, the computer system can group the volatile compounds and produce features in 1816. Clustering techniques can be used for grouping. The volatile compounds can be grouped together into classes and analyzed to determine how the classes of volatiles correlate to different ripeness stages, as an example. Some concentrations of particular types of volatiles or groups of volatiles can indicate a taste, sweetness, or tartness of the produce. Some concentrations of particular types of volatiles or groups of volatiles can indicate an acidity level of the produce. Some concentrations of particular types of volatiles or groups of volatiles can indicate a softness or firmness of the produce.

The computer system can then output the model(s) in 1818 for run-time use. Outputting the model(s) can include storing the model(s) in a data store. In some implementations, the model(s) can be updated and/or improved using additional data received throughout the supply chain. For example, the model(s) can be updated using volatile compounds that are collected of the produce during runtime use of the models. The models can also be updated using output generated from these models during runtime use.

Figure 19A:
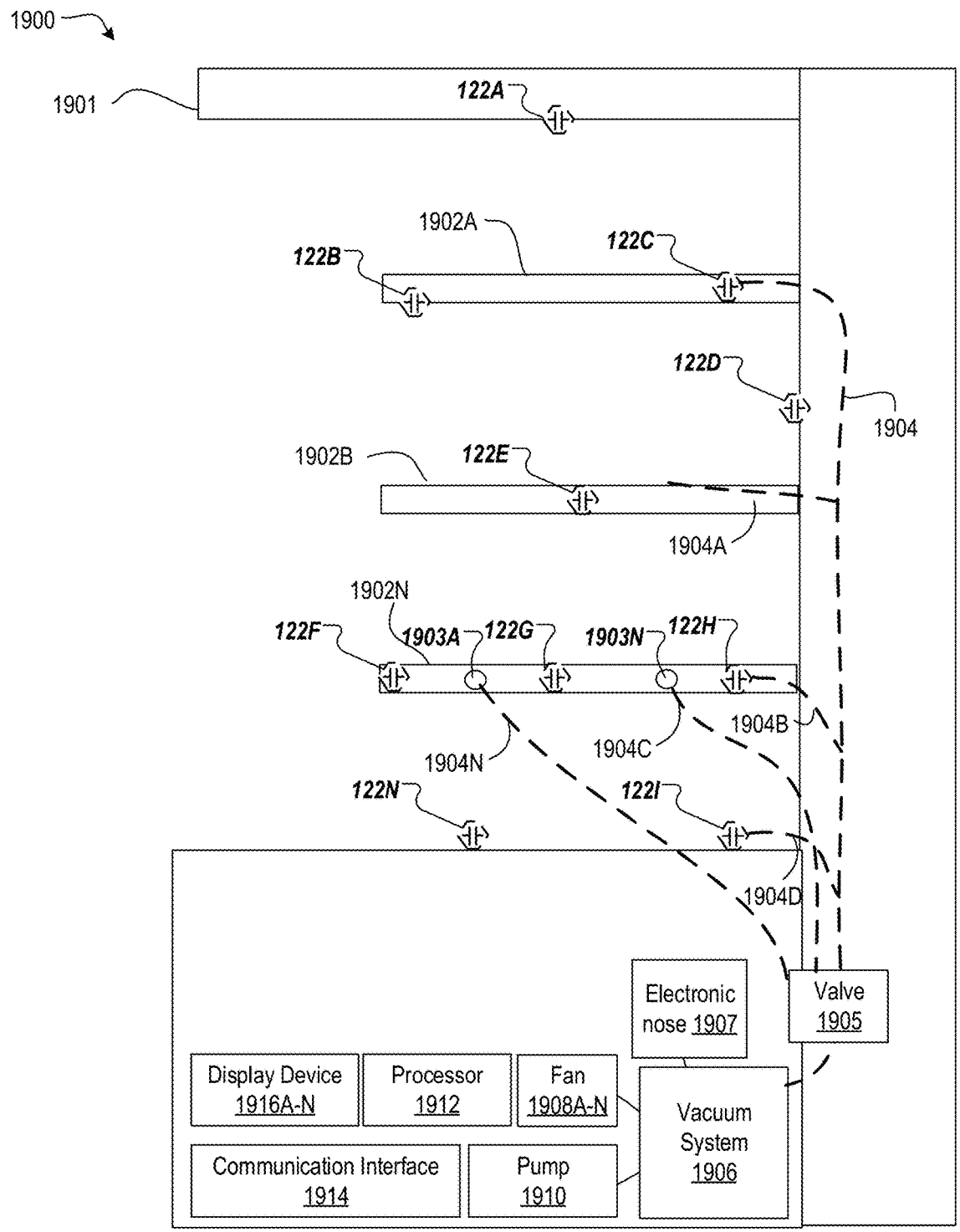
FIGS. 19A-D are conceptual diagrams of an example cabinet for assessing quality metrics of produce placed therein.

FIGS. 19A-D are conceptual diagrams of an example cabinet for assessing quality metrics of produce placed therein. More particularly, FIG. 19A depicts a side view of the cabinet 1900. The cabinet 1900 can be any type of produce/food item case. The cabinet 1900 can be used for purposes of ripening and/or storing produce placed therein. The cabinet 1900 can be placed in a storage facility, such as a warehouse, cold storage facility, or distribution center. The cabinet 1900 can also be placed in an end-consumer retail environment, such as a store or grocery store. The cabinet 1900, for example, can be a refrigerated unit for storing/keeping produce at a predetermined temperature. In some implementations, the cabinet 1900 can be placed in a transportation unit such as a truck, reefer, boat, or other moving storage unit. Using the cabinet 1900, volatile compounds emitted by the produce can be captured at various times/stages in the produce's supply chain to provide for accurate and efficient analysis of the produce's quality.

The cabinet 1900 can be a closed container, box, or other type of structure for holding multiple produce (e.g., batches of produce). In some implementations, the cabinet 1900 can have an open side (e.g., a front of the cabinet 1900) for users to access produce therein. In some implementations, the cabinet 1900 can be closed on all sides and produced placed therein can be accessed by opening a door of the cabinet 1900. The cabinet 1900 can hold produce of a same produce type (e.g., all pallets of avocados). In some implementations, the cabinet 1900 can hold produce of different types (e.g., different produce that have similar or different ripening or other shelf-life characteristics, different produce that is refrigerated in a retail environment like a grocery store).

The cabinet 1900 can have a physical structure 1901 that include one or more shelves 1902A-N for holding/storing the produce. The physical structure 1901 can be a rack or other support structure of the cabinet 1900. Pallets, containers, crates, bins, or other structures described throughout this disclosure can be configured to contain groups of produce on the shelves 1902A-N. In some implementations, the produce can also be placed directly on any of the shelves 1902A-N.

Sensors 122A-N, such as any of the sensors described throughout this disclosure, can be positioned in and around the shelves 1902A-N and/or the physical structure 1901 in the cabinet 1900. For example, one or more of the sensors 122A-N (e.g., a group of sensors, an array of sensors, etc.) can be attached to interior sides of the cabinet 1900 (e.g., walls and/or doors of the cabinet). One or more of the sensors 122A-N can also be attached along sides and/or lengths of the physical structure 1901. One or more of the sensors 122A-N can be attached to one or more of the shelves 1902A-N. The sensors 122A-N can be configured to detect volatile compounds emitted by the produce in the cabinet 1900. The sensors 122A-N can be positioned within a predetermined range from the produce, the shelves 1902A-N, and/or bins containing the produce. For example, the predetermined range can be between 1 and 6 inches. The predetermined range can be one or more other ranges, including but not limited to 2 to 5 inches, 0 to 4 inches, 1 to 10 inches, up to 12 inches away, etc. The predetermined range can vary based on what structure the sensors 122A-N are attached to (e.g., the walls of the cabinet 1900, the physical structure 1901, the shelves 1902A-N) and a distance between that structure and the produce. The sensors 122A-N in the cabinet 1900 can also be used in combination with any of the other sensors described throughout this disclosure, such as the sensors attached to produce bins.

The cabinet 1900 can also include a valve 1905 and a vacuum system 1906 for directing flow of air around the produce in the cabinet 1900 and directing emitted volatile compounds towards sensors 122A-N in the cabinet (and/or in/on the produce bins). By using the valve 1905 and the vacuum system 1906, a more concentrated collection of emitted volatile compounds can be obtained and used to accurately perform the techniques described herein. For example, each shelf 122A-N can have one or more openings 1903A-N on a top surface, a bottom surface, and/or sides of the shelf 122A-N. Hoses 1904A-N or other tubes in a hosing structure 1904 can connect to the one or more openings 1903A-N in the shelves 122A-N through which air can be drawn by the vacuum system 1906 and towards a sensor, such as an electronic nose 1907 (e.g., e-nose, volatiles assessment system). The hose structure 1904 can also be routed around the shelves 1902A-N in the cabinet 1900 (e.g., alongside walls of the cabinet, a ceiling of the cabinet, a bottom of the cabinet, under shelves of the cabinet, etc., along a top surface of a shelf, a bottom surface of a shelf, a side of a shelf, etc.) to direct flow of air from the produce towards the sensors 122A-N positioned throughout the cabinet 1900. For example, the hose structure 1904 can be routed around the cabinet 1900 in implementations in which one or more of the shelves 1902A-N do not have the openings 1903A-N. In some implementations, one or more hoses, such as the hose 1904B can be positioned near a sensor, such as the sensor 1221, to capture a more concentrated quantity of emitted compounds that can then be routed through the hose structure 1904 via the vacuum system 1906 and the valve 1905 to the electronic nose 1907.

A pump 1910 can also be attached to the cabinet 1900 (and/or part of the vacuum system 1906) and configured to draw air around the produce and into the hose structure 1904. In some implementations, the cabinet 1900 can also include one or more fans 1908A-N (which can be part of the vacuum system 1906) to help circulate and draw the air around the produce and towards one or more of the sensors 122A-N at ends of the hose structure 1904.

The drawn air can be routed through the hose structure 1904 through the valve 1905 and to one or more sensors, such as the electronic nose 1907. One or more of the sensors 122A-N, and the electronic nose 1907 in particular, can build up collections of the volatile compounds until a predetermined threshold quantity of volatile compounds are collected. Once the predetermined threshold quantity is met, the volatile compounds that have been batched can be processed by the electronic nose 1907 to generate information/data about volatile compounds of the produce/food items. For example, the electronic nose 1907 can generate a volatiles profile for each group of food items on the shelves 1902A-N. The volatiles profile can include quantities of each volatile compound emitted by the group of food items and/or other data that can then be used with the disclosed techniques to determine quality of the group of food items.

The data generated by the electronic nose 1907 can be transmitted, via a communication interface 1914 over one or more networks (e.g., wired and/or wireless) to a computer system described herein for further processing. In some implementations, the data about the collected volatiles can be used by a processor 1912 of the cabinet 1900 to determine quality information about the group of food items. In yet some implementations, the cabinet 1900 can include a gas chromatograph machine (not depicted), which can be configured to process and analyze the compounds that have been collected by the sensors 122A-N in combination with or instead of the electronic nose 1907.

In some implementations, one or more of the sensors 122A-N can be configured to collect a threshold quantity of emitted volatile compounds. Once the threshold quantity of emitted volatile compounds are collected, the sensors 122A-N can be heated at predetermined temperatures at fixed time intervals (e.g., in a process called thermal absorption) in order to release the collected volatile compounds and determine an accurate reading/profile of the volatile compounds (e.g., by the electronic nose 1907 and/or a gas chromatograph machine in communication with components of the cabinet 1900, such as the sensors 122A-N). The reading/profile can then be used by the computer system, or the processor 1912, to perform the techniques described herein.

In some implementations, the sensors 122A-N can include metal oxide sensors. Infrared sensors can also be used. Sometimes, the sensors 122A-N can be configured in an array, where each sensor can measure different types of volatile compounds and/or different chemistries/quantities of volatile compounds. The cabinet 1900 described herein can also be communicably coupled (e.g., wired, wireless) to a gas chromatograph system, which can be configured to process and analyze the volatile compounds emitted by the produce and collected/routed through the hoses in the cabinet to the sensors.

The cabinet 1900 can also include one or more display devices 1916A-N. The display devices 1916A-N can be similar or the same as any other displays described throughout this disclosure. A display device 1916A-N can be associated with and positioned next to each group of produce on the shelves 122A-N in the cabinet 1900. In some implementations, a display device 1916A-N can be positioned next to/on/near each of the shelves 122A-N. The display devices 1916A-N can be configured to present quality information about the groups of produce in the cabinet 1900, as described throughout this disclosure. In some implementations, the cabinet 1900 can have one display device configured to present quality information about all the produce in the cabinet 1900.

Figure 19B:
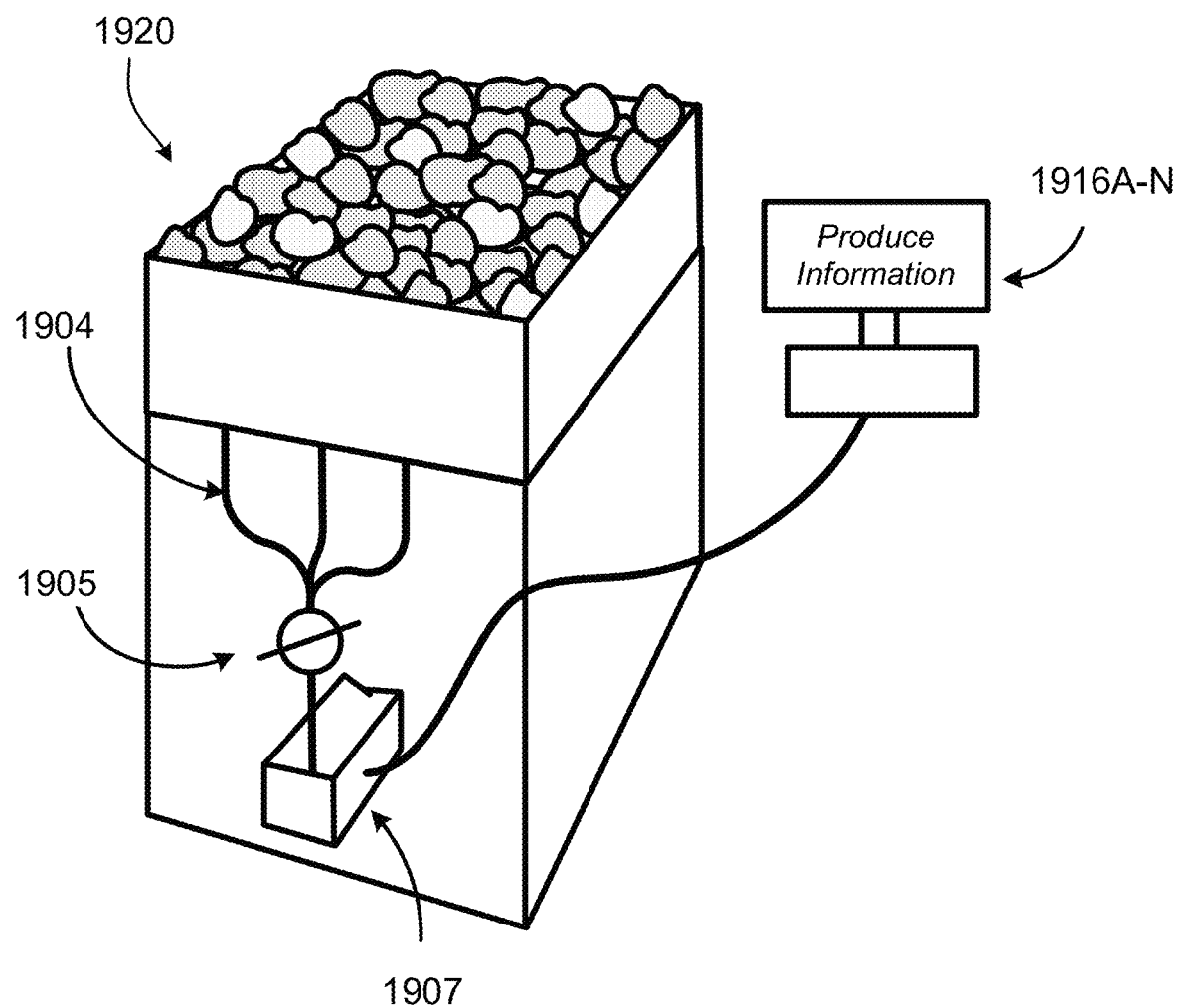

FIG. 19B depicts a case 1920 for holding food items, which can be placed inside a cabinet such as the cabinet 1900 described in FIG. 19A. The case 1920 can be configured to hold a group of a same type of food items. The case 1920 can include openings on a bottom surface of the case 1920 (not depicted in FIG. 19B, refer to FIG. 19C). The hose structure 1904 described in FIG. 19A can route between the openings in the case 1920, through the valve 1905, and to the electronic nose 1907 such that compounds emitted by the food items in the case 1920 can be directed to flow/move towards the electronic nose 1907. The electronic nose 1907 can be part of, attached to, and/or configured to the case 1920. The case 1920 and the electronic nose 1907 can then be placed inside a produce cabinet, such as the cabinet 1900, a refrigeration unit, or any other type of case for holding various groups of food items. In some implementations, the electronic nose 1907 may not be part of/attached to the case 1920 can instead can be positioned inside a produce cabinet, like the cabinet 1900, then coupled to the case 1920 via the hose structure 1904.

The electronic nose 1907 can also be in communication (e.g., wired and/or wireless) over a network with the display device 1916A-N. As described herein, the display device 1916A-N can output/present information about the group of food items in the case 1920. This information can be determined, by a computer system described throughout this disclosure, based on data generated by the electronic nose 1907 about compounds emitted by the group of food items. For example, the display device 1916A-N can output price information, discounts, stage of ripeness, shelf life, taste information, and any other information that can be determined using the disclosed techniques.

As shown in FIGS. 19A and 19B, the electronic nose 1907 can be deployed in an end-consumer retail environment, such as a grocery store. The electronic nose 1907 can be placed under the case 1920 that holds the group of food items. Each of the hoses in the hose structure 1904 can connect to the valve 1905 (e.g., a valve switch) that can sample emitted volatile compounds at different positions in the case 1920. The valve 1905 can deliver the sample(s) of compounds to the electronic nose 1907 for measurement and processing. As mentioned above, data is processed and displayed at the display device 1916A-N based on evaluation and processing of the compounds by the electronic nose 1907. In some implementations, the display device 1916A-N can be a computing device that can control operation of the electronic nose 1907 and/or the valve 1905. In some implementations, a remote computer system, such as any of the computer systems described herein, can control operation of the electronic nose 1907 and/or the valve 1905. In some implementations, a processor in a produce cabinet, such as the processor 1912 of the cabinet 1900 in FIG. 19A, can control operation of the electronic nose 1907 and/or the valve 1905. Moreover, as shown in FIG. 19B, the case 1920 may not include sensors integrated into surfaces of the case 1920 (e.g., side walls, bottom surface, etc.). Instead, the case 1920 may simply connect to the electronic nose 1907 via the hose structure 1904 to collect and assess volatiles released by the food items placed in the case 1920. In some implementations, the case 1920 can include one or more sensors described throughout this disclosure in order to increase a quantity of compounds that are collected and increase accuracy in processing the compounds.

Figure 19C:
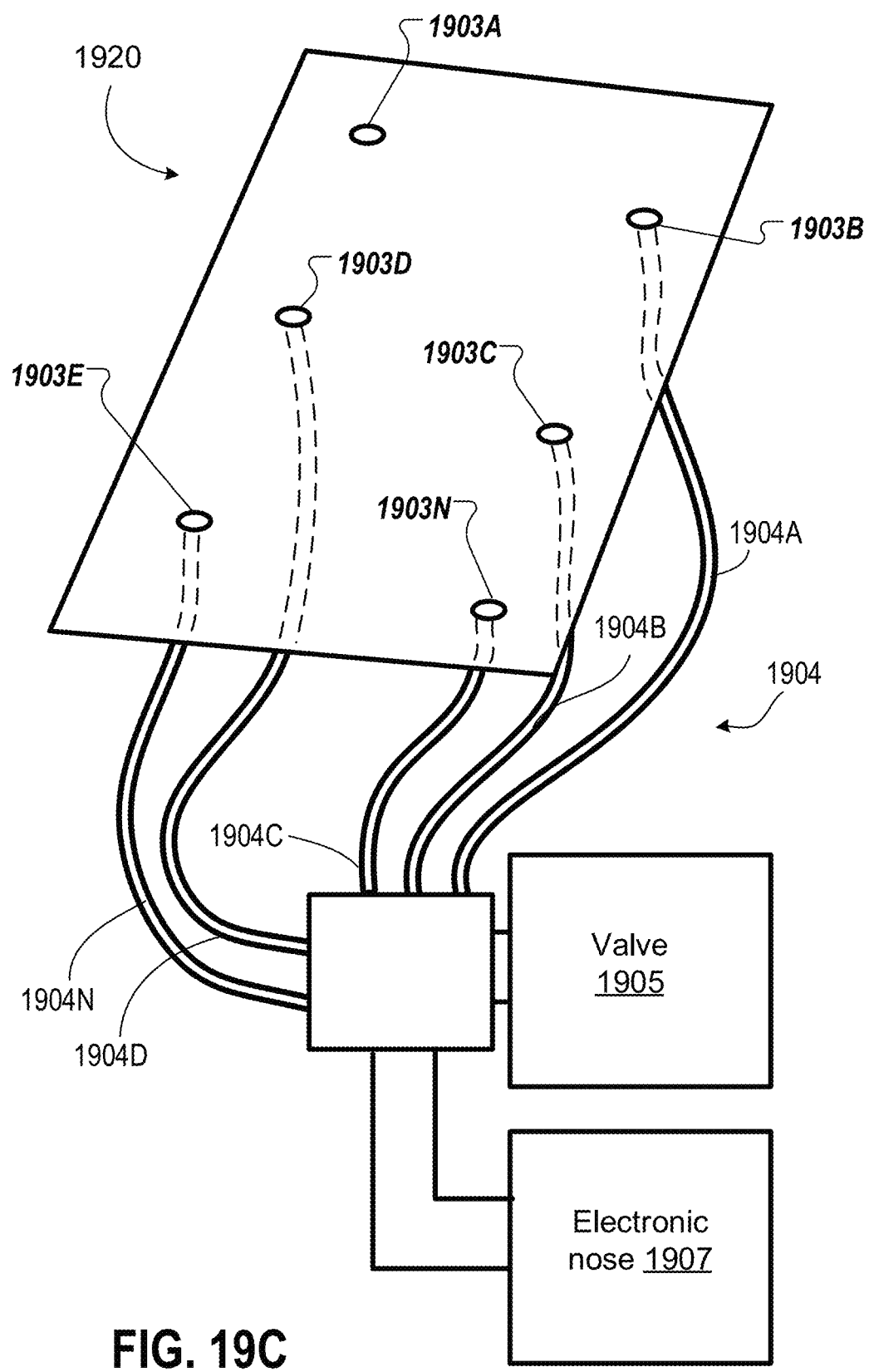

FIG. 19C depicts a bottom surface 1922 of the case 1920 of FIG. 19B. The bottom surface 1922 of the case 1920 can include the openings 1903A-N described in reference to FIGS. 19A-B. A hose 1904A-N of the hose structure 1904 can be routed from each of the openings 1903A-N to the valve 1905 to be passed to the electronic 1907 for collection and processing. The bottom surface 1922 can have any desired quantity of the openings 1903A-N. In some implementations, side walls of the case 1920 may also include one or more openings 1903A-N. The openings 1903A-N described herein can be sized to receive hoses 1904A-N that are sized approximately ⅟₁₆ inch to ¼ inch. The bottom surface 1922 can have the openings 1903A-N near edges of the case 1920, along a center of the case 1920, spread out across the bottom surface 1922, towards a front of the case 1920 (which can be beneficial for cases that are angled downwards in produce cabinets, in which food items naturally move towards the front of the case following the downward angle of the case), towards a back of the case 1920, etc. In some implementations, the more openings 1903A-N in the case 1920, the more volatiles that can be collected and assessed. The more volatiles collected and assessed, the improved accuracy in further analysis of the food items' quality since a more robust dataset can be used for performing that analysis.

In some implementations, the electronic nose 1907 can include a pump to draw a sample of collected volatiles through the hose structure 1904, the valve 1905, and into the electronic nose 1907 for measurement. The pump can be part of the vacuum system 1906 described in reference to FIGS. 19A-B. Moreover, in some implementations, the electronic nose 1907 can be communicably coupled to the pump. The pump can then be separate from the electronic nose 1907 and/or the case 1920. The pump can operate to control flow of samples through the hose structure 1904 described in FIG. 19A from various hoses 1904A-N going to various cases and/or shelves of food items.

Figure 19D:
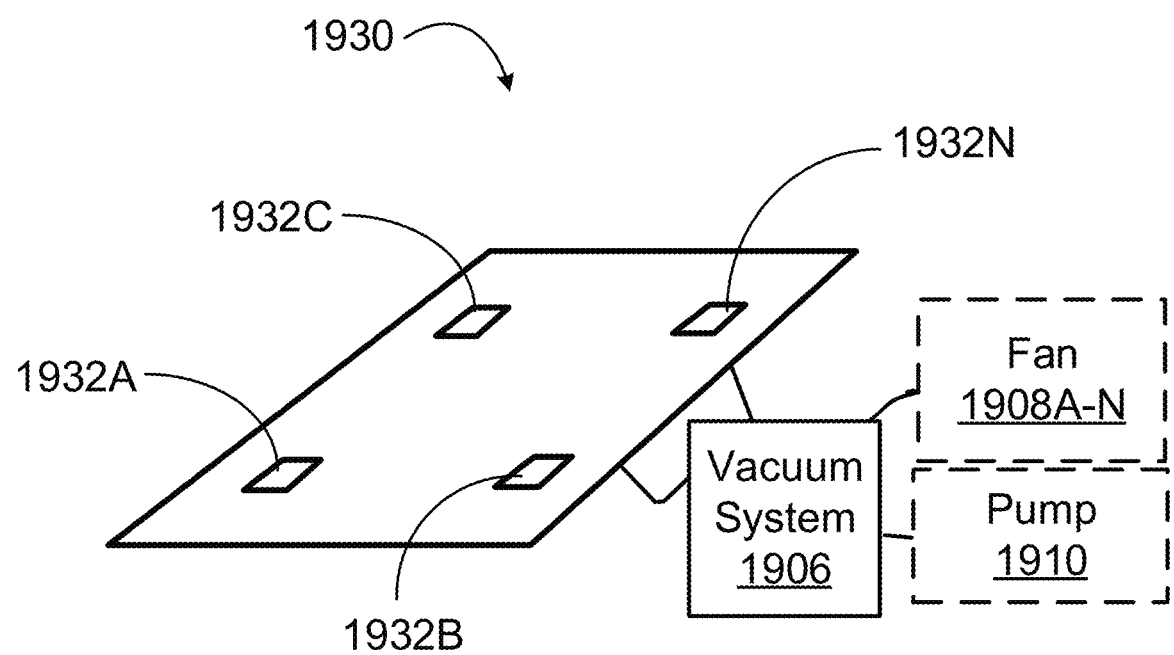

FIG. 19D depicts an example case 1930 including sensors 1932A-N integrated therein. The case 1930 can be similar to the case 1920 in that the case 1930 can be configured to contain a group of food items. The case 1930 can also be placed inside a produce cabinet described herein, such as the cabinet 1900. Instead of having openings and hose structure to route emitted volatile compounds towards an electronic nose (e.g., see the cabinet 1920 in FIG. 19C), the case 1930 includes the sensors 1932A-N integrated into a surface of the case 1930 (e.g., a bottom surface, a top surface, side walls, etc.). The case 1930 can include the vacuum system 1906, which can optionally include the fan(s) 1908A-N and/or the pump 1910. The vacuum system 1906 can be configured to circulate air around the case 1930 so that volatiles emitted by the food items in the case 1930 are sampled by the sensors 1932A-N. In some implementations, the case 1930 can be placed near an independent vacuum system 1906, which can be part of the produce cabinet. The vacuum system 1906 can then be configured to circulate air around various cases, not just the case 1930.

The case 1930 can be integrated with a user-selected group or types of sensors 1932A-N. The sensors 1932A-N can be one or more different types of sensors that may typically be contained in an electronic nose, such as the electronic nose 1907. For example, any one or more of the sensors 1932A-N can be chosen from a group of sensors including but not limited to nanocomposite sensors, electromechanical sensors, metal oxide semiconductors, photoionization sensors, and/or non-dispersive infrared sensors. Similar to the openings 1903A-N in the case 1920, the sensors 1932A-N can be positioned in a variety of locations in the case 1930. Refer to discussion of the openings 1903A-N in FIG. 19C for additional information about positioning and placement of the sensors 1932A-N.

In some implementations, the disclosed technology can be used in various other stages of the supply chain. For example, the disclosed technology can be applied in a packing house or other storage facility. Handheld and/or stationary sensors can be positioned near pallets of produce. Volatiles off-gassed by the produce can be captured by the sensors and provided to a computer system for processing and modeling. The volatiles can be modeled, for example, to predict a stage of ripeness for the produce on the pallet. Based on this prediction, the computer system can determine supply chain modifications for the produce on the pallet, such as positioning the pallet in cold storage and/or in a ripening room. The computer system can also leverage inventory management systems to better fit a predicted or current shelf life of the produce to the supply chain on a pallet by pallet basis.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for determining quality levels of food items using non-contact assessments of the food items, the system comprising:
an evaluation computing system configured to:
receive, from an imaging device, image data of a particular food item;
identify a type of the particular food item based on applying a food item identification model to the image data;
determine, based on the identified type of the particular food item, an initial quality level of the particular food item;
generate a product identifier that uniquely identifies the particular food item, wherein information associated with the product identifier corresponds to the initial quality level of the particular food item;
generate instructions that cause the particular food item to be transported to an end-consumer retail environment based at least in part on the initial quality level of the particular food item; and
return, to at least one actor in a supply chain associated with the particular food item, (i) the instructions for execution by the at least one actor in the supply chain and (ii) the product identifier;
a quality assessment system configured to:
receive food item data, the food item data including image data of the particular food item based on a request to receive information about quality of the particular food item;
determine a current quality level of the particular food item based on providing the food item data as input to a food item quality model associated with the product identifier of the particular food item, wherein the food item quality model was trained using image data of other food items having distinct quality features, wherein the other food items are of a same food type as the particular food item;
determine, based on the current quality level of the particular food item, a number of days to peak ripeness for the particular food item;
adjust the determined number of days to peak ripeness based on measured volatiles for the particular food item; and
determine at least one supply chain modification for the particular food item based on the current quality level of the particular food item and the adjusted number of days to peak ripeness; and
a display device in communication with the quality assessment system, the display device configured to:
request, from the quality assessment system, the information about the quality of the particular food item, wherein the information includes at least one of the current quality level of the particular food item, the number of days to peak ripeness for the particular food item, the adjusted number of days to peak ripeness, and the at least one supply chain modification; and
visually present the requested information in a display in the end-consumer retail environment.

2. The system of claim 1, wherein the quality assessment system is further configured to generate a ripeness curve for the particular food item based at least in part on the current quality level of the particular food item and the measured volatiles, wherein the ripeness curve indicates a current ripeness of the particular food item and projected ripeness levels of the particular food item over a predetermined period of time.

3. The system of claim 1, further comprising one or more sensors positioned near the particular food item and configured to detect volatile compounds emitted by the particular food item, and
wherein the quality assessment system is configured to:
receive data indicating the detected volatile compounds from the one or more sensors; and
determine the current quality level of the particular food item based on providing the data indicating the detected volatile compounds and the food item data as input to the food item quality model.

4. The system of claim 3, wherein the one or more sensors are selected from a group of sensors including at least one of nanocomposite sensors, electromechanical sensors, metal oxide semiconductors, photoionization sensors, and non-dispersive infrared sensors.

5. The system of claim 1, further comprising:
a bin configured to hold a quantity of food items including the particular food item, wherein the bin includes:
one or more sensors attached to one or more sides of the bin, wherein the one or more sensors are configured to detect volatile compounds emitted by the food items in the bin;
a display screen attached to one or more sides of the bin and configured to dynamically display information about the food items in the bin; and
a communication interface configured to communicate with the quality assessment system over one or more networks.

6. The system of claim 5, wherein the quality assessment system is configured to:
determine a price adjustment for the food items in the bin based at least in part on the current quality level of the particular food item; and
transmit, to the display screen of the bin for presentation, the adjusted price for the food items in the bin.

7. The system of claim 5, wherein the quality assessment system is configured to:
receive, from the one or more sensors, data indicative of the volatile compounds detected by the one or more sensors;
provide the data indicative of the volatile compounds as input to the food item quality model, wherein the food item quality model was trained to correlate volatile compounds emitted by the other food items with quality characteristics of the other food items, the quality characteristics being annotated in training data of the other food items; and
receive, as output from the food item quality model, the current quality level of the particular food item based on the data indicative of the volatile compounds.

8. The system of claim 5, wherein the bin further comprises:
a controller in communication with the one or more sensors, the display screen, and the communication interface, the controller configured to update information displayed at the display screen based on a quality metric of the food items in the bin.

9. The system of claim 8, further comprising at least one sensor positioned a threshold distance away from the bin and configured to detect the volatile compounds emitted by the food items in the bin, the threshold distance being within a range of 1 to 6 inches.

10. The system of claim 8, wherein the quality metric of the food items in the bin is determined by a computer system in communication with the bin, the computer system configured to perform operations comprising:
receiving, from the controller, data indicative of the volatile compounds detected by the one or more sensors;
providing the data indicative of the volatile compounds as input to the food item quality model, wherein the food item quality model was trained to correlate volatile compounds emitted by other food items of the same food item type as the food items in the bin with quality characteristics of the other food items;
receiving the quality metric for the food items in the bin as output from the food item quality model; and
transmitting, to the controller via the communication interface, output to be presented at the display screen, the output indicating the quality metric for the food items.

11. The system of claim 10, wherein the computer system is further configured to perform operations comprising:
determining, based on the quality metric for the food items in the bin, at least one supply chain modification, the at least one supply chain modification including adjusting a price of the food items in the bin based on the quality metric; and
transmitting, to the controller via the communication interface, the at least one supply chain modification for execution,
wherein the controller is configured to (i) generate updated output including the adjusted price of the food items in the bin and (ii) instruct the display screen to present the updated output.

12. The system of claim 10, wherein the food item quality model was trained, by the computer system using a process comprising:
receiving training data for the other food items that includes (i) food item observations, (ii) historic food item information, (iii) destructive measurements of the other food items, and (iv) detected volatile compounds from the other food items, wherein at least one of (i)-(iv) is labeled and annotated with food item features;
generating the food item quality model based on applying machine learning techniques to the training data to map the detected volatile compounds from the other food items to the food item features; and
outputting the food item quality model for runtime use.

13. The system of claim 1, wherein the evaluation computing system is configured to determine an initial price of the particular food item based at least in part on the initial quality level of the particular food item, the type of the particular food item, and preferences of the end-consumer retail environment.

14. The system of claim 1, wherein the display device is a visual display on a bin configured to contain the particular food item in the end-consumer retail environment.

15. A method for dynamically determining quality levels of food items using non-contact assessments of the food items, the method comprising:
receiving at an evaluation computing system and from an imaging device, image data of a particular food item;
identifying, at the evaluation computing system a type of the particular food item based on applying a food item identification model to the image data;
determining, at the evaluation computing system and based on the identified type of the particular food item, an initial quality level of the particular food item;
generating, at the evaluation computing system, a product identifier that uniquely identifies the particular food item, wherein information associated with the product identifier corresponds to the initial quality level of the particular food item;
generating, at the evaluation computing system, instructions that cause the particular food item to be transported to an end-consumer retail environment based at least in part on the initial quality level of the particular food item;
returning, at the evaluation computing system and to at least one actor in a supply chain associated with the particular food item, (i) the instructions for execution by the at least one actor in the supply chain and (ii) the product identifier;
receiving, by a quality assessment system, food item data, the food item data including image data of a particular food item based on a request to receive information about quality of the particular food item;
determining, by the quality assessment system, a current quality level of the particular food item based on providing the food item data as input to a food item quality model associated with the product identifier of the particular food item, wherein the food item quality model was trained using image data of other food items having distinct quality features, wherein the other food items are of a same food type as the particular food item;
determining, by the quality assessment system and based on the current quality level of the particular food item, a number of days to peak ripeness for the particular food item;
adjusting, by the quality assessment system, the determined number of days to peak ripeness based on measured volatiles for the particular food item;
determining, by the quality assessment system, at least one supply chain modification for the particular food item based on the current quality level of the particular food item and the adjusted number of days to peak ripeness; and
transmitting, by the quality assessment system to a display device, information about quality of the particular food item to be visually presented in a display in an end-consumer retail environment, wherein the information includes at least one of the current quality level of the particular food item, the number of days to peak ripeness for the particular food item, the adjusted number of days to peak ripeness, and the at least one supply chain modification.

16. The method of claim 15, further comprising:
receiving, by the quality assessment system and from one or more sensors of a bin holding a quantity of the food items, data indicative of volatile compounds emitted by the particular food item detected, wherein the emitted volatile compounds are detected by the one or more sensors;
providing, by the quality assessment system, the data indicative of the volatile compounds as input to the food item quality model, wherein the food item quality model was further trained to correlate volatile compounds emitted by the other food items with quality characteristics of the other food items, the quality characteristics being annotated in training data of the other food items; and returning, by the quality assessment system and as output from the food item quality model, the current quality level of the particular food item based on the data indicative of the volatile compounds.

17. The method of claim 16, wherein the one or more sensors are selected from a group of sensors including at least one of nanocomposite sensors, electromechanical sensors, metal oxide semiconductors, photoionization sensors, and non-dispersive infrared sensors.

18. The method of claim 16, further comprising:
receiving, from a bin configured to hold a quantity of the food items, a quality metric for the food items as output from the food item quality model; and
transmitting, to a controller of the bin and through a communication interface of the bin, output to be presented at a display screen attached to one or more sides of the bin, wherein the output is indicative of the quality metric for the food items.

19. The method of claim 18, further comprising:
determining, based on the quality metric for the food items in the bin, at least one supply chain modification, the at least one supply chain modification including adjusting a price of the food items in the bin based on the quality metric; and
transmitting, to the controller via the communication interface, the at least one supply chain modification for execution.

20. The method of claim 15, further comprising:
generating, by the quality assessment system, a ripeness curve for the particular food item based at least in part on the current quality level of the particular food item and the measured volatiles, wherein the ripeness curve indicates a current ripeness of the particular food item and projected ripeness levels of the particular food item over a predetermined period of time.

21. The method of claim 15, further comprising:
determining, at the quality assessment system, a price adjustment for the food items based at least in part on the current quality level of the particular food item; and
transmitting to a display screen of a bin for presentation, the adjusted price for the food items in the bin.

22. The method of claim 15, further comprising:
receiving, at the quality assessment system and from one or more sensors, data indicative of volatile compounds detected by the one or more sensors;
providing the data indicative of the volatile compounds as input to the food item quality model, wherein the food item quality model was trained to correlate volatile compounds emitted by the other food items with quality characteristics of the other food items; and
receiving, as output from the food item quality model, the current quality level of the particular food item based on the data indicative of the volatile compounds.

23. The method of claim 15, further comprising:
determining an initial price of the particular food item based at least in part on the initial quality level of the particular food item, the type of the particular food item, and preferences of the end-consumer retail environment.

24. The method of claim 15, wherein the food item quality model was trained using a process comprising:
receiving training data for the other food items that includes (i) food item observations, (ii) historic food item information, (iii) destructive measurements of the other food items, and (iv) detected volatile compounds from the other food items, wherein at least one of (i)-(iv) is labeled and annotated with food item features;
generating the food item quality model based on applying machine learning techniques to the training data to map the detected volatile compounds from the other food items to the food item features; and
outputting the food item quality model for runtime use.

25. The method of claim 15, wherein the display device is a visual display on a bin configured to hold the particular food item in the end-consumer retail environment.

* * * * *